United States Patent [19]
Akabori et al.

[11] Patent Number: 5,940,582
[45] Date of Patent: Aug. 17, 1999

[54] DATA PRINTING SYSTEM AND METHOD, AND A CONTROLLER AND PRINTER THEREFORE

[75] Inventors: Kenichi Akabori; Hiroshi Ogawa, both of Hitachi, Japan; Katsuhiro Shiobara, Fair Lawn, N.J.; Yuuji Aoyagi, Hitachi, Japan

[73] Assignee: Hitachi, Ltd., Tokyo, Japan

[21] Appl. No.: 07/735,356

[22] Filed: Jul. 24, 1991

[30] Foreign Application Priority Data

Jul. 25, 1990 [JP] Japan .................................. 2-194937

[51] Int. Cl.⁶ .................................................. G06K 15/00
[52] U.S. Cl. ............................................ 395/112; 395/114
[58] Field of Search ....................................... 395/101, 112, 395/113, 115, 114; 346/154; 400/70, 74, 76; 358/467; 355/77, 113

[56] References Cited

U.S. PATENT DOCUMENTS

| | | | |
|---|---|---|---|
| 4,816,864 | 3/1989 | Tanaka et al. | 355/14 R |
| 5,036,361 | 7/1991 | Filion et al. | 355/200 |
| 5,129,040 | 7/1992 | Cuzzo et al. | 395/113 |

*Primary Examiner*—Arthur G. Evans
*Attorney, Agent, or Firm*—Antonelli, Terry, Stout & Kraus, LLP

[57] ABSTRACT

A data printing system has a controller which controls the printing of jobs from at least one input unit by a printer. When the controller receives a plurality of jobs, it establishes a sequential order of transmission and generates a display signal indicating the times at which the respective jobs will be printed. That display signal may then generate a display at the input unit(s) or at a display associated with the controller itself. In this way, users are given information about the times of printing. The sequence of printing of the jobs may be established on the basis of a priority associated with the jobs themselves and/or on the amount of material currently available for printing by the printer and/or on the maximum capacity of printed paper. Display may be associated with that amount and/or capacity.

36 Claims, 45 Drawing Sheets

Transfer data from input unit to main controller

| Field | No. |
|---|---|
| Input unit No. | 41 |
| Outputter code. | 42 |
| Priority (A, interrupt, normal). | 43 |
| Document name. | 44 |
| Scheduled execution time for job. | 45 |
| Desired end time. | 46 |
| Output paper count. | 47 |
| Paper size. | 48 |
| Paper type. | 49 |
| Colour specification. | 50 |
| Double-side print specification. | 51 |
| Sorter bin No. output specification. | 52 |
| Sorter bin fetch inhibition or release specification. | 53 |
| Top stacker output specification. | 54 |
| Bulk bin output specification. | 55 |
| Graphic. | 56 |
| Print data. | 57 |

FIG. 3b
Transfer data from output unit to main controller.

| Field | Ref |
|---|---|
| Serious fault occurrence. | 58 |
| 1st cassette paper size. | 59 |
| Paper type | 60 |
| Paper count | 61 |
| "n"th cassette paper size. | 62 |
| Paper type. | 63 |
| Paper count. | 64 |
| Cumulative sorter bin No.1 paper count. | 65 |
| Cumulative sorter bin No."n" paper count. | 66 |
| Cumulative top stacker paper count. | 67 |
| Cumulative bulk pin paper count. | 68 |
| Paper jam part. | 69 |
| Photosensitive drum life. | 70 |
| Developer life. | 71 |
| Toner shortage. | 72 |
| Pickup roller life. | 73 |
| Fixing unit life. | 74 |
| Charging unit life. | 75 |
| Transfer unit life. | 76 |
| Service man call : optical unit. | 77 |
| Service man call : main motor. | 78 |
| Service man call : fixing unit. | 79 |

FIG. 4 contd.

Transfer data from controller to input unit

FIG.5

| 110 | Order: Under processing |
| --- | --- |
| | 1 |
| | 2 |
| | ⁞ |
| 111 | Document name: Long term plan |
| | DR data 1 |
| | ⁞ |
| 112 | Outputter: Tanaka |
| | Sato |
| 113 | Scheduled execution time: 0·5 min |
| | 1·0 min |
| | ⁞ |
| 114 | Scheduled end time: 9:01 |
| | 9:02 |
| | ⁞ |
| 115 | Output paper count: 3 |
| | 5 |
| | ⁞ |
| 116 | Cumulative paper count: 3 |
| | 8 |
| | ⁞ |
| 117 | Paper size: A3 |
| | A4 |
| | ⁞ |
| 118 | Paper type: Normal |
| | Normal |
| | ⁞ |

| 119 | Color specification: BK or R |
| --- | --- |
| | BK |
| | ⁞ |
| 120 | Double-side print specification: None |
| | None |
| | ⁞ |
| 121 | Sorter bin No. output specification: None |
| | #3 |
| | ⁞ |
| 122 | Top stacker output specification: Yes |
| | None |
| | ⁞ |
| 123 | Bulk bin output specification: None |
| | None |
| | ⁞ |
| 124 | Character or graphic: Graphic |
| | Character, graphic |
| | ⁞ |
| 125 | Priority: A |
| | None |
| 126 | Paper feed capacity shortage: None |
| | ⁞ |
| | Yes |
| 127 | Paper ejection capacity shortage: None |
| | ⁞ |
| | Yes |
| 128 | Jam part |

FIG. 6

| Order (80) | Under processing (81) Document name | Outputter (82) | Execution time (83) | Scheduled end time (84) | Output paper count (85) | Cumulative paper count (86) | Paper size (87) | Paper type (88) |
|---|---|---|---|---|---|---|---|---|
| 1 | Long term plan DR data 1 | Tanaka Sato | 0.5 min. 1.0 min. | / 9:01 / 9:02 | 3 5 | 3 8 | A3 A3 | Normal Normal |
| 5 | Customer expl-anation data | Suzuki | 4.5 min. | / 9:34 | 23 | 115 | A4 | P.P. |
| 15 | Design data | Kato | 1.5 min. | / 10:04 | 8 | 163 | A4 | Normal |
| 16 | Defect example | 12345678 | 1.0 min. | / 10:05 | 6 | 169 | A4 | Normal |
| 17 | Long term plan | Suzuki | 3.0 min. | / 10:08 | 6 | 175 | B4 | Normal |
| | 18 Documents (97) | 18 Persons (98) | 68.0 min. (99) | | | 175 (100) | | |

Reception (101) — Paper feed capacity shortage — Paper ejection capacity shortage (102)

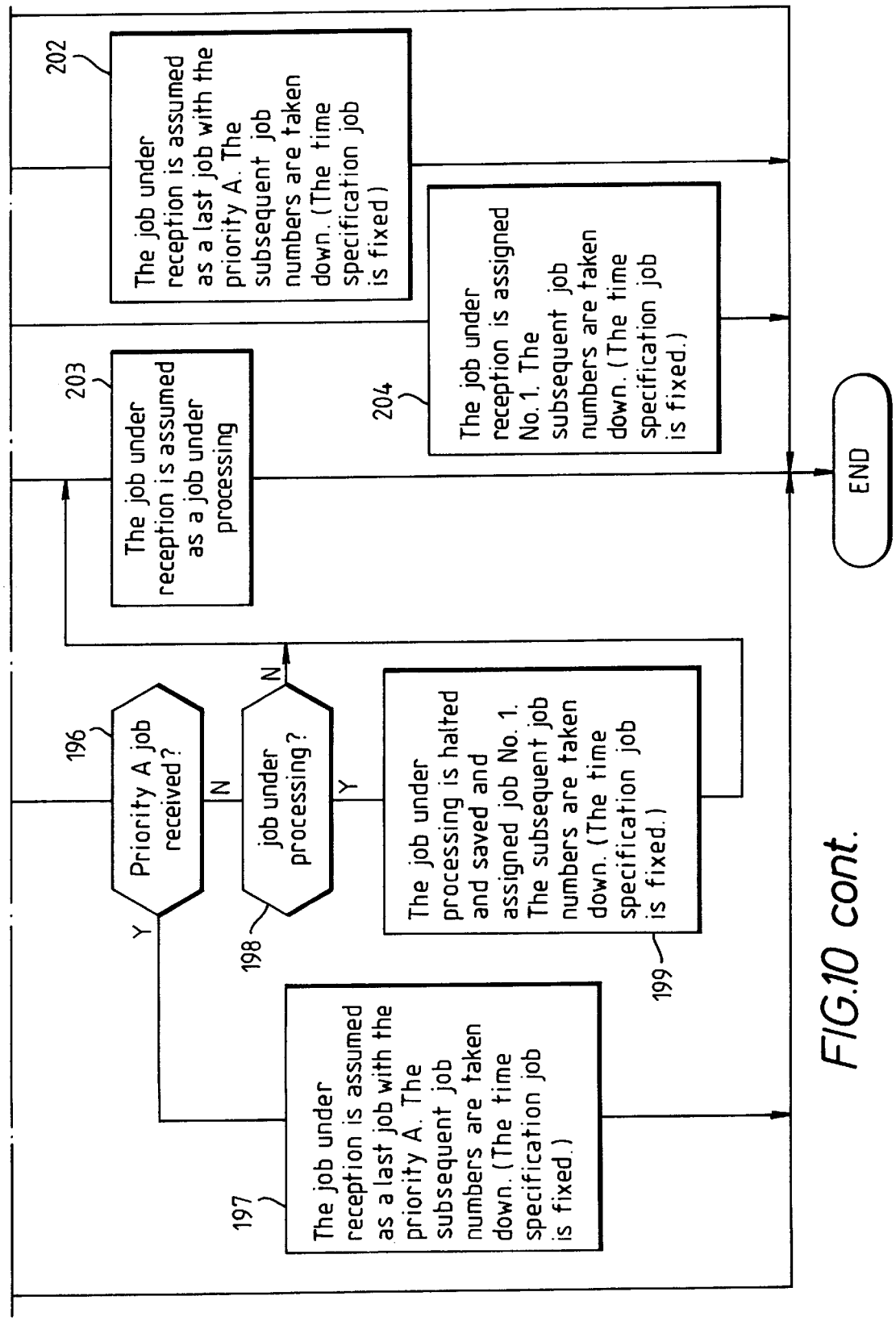

Priority A job input

Interrupt job input (1)

Interrupt job input (2)

Normal job input

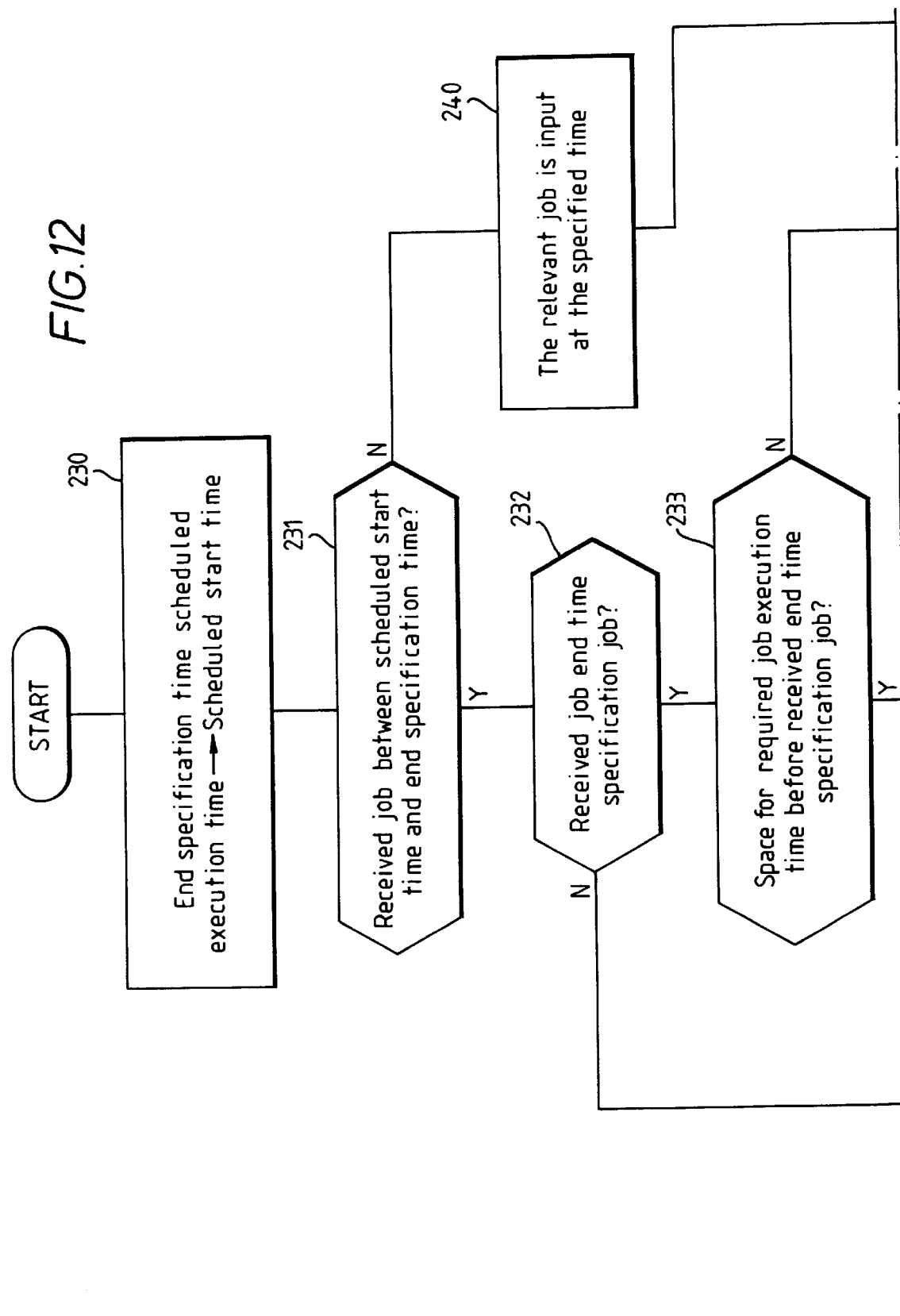

FIG.13a

End time specification.(1)

Before input

| Job being processed |
|---|
| #1 |
| #2 |
| #3 |
| #4 |

— 250

(Time specification) — 251

After input

| Job being processed |
|---|
| #1 |
| #2 |
| #3 (Time specification) |
| #3 → 4 |
| #4 → 5 |

— 252
— 251A

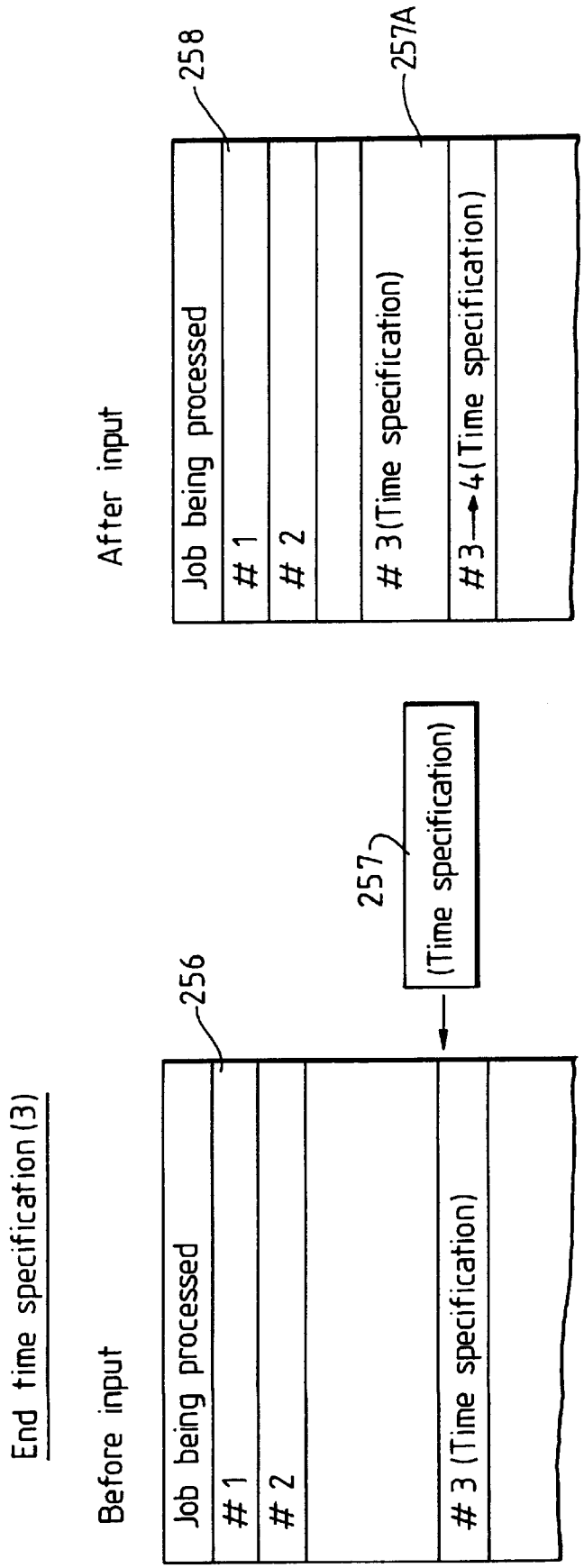

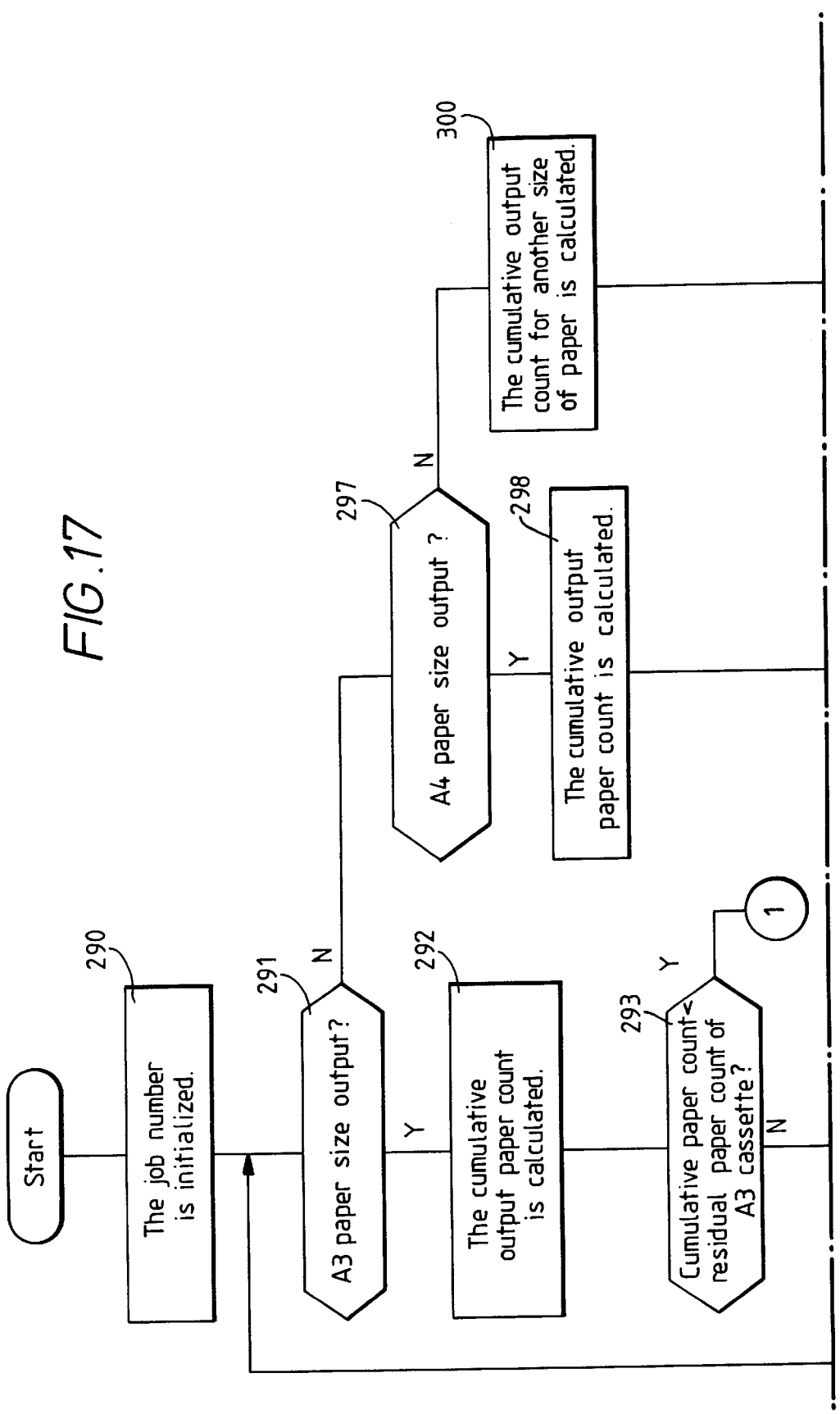

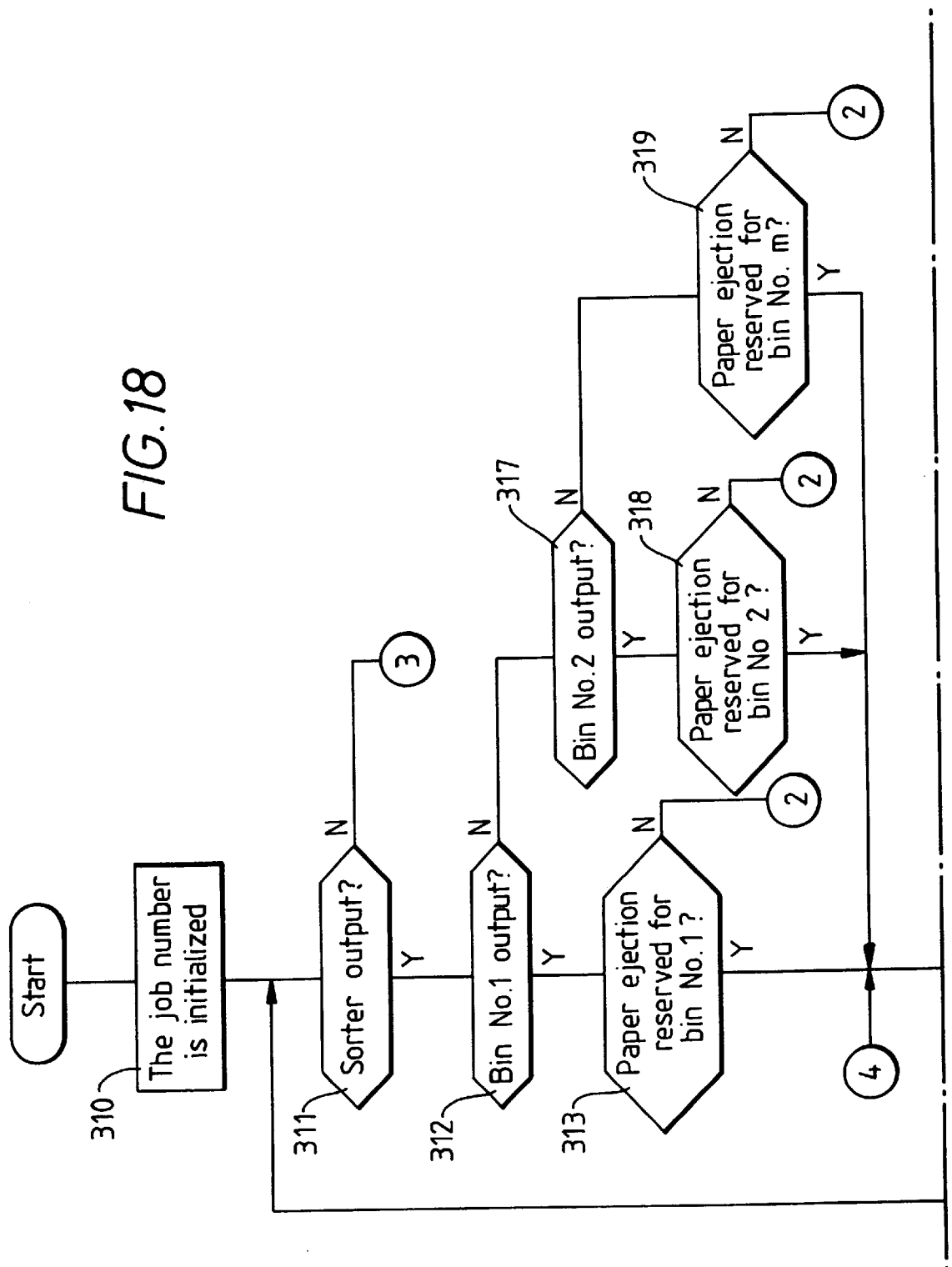

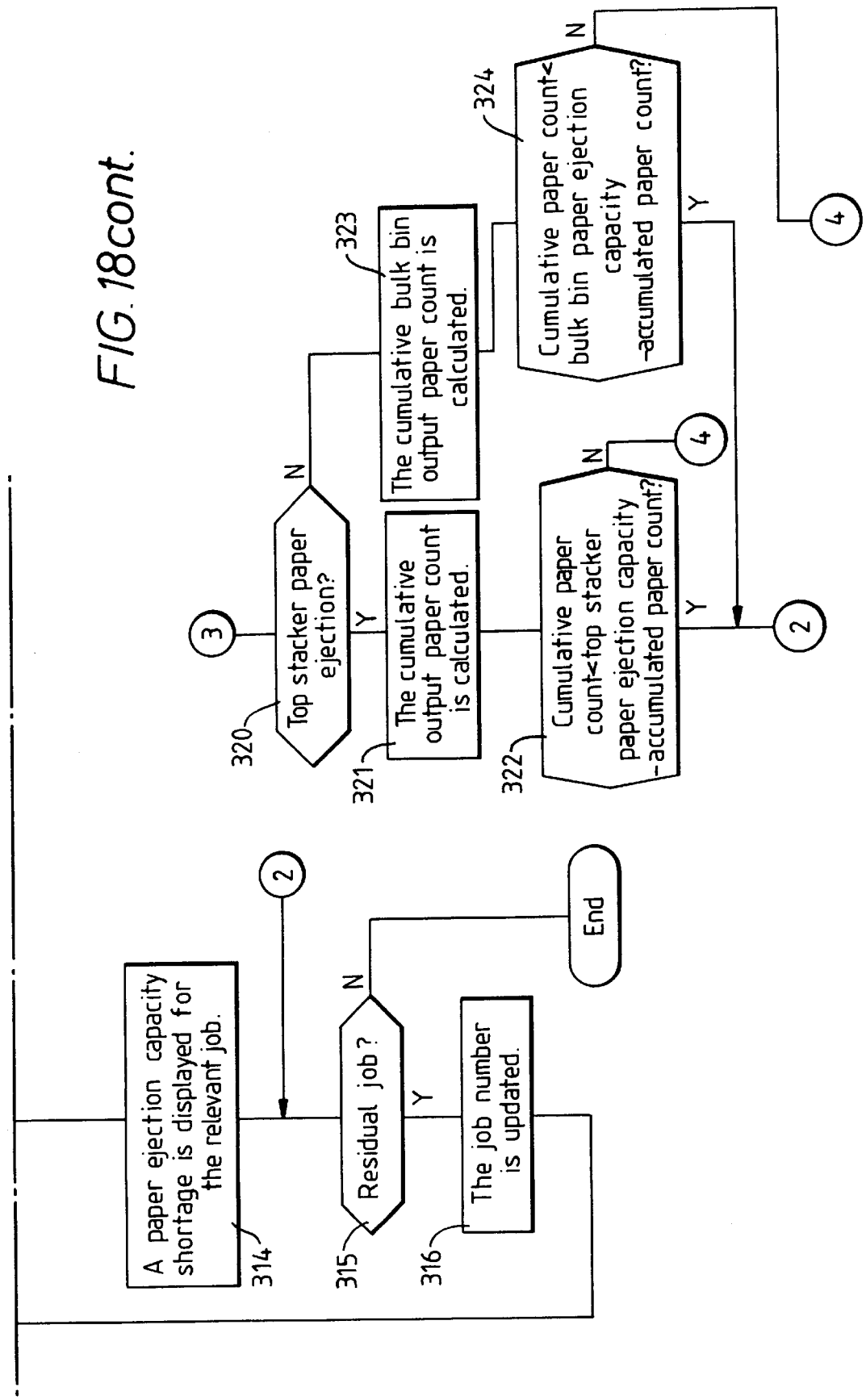

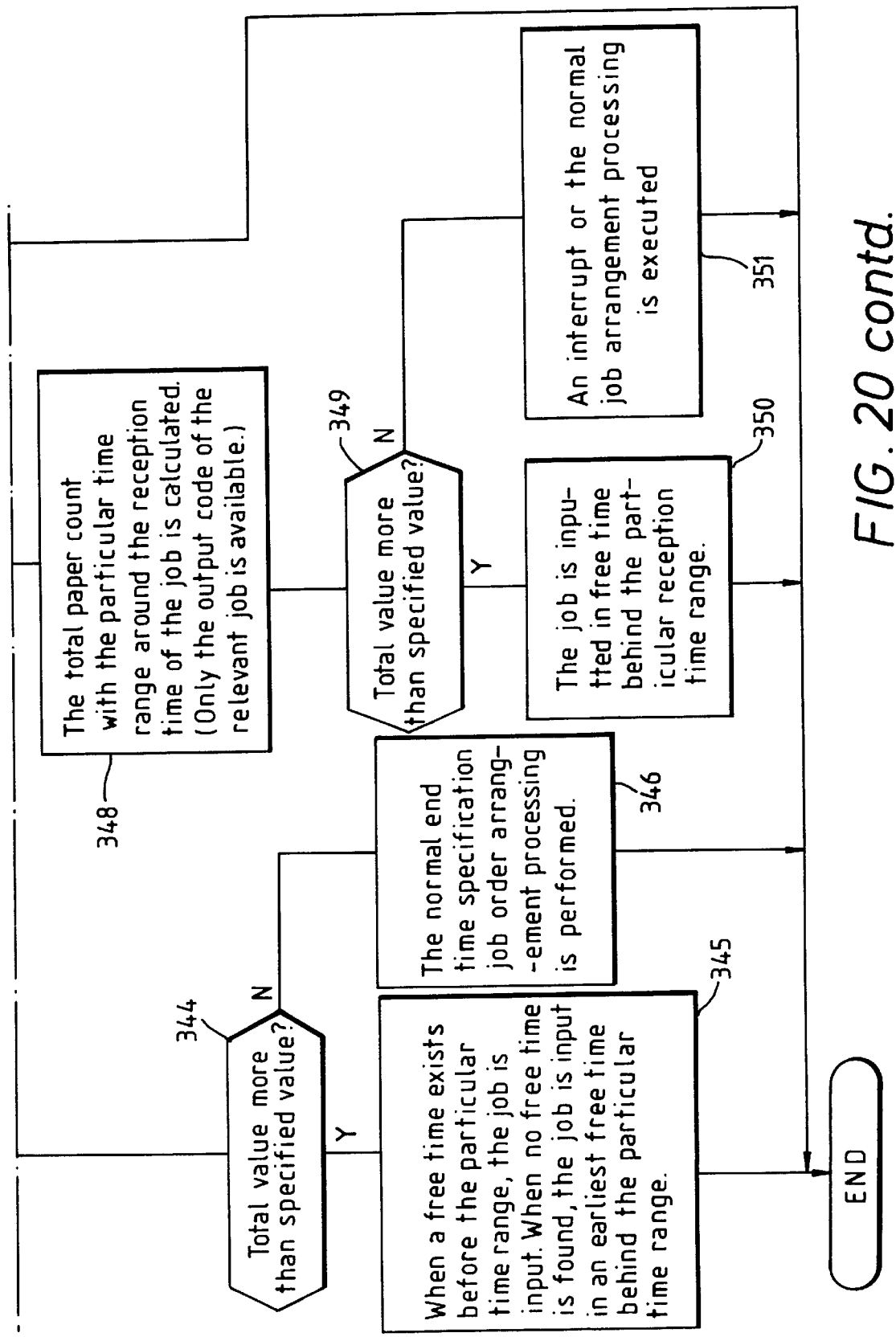
FIG. 20 contd.

DATA PRINTING SYSTEM AND METHOD, AND A CONTROLLER AND PRINTER THEREFORE

BACKGROUND OF THE INVENTION

The present invention relates to a system for printing data, which system has at least one input unit, a printer for printing data from the input unit, and a controller for controlling the printer. The present invention also relates to a controller which may be used with such a system, and to a printer which may be used with such a system. Furthermore, the present invention also relates to a method for printing.

The data printed according to the present invention may be any sort of data, such as data representing words, graphics images, etc.

It is known to form a printing system in which an output unit (printer) is shared by a plurality of input units. This enables more efficient use of the printer, since it is possible for the printer to be printing data from one input unit while data is being input by a user of another input unit. Normally, data to be printed from each input unit will be divided into one or more jobs, and then it is necessary to determine a printing order for the jobs, to prevent collision of data from different jobs. Therefore, it is necessary to provide a controller for ensuring that only one job can be printed at any time. At its simplest, such a controller may be a mechanical switch, but it is preferable for the controller to be able to determine which job is to be printed at any time, without the need for specific user input.

In JP-A-62-242231, a system was disclosed in which a plurality of input units (personal computers) were connected to a common printer. When one input unit had a job to be printed, the input unit sent a signal to the printer before transmitting the job. If the printer was not currently processing a job when that signal was received, the controller signalled to the input unit to begin transmitting the job to be printed. If, on the other hand, an earlier job was already being printed, the printer signalled to the input unit to prevent the transmission of the job to the printer. Thus, whichever input unit first signalled that it had a job to print was able to print that job and the other input unit would have to wait until after that job had been printed before their own jobs could be printed. When the printer was not printing a job, it looked sequentially at each input unit for the transmission of a signal indicating that the corresponding input unit had a job to be printed.

JP-A-61-282921 disclosed an arrangement in which a plurality of input units were connected to a common controller and in which the controller had a memory in which jobs received from the plurality of input units were stored. Then each job was sequentially transmitted from that memory to the printer. This way, only one job was sent to the printer for printing at any time. In JP-A-61-282921, the transmission of jobs to the printer was on the basis of a "first-in, first-out" arrangement, so the first job received in the memory was the first to be sent to the printer for printing.

SUMMARY OF THE PRESENT INVENTION

The present invention seeks to improve on the known printing systems, and has a number of aspects. It should be noted, however, that although the present invention has been developed primarily for use in systems where a plurality of input units are connected to a common printer, it may also be used in a system with a single input unit.

In both JP-A-62-242231 and JP-A-61-282921 discussed above, printing of a job from one input unit may be delayed until the printing of a job from another input unit (or even printing of an earlier job from the same input unit) has been completed. Therefore, the user of such an input unit does not know when the requested job will be printed. Particularly in systems where the printer is shared among a plurality of input units, the printer may be located at some distance from each input unit. Therefore, the user does not know when to go to the printer to receive the printed job which has been requested, and efficient use of the user's time may be impaired.

Therefore, a first aspect of the present invention proposes that a controller for a data printing system has analysis means which stores the duration of printing of each of the jobs for printing, calculates printing times for each of the jobs, and generates a display signal representing those printing times. That display signal may then be used to generate a suitable display to the users, either at the input unit transmitting the job, at each input unit, or on a separate display associated with the controller itself. In this way, the or each user will be presented with information which will enable them to decide when a job requested to be printed will be available.

Since the controller must store the duration of printing of each of the jobs, in order to be able to calculate respective printing times, it is necessary for the respective durations of the printing of the jobs to be determined, and this may be achieved either by the input units themselves, or by the controller. This information may be generated by the or each input unit, and it may be transmitted to the controller at the same time that data to be printed is transmitted. If, on the other hand, it is calculated at the controller, then the controller may store the data to be printed and calculate the respective durations of the jobs on the basis of the stored data.

In simple arrangements, it is possible for the sequential order of printing to be fixed, e.g. on a "first-in, first-out" basis. However, it is desirable that the controller permits the user to print rapidly a job with a higher priority than other jobs. Otherwise, where an existing printing sequence has already been established for a plurality of jobs, there could be long delays in the printing of such a high priority job. Therefore, it is preferable that each job has an associated priority, and the controller is able to determine the sequential transmission of the jobs to the printer on the basis of that priority order. Furthermore, with such an arrangement, it is then possible for the controller to revise the order of sequential transmission of the jobs to the printer if it receives a new job with a higher priority than at least one of those jobs for which it has already established a sequence of printing.

A further problem which occurs in the systems of JP-A-61-282921 and JP-A-62-242231 concerns the printer itself. In such systems, particularly where the input units are located at some distance from the printer, the or each user may not know whether the printer has sufficient paper to print the requested job, at its appropriate place in the printing sequence, and similarly may not know whether the storage space or spaces of the printer for printed paper is sufficiently large to accommodate all the printed paper that will be necessary to print the sequence of jobs.

Therefore, a further aspect of the present invention proposes that the printer has means for determining how much material is available for data to be printed thereon and/or how much material has already been printed. Normally, that material will be sheets of paper, but it is also possible to print on materials other than paper, or to print on a continuous web of material. In the case where the printer calculates the amount of material available for data to be printed thereon, that information is transmitted to the controller. The controller calculates the amount of material needed to print the jobs that it has received, and the two amounts are compared. If there is sufficient material to print all the jobs received by the controller, then printing may be carried out in any desired sequence (including the priority sequence discussed above). However, if the amount of material needed to print all the jobs exceeds that currently available, the controller may then generate a display signal which identifies the jobs which are printable on the amount of material currently identifiable. Again,, this display signal may generate a display at the input unit transmitting the jobs, at all input units, or on a display device associated with the controller itself.

Furthermore, this assessment of the amount of material available, relative to the amount of material needed for printing the jobs received by the controller may be used to determine a printing order among the jobs to be printed, to achieve maximum use of the available material. This may over-ride any priority order associated with the jobs themselves. Thus, a short job with a low priority may be printed in advance of jobs of high priority, if there is insufficient material to print those high priority jobs.

In a similar way, where the printer calculates the amount of material already printed, this may be compared with the maximum amount of printed material that the printer can handle, e.g. in its output bins. By comparing the difference between the maximum amount of material and the amount of material already printed, with the amount of material needed to print the jobs received by the controller, a suitable display signal may be generated. Furthermore, maximum print efficiency may be achieved by suitable ordering of the jobs to be printed which result in the amount of printed material being as close as possible to this maximum amount. Again, this ordering of the jobs to be printed may over-ride any priority order established by the jobs themselves.

It is possible for a printer according to the second aspect of the present invention to calculate either the amount of material to be printed, or the amount of material already printed, or both. Calculations should be continuous, so that the controller is continually up-dated. Furthermore, this aspect of the present invention may, if desired, be combined with the first aspect of the present invention, and even for a display to be provided to the user of the amount of material remaining and/or already printed.

In existing printing systems, and in particular those where a plurality of input units are connected to a common printer, known systems have given no consideration to the fact that one or more of the users may wish to keep confidential the data that is printed. Therefore, a third aspect of the present invention proposes that the output bins of the printer have covers for their openings, and locks associated with those covers. Preferably, the locks are controllable from the input units via the controller. In this way, the data on the material in a locked bin may be kept confidential until the appropriate user releases the lock. The controller may arrange that transmission of a release signal to a particular bin may be only from an input unit on which the respective job originated. Alternatively, the release of a particular lock may be associated with a code input to a lock controller connected to the printer. This aspect of the present invention may be independent, or may be combined with either or both of the first two aspects of the present invention discussed above.

In the above discussion, the aspects of the present invention were concerned with components of a printing system. The present invention also relates to a data printing system having at least one input unit, a controller, and a printer, in which any combination of the above aspects may be embodied. Furthermore, although the above discussion has concentrated on the structure of a printing system, and components thereof, the present invention also relates to a method of printing using one or more of the above aspects.

BRIEF DESCRIPTION OF THE DRAWINGS

Embodiments of the present invention will now be described in detail, by way of example, with reference to the accompanying drawings, in which:

FIGS. 14 to 20 are further flowcharts showing respective parts of the processing of FIG. 9 in more detail;

DETAILED DESCRIPTION

A first embodiment of the present invention will now be described, referring to FIGS. 1 to 6.

Figure 1:
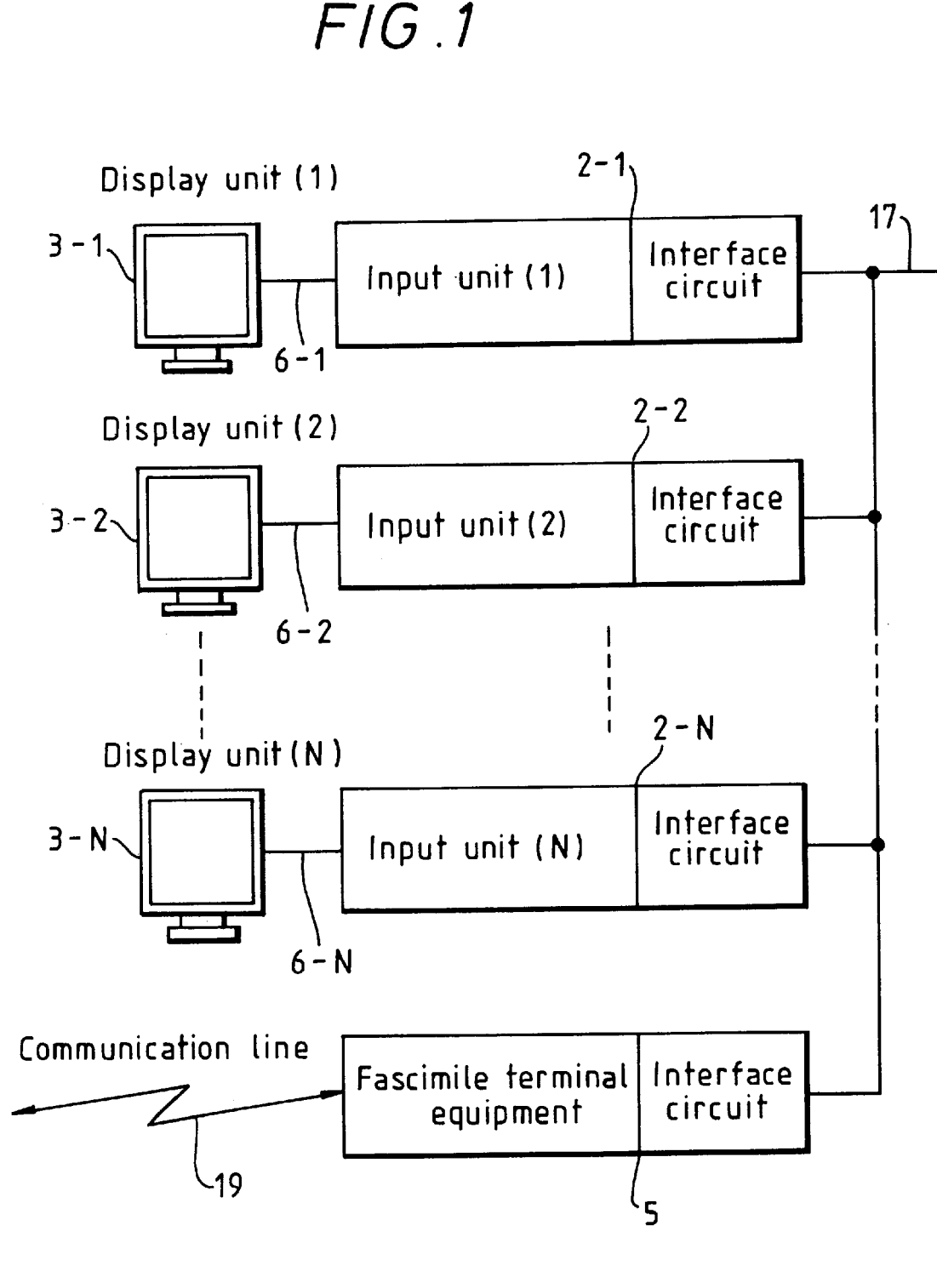
FIG. 1 is a block diagram of a printing system forming a first embodiment of the present invention.

FIG. 1 is a schematic view of a shared printer system which is an embodiment of the present invention. A plurality of input units 2-1, 2-2, - - - , and 2-N are connected to a main controller 1 via a network 17, over which communication can occur in either direction. The input units 2-1 to 2-N are connected to display units 3-1 to 3-N via interface cables 6-1 to 6-N. The main controller 1 is connected to an output unit (printer) 4 via an interface cable 18. The network 17 is connected to facsimile terminal equipment 5 which is connected to an external system via a communication line 19. The input units 2-1 to 2-N and the facsimile terminal equipment 5 are provided with interface circuits to permit them to be connected to the network 17.

The main controller 1 comprises a CPU 6, an interface circuit 7, a program ROM 8, a bulk memory 12, a memory interface 13, a buffer memory 9, a character generator 10, an output data loading circuit 14, a bit map memory 15, an output interface 11, and an internal bus 16. The CPU 6 processes data which is inputted from the network 17 via the interface circuit 7 on the basis of the logic stored in the program ROM 8.

Figure 2:
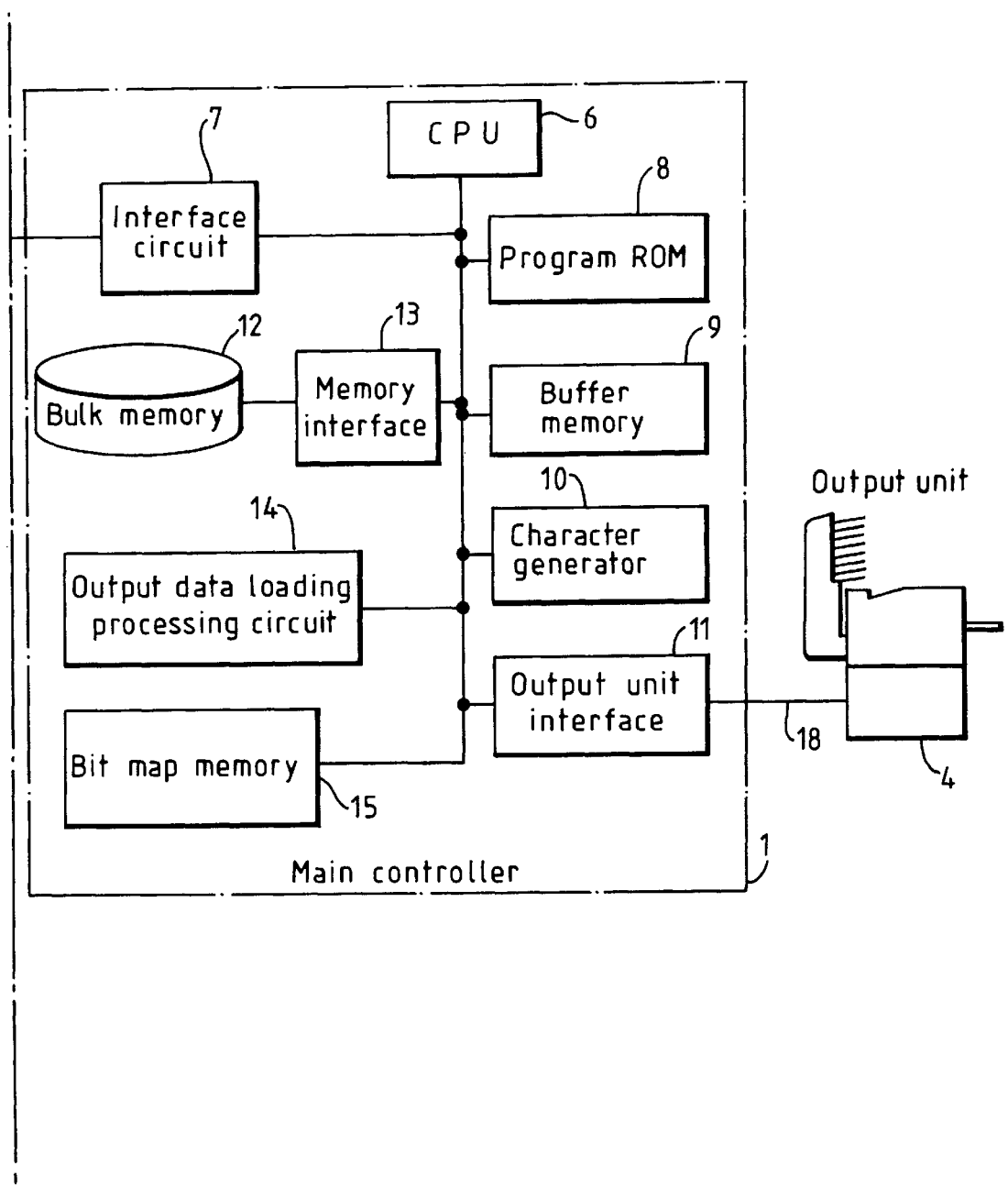
FIG. 2 is a flowchart of data and control signals in the system of FIG. 1.

FIG. 2 shows a flow chart of data and signals between the input units 2-1 to 2-N, the display units 3-1 to 3-N, the main controller 1, and the output unit 4 of the shared printer system shown in FIG. 1.

If the main controller 1 has not received any data and the output unit 4 is ready for printing when the main controller 1 receives input data 21 in the form of a job from the input unit 2-2 (line 2 in FIG. 2), the main controller 1 processes print data in the bit map memory 15 using the character generator 10 and the output data loading processing circuit 14 and outputs it to the output unit 4 as output data via the output interface 11. The output unit 4 carries out an output operation (printing) 22 on said output data and outputs a print completion signal 34 to the main controller 1 when the printing is completed. When the input unit 2-1 (line 1 in FIG. 2) needs to know whether printing is occurring in the shared printer system, the input unit 2-1 sends a display request signal 23 to the main controller 1. The input unit 2-1 outputs the display data 24 to the display unit 3-1. The operator of the input unit 2-1 notes the contrast of the display of the display unit 3-1 and outputs input data 25 to the main controller 1. The main controller 1 receives that input data 25, and it stores the data in the bulk memory 12 via the memory interface 13 because the output unit 4 is currently executing a printing operation 22 for the input data 21 and hence the main controller 1 cannot output the input data 25 to the output unit 4. In a similar way, the operator of the input unit 2-N (line N in FIG. 2) recognizes that the input data 25 is in the standby state by checking the display data obtained by a display request 26.

When there is data which needs to be printed earlier than the input data 25, input data 28 to which is added an instruction indicating a higher order of priority than the input data 25 can be sent to the main controller 1. The relevant operator on input unit 2-N can then check that the main controller 1 will perform the specified processing by display data 30 obtained by a display request 29. When the main controller 1 receives the print completion signal 34 for the input data printing operation 22, it prints and outputs input data 35 (corresponding to data 28) with a higher order of priority than the input data 25. When the main controller 1 receives a print completion signal 37 for the print operation 36 of the input data 35, it outputs input data 38 (corresponding to data 25) and allows printing operation 39 of said data 38 to be executed. Processing moves to the next operation when the controller 1 receives an output completion signal 40. In FIG. 2 reference numerals 31 to 33 indicate input data, a display request, and display data of the input unit 2-3 (corresponding to line 3 in FIG. 2).

FIG. 3(a) shows the content (items) of data to be transferred from the input units 2-1 to 2-N to the main controller 1. That transferred data contains data representing an input unit No. item 41, an outputter code item 42, a transfer data priority item 43, a document name item 44, a scheduled execution time item 45, a desired end time item 46, an output paper count item 47, a paper size item 48, a paper type item 49, a color specification item 50, a double-side print specification item 51, a sorter bin No. output specification item 52, a sorter bin fetch inhibition or release specification item 53, a top stacker output specification item 55, a graphic item 56, and a print data item 57. A keyboard is used to supply such data to the input units 2-1 to 2-N.

FIG. 3(b) shows the content (items) of data relating to the status of the output unit 4 which is transferred from said output unit to the main controller 1. That transferred data contains data representing a serious fault occurrence item 58, a first cassette paper size item 59, a first cassette paper type item 60, a first cassette paper count item 61, a "n"th cassette paper size item 62, a "n"th cassette paper type item 63, a "n"th cassette paper count item 64, a first sorter bin cumulative paper count item 65, a "n"th sorter bin cumulative paper count item 66, a top stacker cumulative paper count item 67, a bulk bin cumulative paper count item 68, a paper jam part item 69, a photosensitive drum life item 70, a developer life item 71, a toner shortage item 72, a pickup roller life item 73, a fixing unit life item 74, a charging unit life item 75, a transfer unit life item 76, a service man call: optical unit item 77, a service man call: main motor item 78, and a service man call: fixing unit item 79. The service man call data may additionally contain error information for another unit, when necessary.

Figure 3:
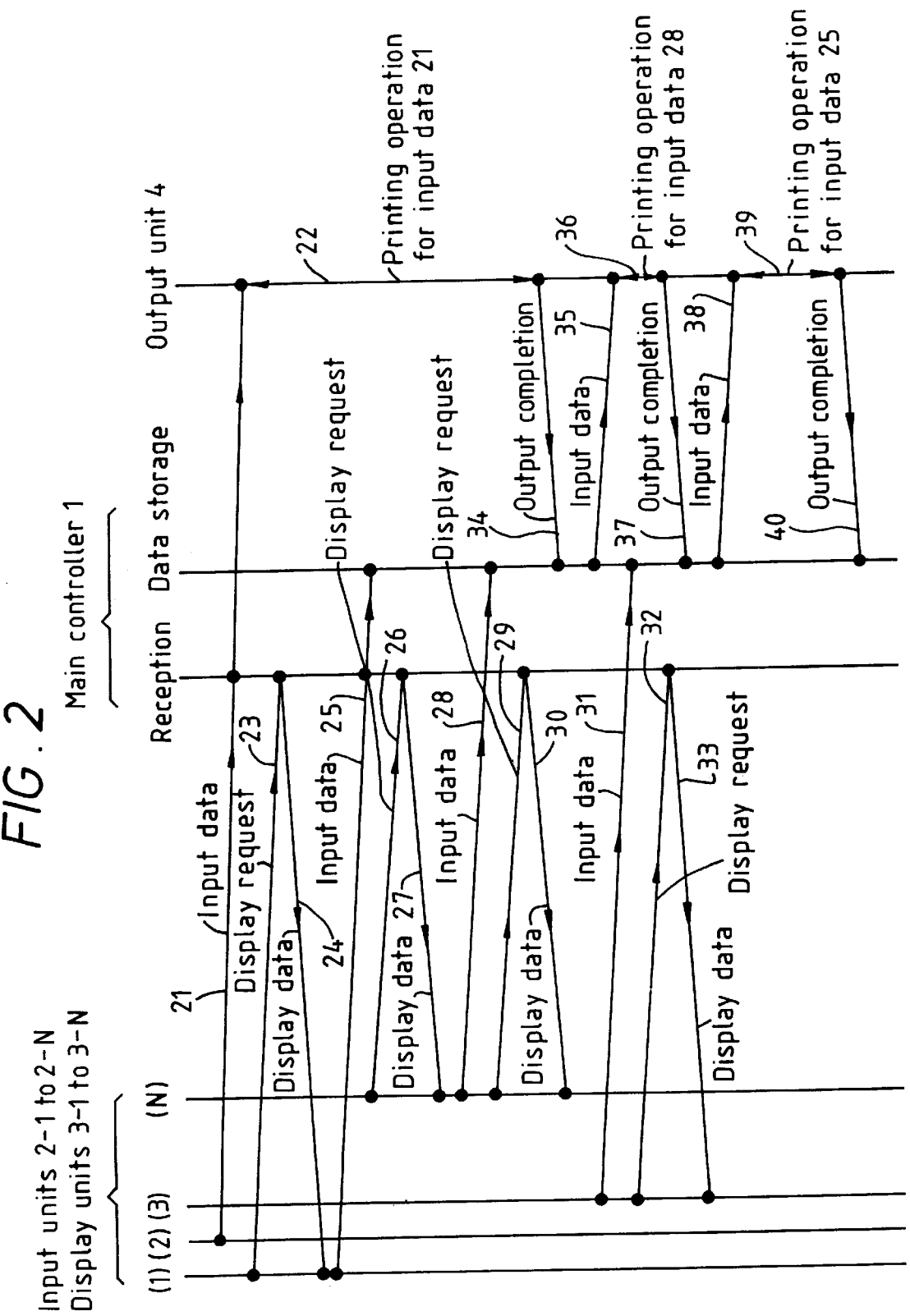
FIGS. 3($a$) and 3($b$) show a data transmitted to the controller of the system of FIG. 1, from an input unit and an output unit (printer) respectively.
Figure 4:
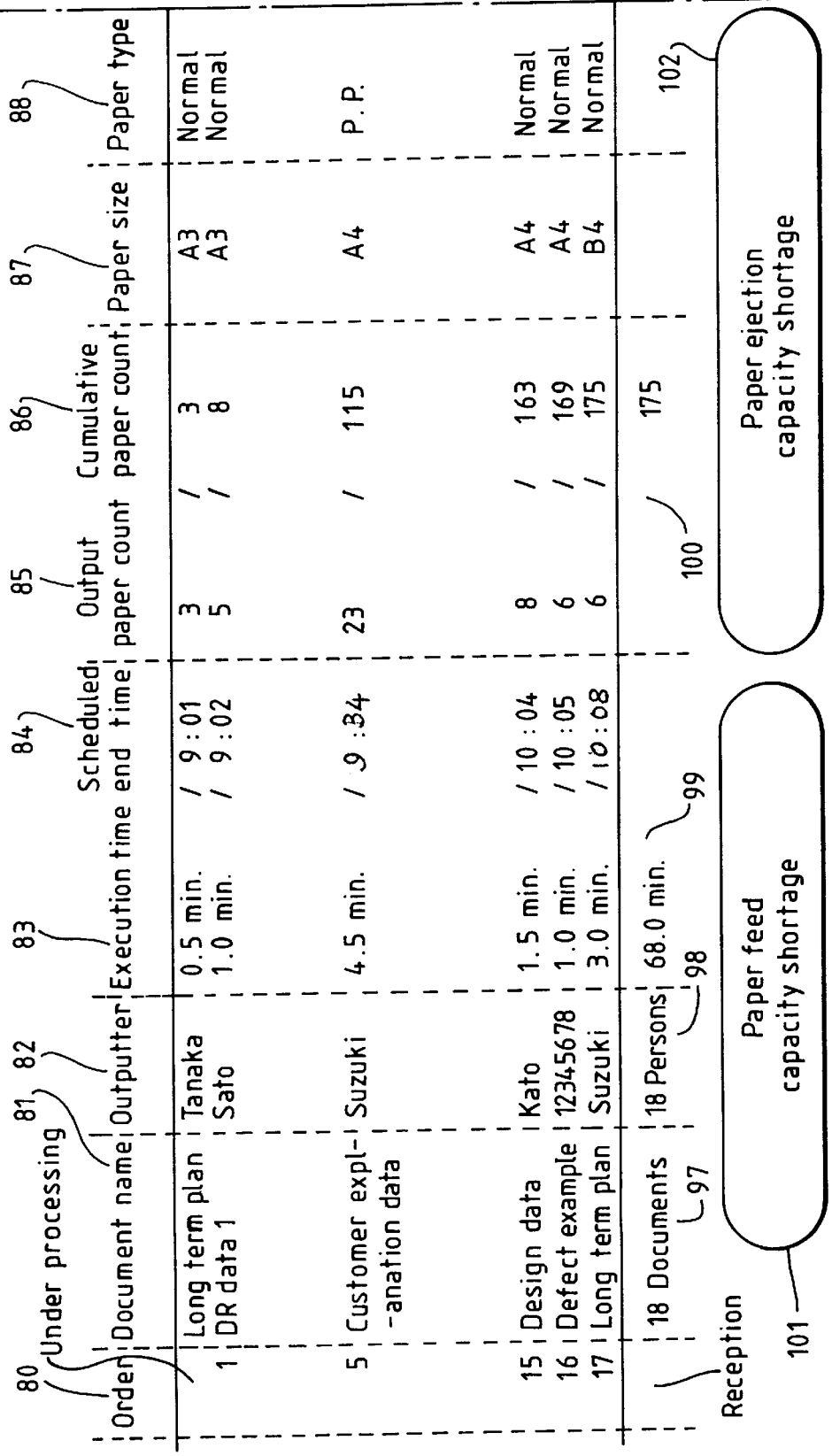
FIG. 4 shows a status display for the system of FIG. 1.

FIG. 4 shows status display screens displayed on the display units 3-1 to 3-N. The display shown has information arranged in columns including an order column 80 for jobs which are processed by the main controller 1. The term job corresponds to a set of data shown in FIG. 3 (a) which is received by the main controller 1 from the input units 3-1 to 3-N. The other columns displayed include a document name column 81, an outputter column 82, an execution time column 83, a scheduled end time column 84, an output paper count column 85, a cumulative paper count column 86, a paper size column 87, a paper type column 88, a color column 89, a double-side column 90, a sorter bin column 91, a top stacker column 92, a bulk bin column 93, a character column 94, a graphic column 95, a priority column 96, a received document total column 97, an outputter count column 98, an execution time total column 99, and a cumulative paper count column 100. Furthermore, additional information may be displayed in a paper feed capacity shortage job identification mark column 101 or a paper ejection capacity shortage job identification mark column 102.

Figure 5:
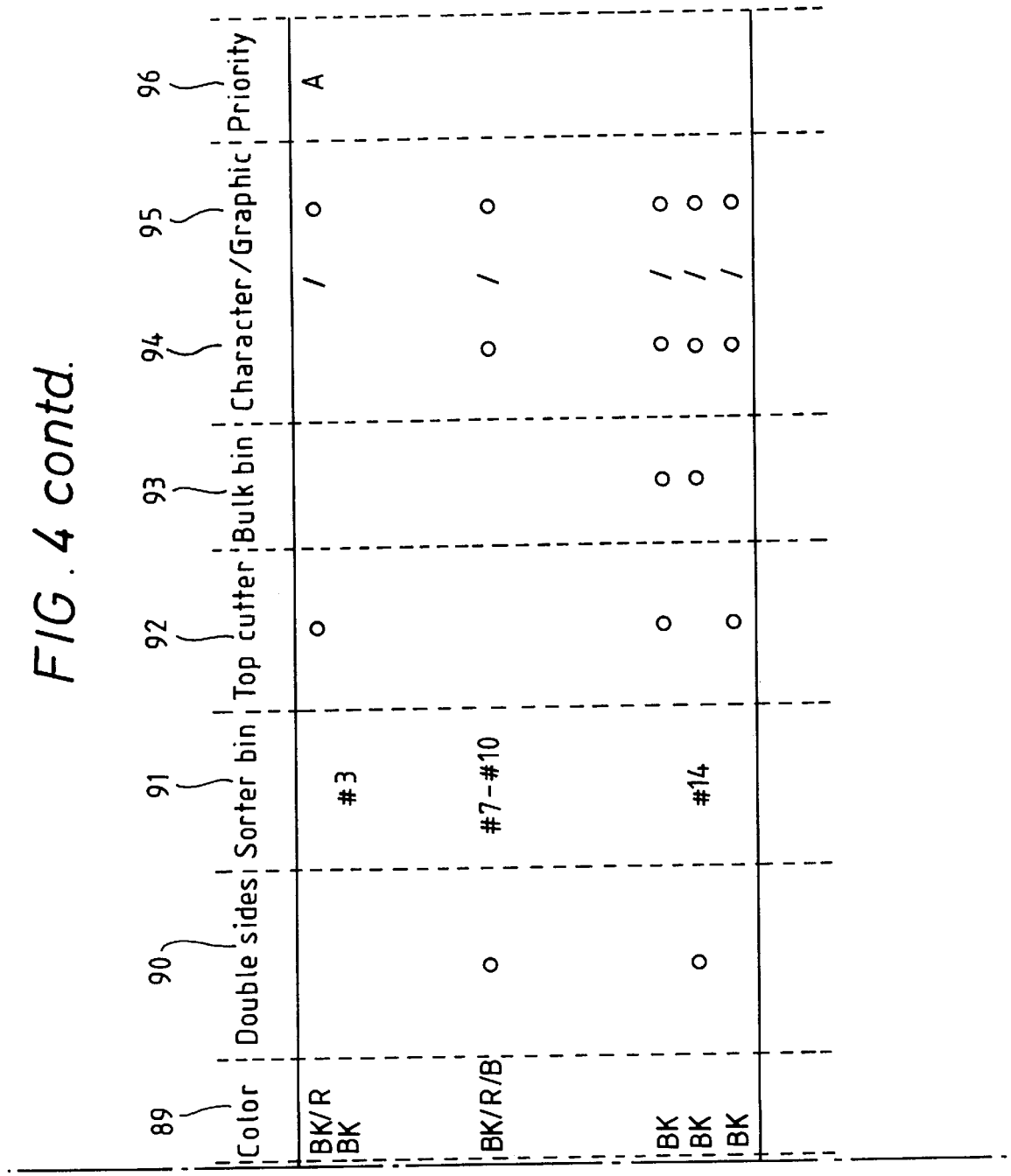
FIG. 5 illustrates data transmitted from the controller to an input unit in the embodiment of FIG. 1.

To display the above information on the display units 3-1 to 3-N, the main controller 1 transfers data for the items shown in FIG. 5 to the input units 2-1 to 2-N. The transferred data is data representing a job order item 110, a document name item 111, an outputter item 112, a scheduled execution time item 113, a scheduled end time item 114, an output paper count item 115, a cumulative paper count item 116, a paper size item 117, a paper type item 118, a color specification item 119, a double-side print specification item 120, a sorter bin No. output specification item 121, a top stacker output specification item 122, a bulk bin output specification item 123, a character or graphic item 124, a priority item 125, a paper feed capacity shortage item 126, a paper ejection capacity shortage item 127, and a jam part item 128.

Figure 6:
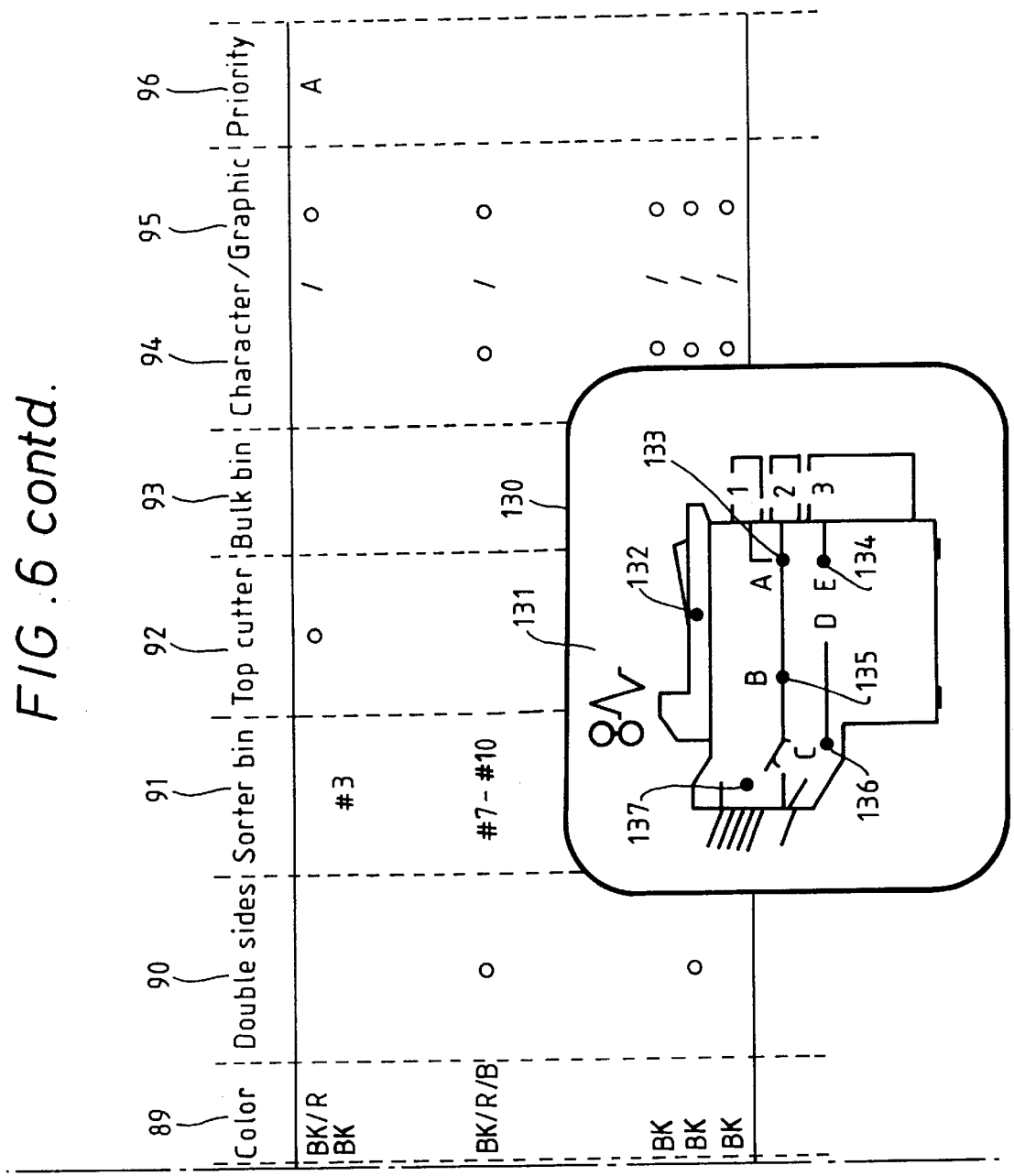
FIG. 6 shows a further status display.

FIG. 6 shows status display screens displayed on the display units 3-1 to 3-N when an error occurs in the output unit. The Figure shows an example of such a display when a jam has occurred in the output unit 4. In the example, a jam display symbol 131 is displayed in the jam display area 130, and consists of display marks 132 to 137 corresponding to the location of the jam part, which symbol blinks so as to warn operators of the shared printer system that a jam has occurred.

Figure 7:
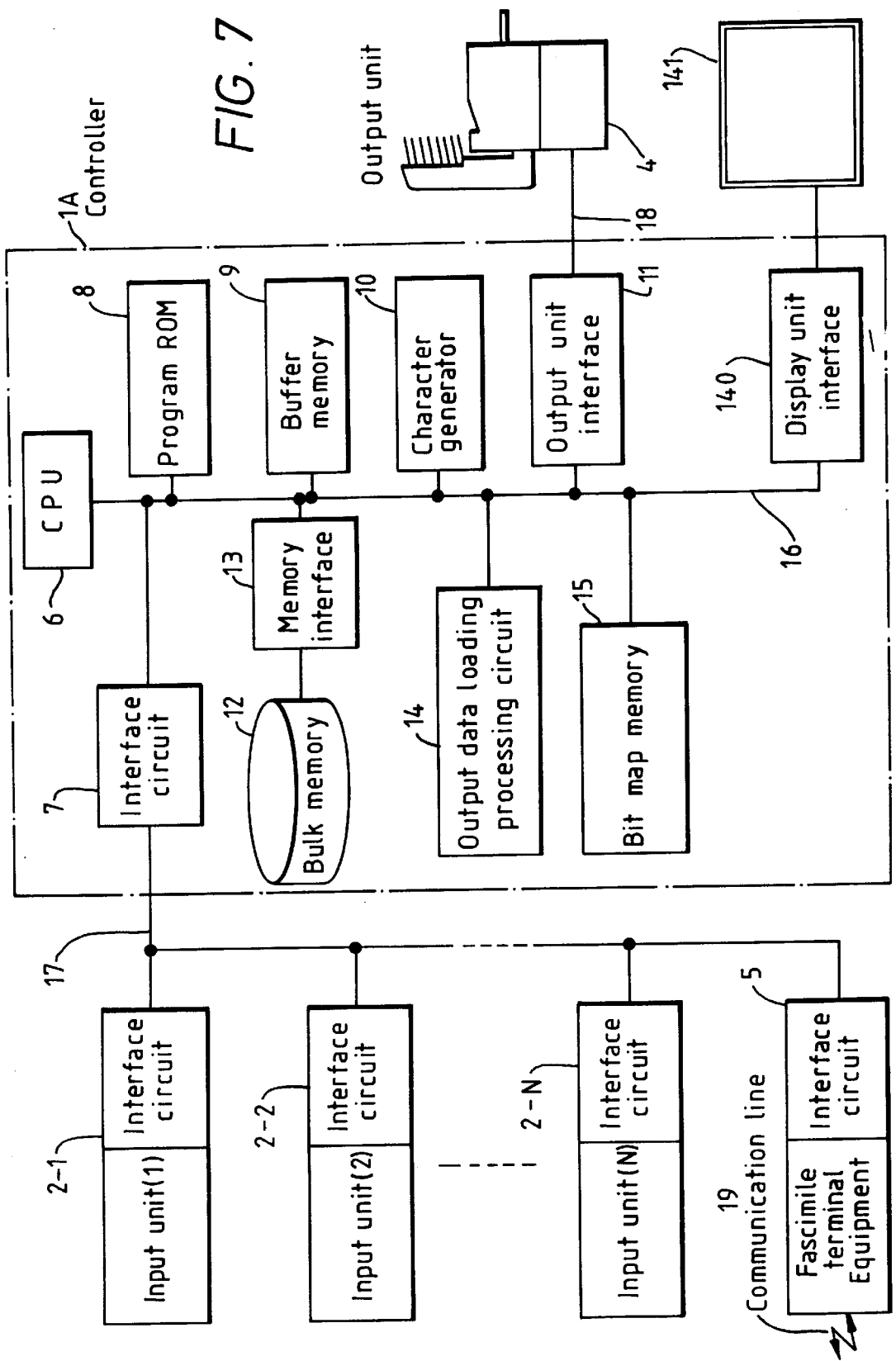
FIG. 7 shows a printing system forming a second embodiment of the present invention.

FIG. 7 shows a second embodiment of a shared printer system of the present invention. This second embodiment is generally similar to the first embodiment of FIG. 1, and corresponding parts are indicated by the same reference numerals. However, in this second embodiment, a common display unit 141 is connected to a main controller 1. Furthermore, the main controller 1 has a display unit interface 140 which outputs display data to the display unit 141. The display unit 141 is located so that it can be seen by a plurality of users.

Figure 8:
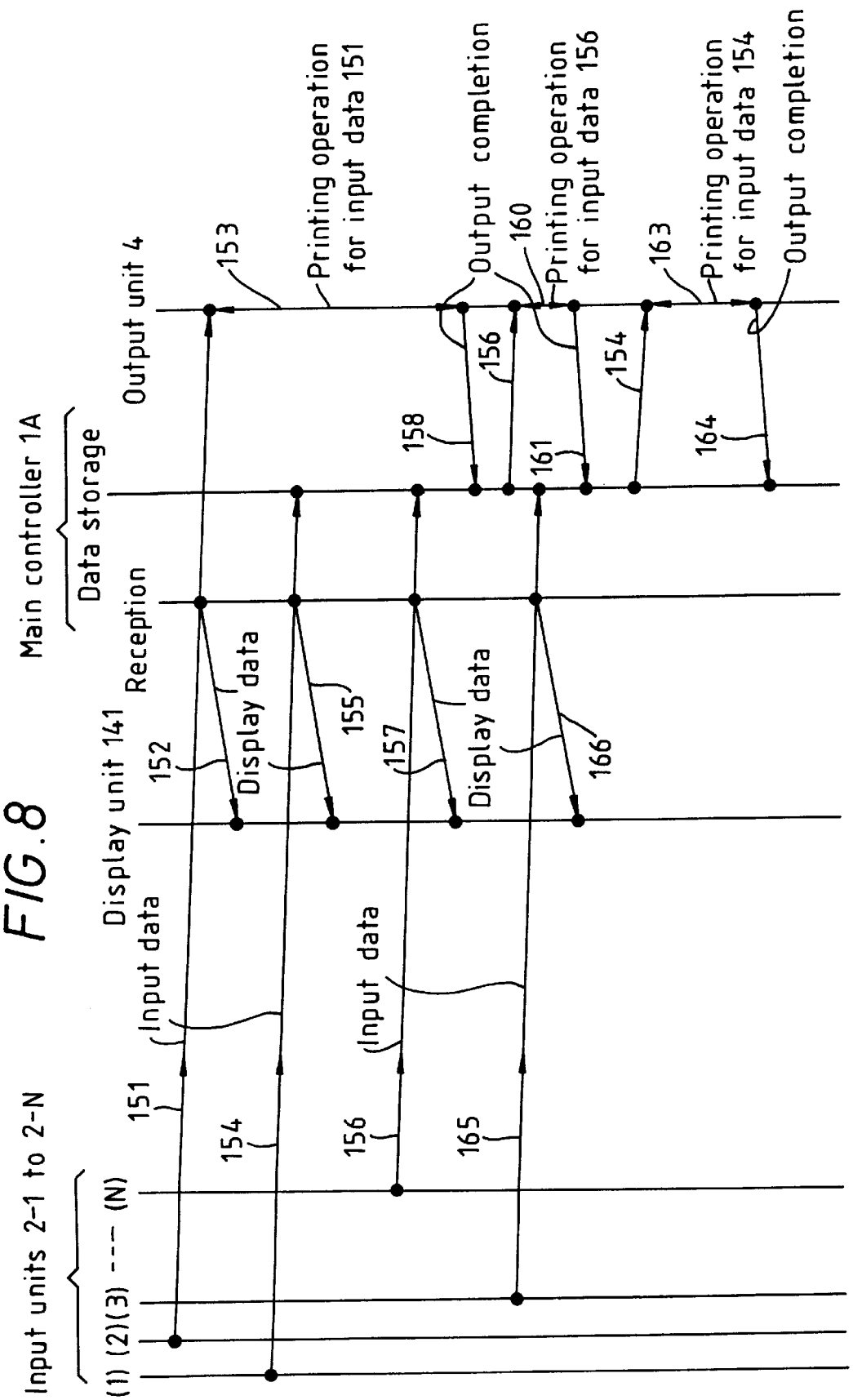
FIG. 8 is a flowchart of data and control signals in the embodiment of FIG. 7.

FIG. 8 shows a flow chart of data and signals between the input units 2-1 to 2-N, controller, output unit 4, and display unit 141 of the configuration shown in FIG. 7.

When input data 151 is inputted to the main controller 1 from the input unit 2-2 (line 2 in FIG. 8), the main controller 1 creates display data 152 in accordance with the content of that input data and displays it on the display unit 141 in the format shown in FIG. 4. The main controller 1 loads print data in the bit map memory 15 and outputs it to the output unit 4, and then causes the output unit 4 to execute a printing operation 153 on said input data. Since the processing status of the shared printer system is always displayed on the display unit 141, the operator of each of the input units 2-1 to 2-N can create input data on the basis of that content of the display of the display unit 141 and send that input data to the main controller 1.

The main controller 1 stores input data 154, which is inputted from the input unit 2-1 (line 1 in FIG. 8) to the main controller 1 during the printing operation 153 on the input data 151, in a bulk memory 12 and that data 151 is stored there. The corresponding information is displayed on the display unit 141 using display data 155. The operator of the input unit 2-N (line N in FIG. 8) may thus recognize that the input data 154 is in the standby state by checking the content of the display on the display unit 141, The user of the input unit 2-N may then create input data 156 having an instruction with a higher order of priority than the data 154, and send the data 156 to the main controller 1. The main controller 1A outputs the input data 156 and then the input data 154 to the output unit 4 according to this priority so as to permit printing operations 160 and 163.

The main controller 1 also stores the input data 156 in the bulk memory 12, displays the relevant information on the display unit 141, on the basis of displaying data 157, reads the input data 156 from the bulk memory 12 when it receives a completion signal 158 for the printing operation 153, supplies the data 156 to the output unit 4 so as to execute the printing operation 160, and reads the input data 154 when it receives a completion signal 161 so as to execute the printing operation 163. During this period of time, the main controller 1 stores the input data 165 from the input unit 2-3 in the bulk memory 12, displays it on the display unit 141 as display data 166, and prints the input data 165 following a completion signal 164 for the printing operation 163.

Figure 9:
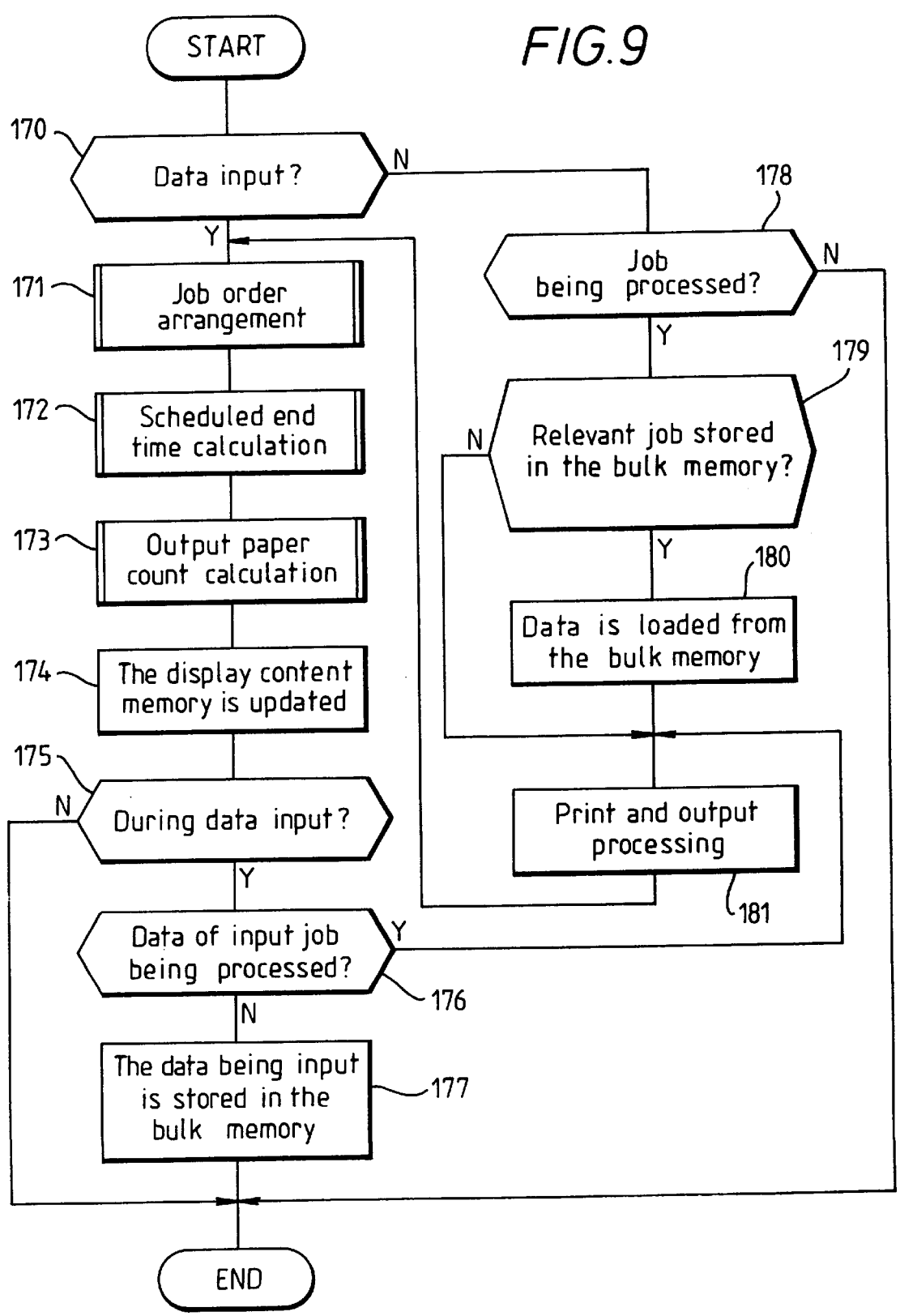
FIG. 9 is a flowchart showing basic processing steps of the printing system of the embodiment of FIG. 1 or FIG. 7.

FIG. 9 shows the main processing steps of the control program stored in the program ROM 8 for the CPU 6 of the main controller 1 to permit the control described above to occur.

At a step 170, it is decided whether said main controller 1 receives data. When data is input, the processing shifts to a step 171 and the order of the jobs, which are to be printed by the output unit 4, is determined. The result is displayed in the order column 80 shown in FIG. 4. Next, at a step 172, the scheduled end time of each job is calculated in dependence on the job order. The result is displayed in the scheduled end time column 84 shown in Fig.4. Next, the output paper count is calculated at a step 173. The result is displayed in the cumulative paper count column 86 shown in FIG. 4. At a step 174, information contained in input data, such as the document name, outputter, execution time, and output paper count, is stored in the display content memory. The display content memory is in the buffer memory 9 of the main controller 1. When the system configuration is as shown in FIG. 1, the information is transferred to the input units 2-1 to 2-N whenever a display request is supplied to the main controller 1 from said input units 2-1 to 2-N. When the system configuration is as shown in FIG. 7, the information is transferred to the display unit 141 whenever the content of the display content memory is updated. Next, at a step 175, it is decided whether further data is being input. At a step 176, it is then decided if the data, which is currently being input, is a job currently being processed. When the data is of a job not currently being processed, processing shifts to a step 177 and the data being input is stored in the bulk memory 12. When the data being input is of a job currently being processed at a step 176, processing shifts to a step 181. The print data is loaded in the bit map memory 15, and a print and output unit, which outputs data to the output unit 4, is operated. When the print and output processing is finished, processing returns to the step 171, and the job order arrangement, scheduled end time calculation, output paper count calculation, and display content memory update are executed again.

When no data is input at the step 170, processing shifts to a step 178, and a check is made as to whether a job is currently being processed. If a job is being processed, processing shifts to a step 179, and a check is made whether the data of the relevant job is stored in the bulk memory 12. When the data is so stored, processing shifts to the step 180, the data is loaded in the buffer memory 9 from the bulk memory 12, and the print and output processing is executed at a step 181. When the data is not stored in the bulk memory 12, processing shifts to a step 181 and the foregoing print and output processing is executed.

Figure 10:
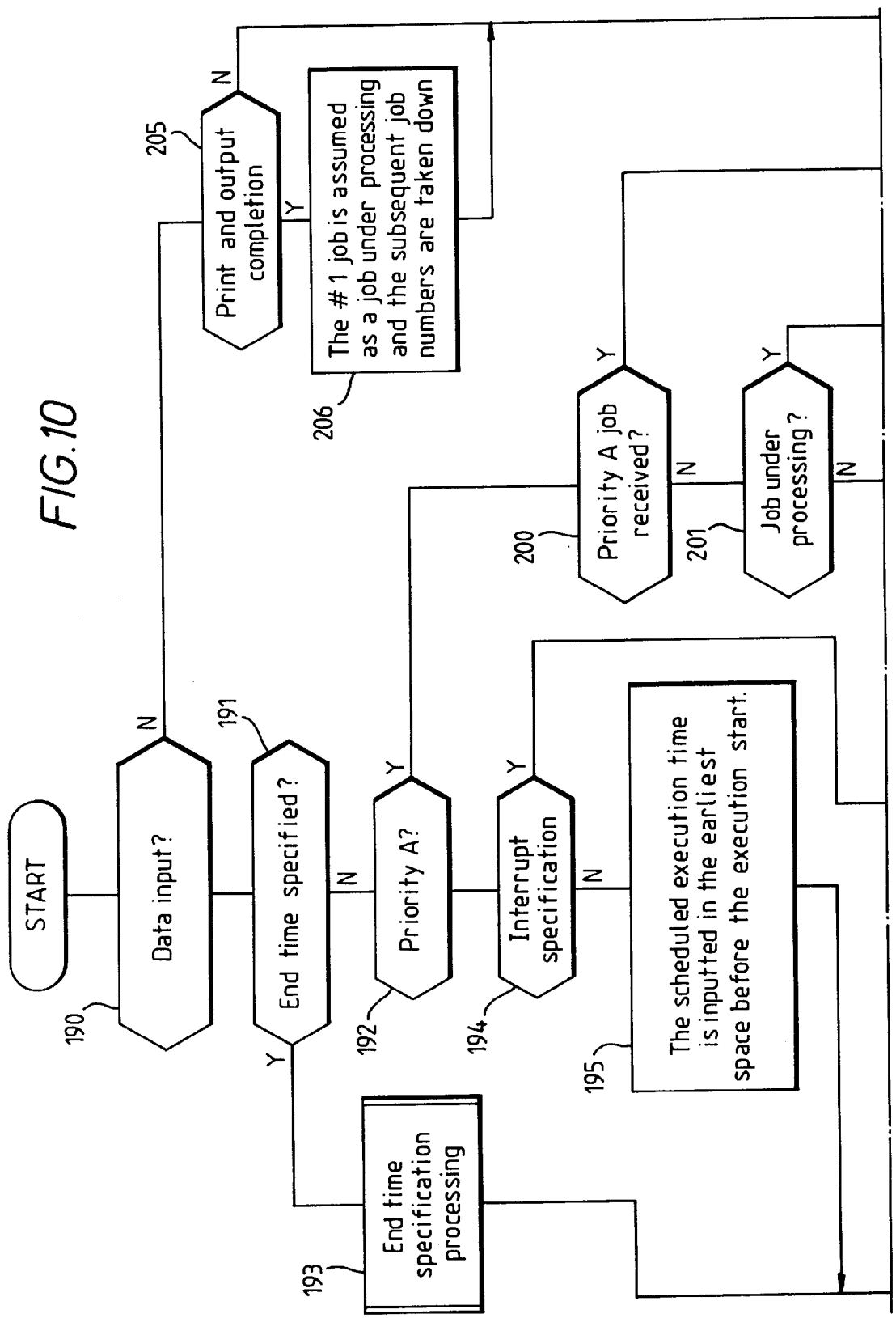
FIG. 10 is a flowchart showing in more detail the processing steps of part of processing shown in the block diagram of FIG. 9.
Figure 11A:
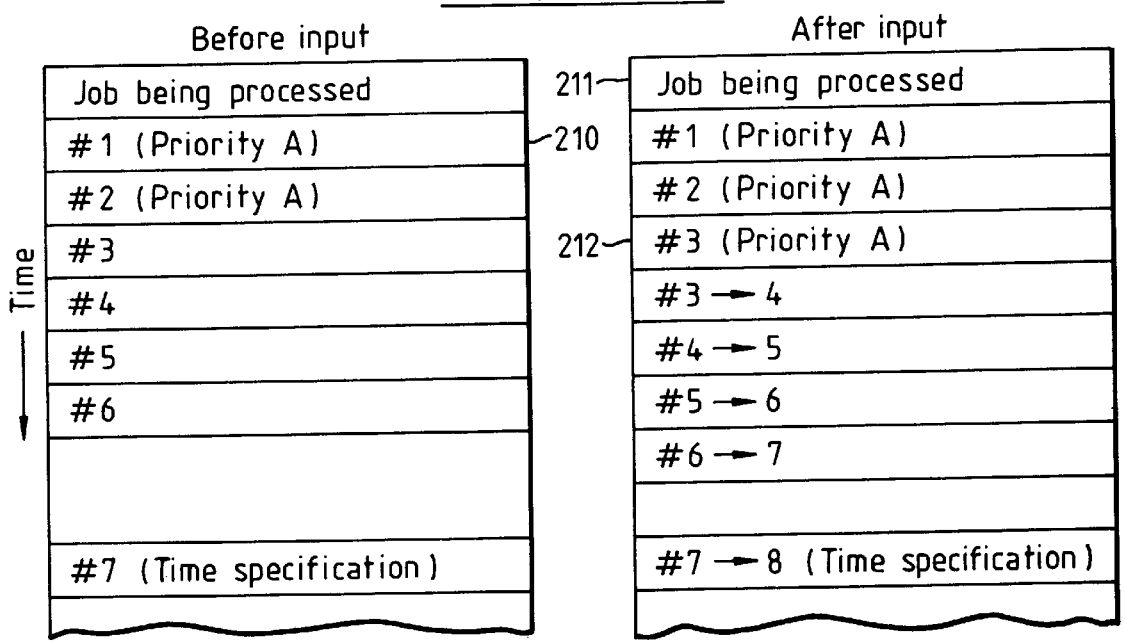
FIG. 11 shows job sequence tables.
Figure 11B:
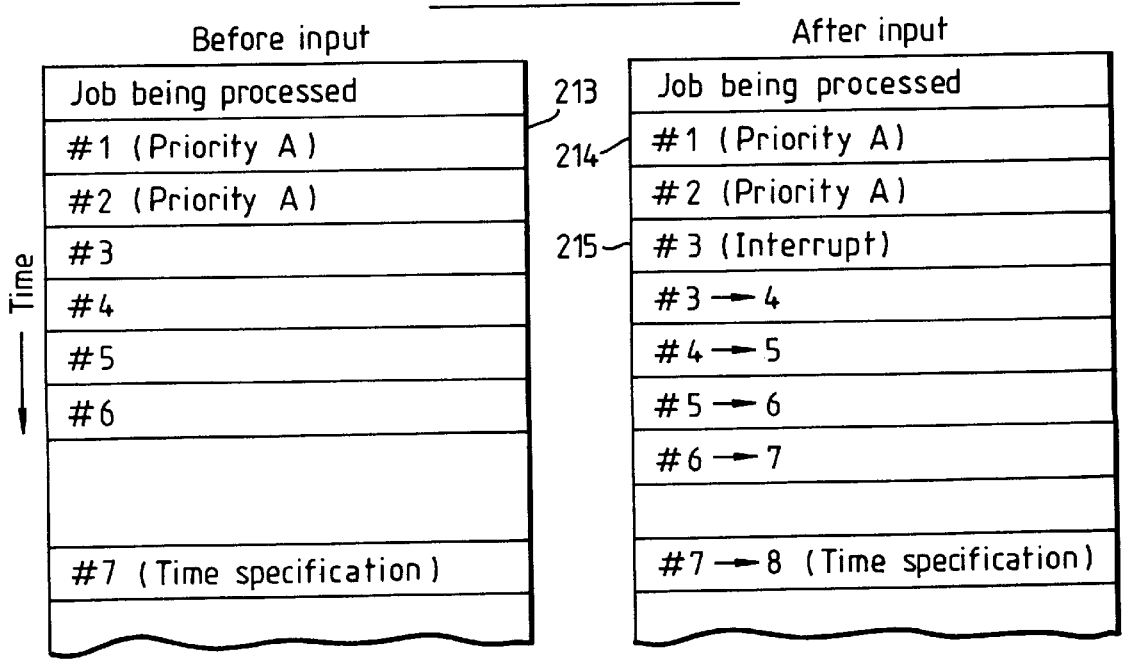
Figure 11C:
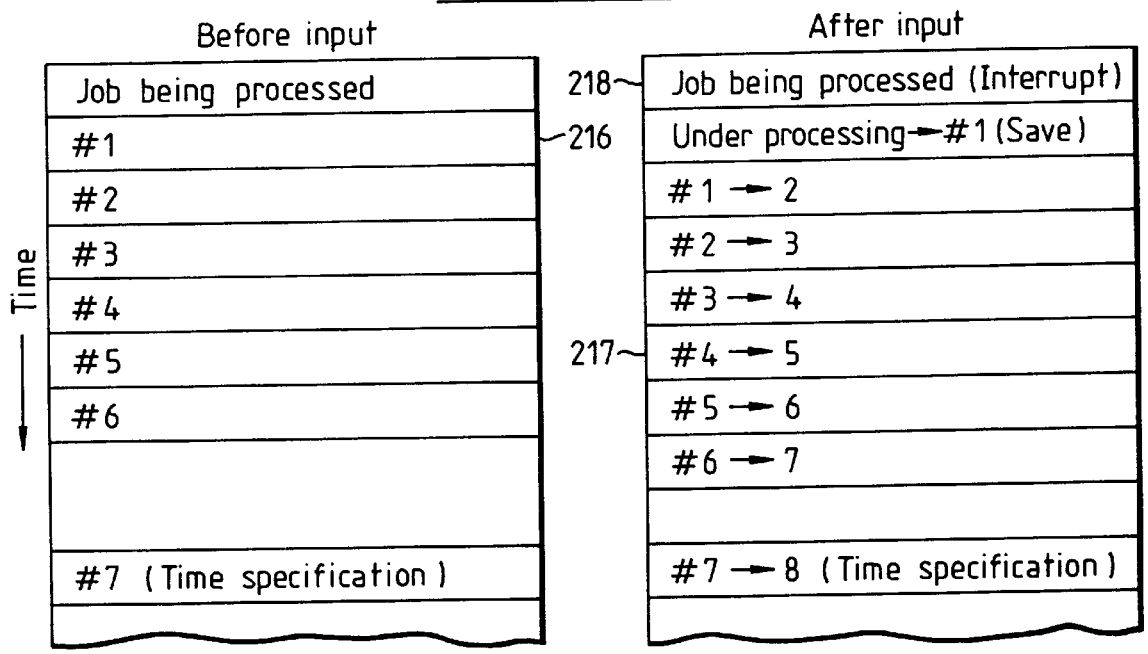
Figure 11D:
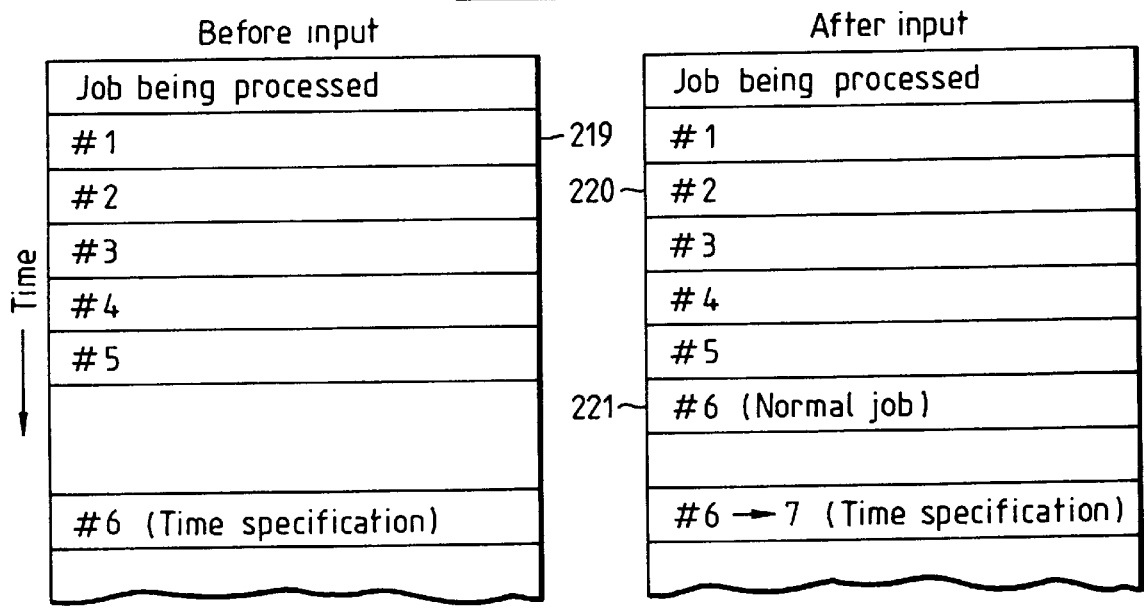

FIG. 10 shows the job order arrangement processing 171 in greater detail.

When the end time is specified when the data is input, i.e. a value is provided in the desired end time item 46 shown in FIG. 3(*a*), end time specification processing is performed at a step 193. When the end time is not specified, a check is made as to whether the priority of the job is the top priority A, at a step 192. When the priority is A, a check is made as to whether a job with the priority A has been received, at a step 200. When no job with the priority A has been received, a check is made as to whether there is a job currently being processed at a step 201. When no job is currently being processed, the job with the priority A, which is currently being received at the step 203, is handled as the job to be processed immediately. When there is a job currently being processed at step 201, the job number, which is currently received at a step 204, is assumed as 1, and the job numbers other than the job with priority A, which already have been received, are revised. The job number represents the place in the currently intended sequence of printing of received jobs of a particular job, and is thus subject to change if that sequence is revised. For example, the job number 1 shifts to 2 and the job number 2 shifts to 3. The time specification job should be assigned a job number which will not affect the time. When a job with priority A has already been received at step 200, the job with priority A which is currently being received at step 202, is given a position in the sequence immediately following the last of the jobs with priority A which have already been received. In this case, the job numbers of jobs other than those with priority A are revised. Again the time specification job should be assigned a job number which will not affect the time.

When an interrupt is specified at a step 194, a check is made as to whether a job with priority A was already received at a step 196. When such a job was already received, the job with priority A, which is currently being received, is given a position in the sequence immediately following the last of the jobs with priority A, and the subsequent job numbers are revised. The time specification job should be assigned a job number which will not affect the time. When no job with priority A has been received at step 196, a check is made as to whether there is a job currently being processed at a step 198. When a job is currently being processed, the job currently being processed at a step 199 is halted and saved, and the job number is assumed as 1. Then, the job numbers are revised, though the time specification job should be assigned a job number which will not affect the time. When there is a job currently being processed at step 198, the job, which is currently being received at the step 203, is handled as a job currently being processed. When an interrupt is not specified at the step 194, the priority of the job is normal. The scheduled execution time of said job is input at the step 195, and the job is set in the earliest space until the execution starts. When no data is input at step 190 and the print and output processing is finished at a step 205, the job No. 1 at the step 206 is handled as the job currently being processed and then the job numbers are revised.

Next, an example of the processing which has been described with reference to FIG. 10, will be discussed below. FIG. 11(*a*) shows how to change the job number of a job priority A which is input to the controller 1. Jobs are listed in a memory order area, as shown by a table 210, and the jobs being processed are executed in the order of #1, #2, - - - , and #7. The priority of jobs #1 and #2 is A, and a job with priority A 212, which is newly inputted, becomes the #3 job behind the #1 and #2 jobs. The job #3 and subsequent numbers are revised by one to #4, #5, and #8 after said job is inputted. In this case, the time specification job #8 is required to be set as shown in a reference code 211 so that the execution time is not affected. It will be appreciated that the references #1, #2, etc. represent the current order of processing of jobs input to the controller 1.

FIG. 11(*b*) shows how to input a job with priority A in the interrupt job input mode. The job arrangement before input of a job is shown by table 213. When an interrupt job 215 is input, it is put between the #2 job with priority A and the #3 job and assigned a job number of 3. The job number 3 and subsequent numbers before the new job is input are revised by one to #4, #5, - - - , and #8 after it is inputted as shown by table 214.

FIG. 11(*c*) shows how to input a job when no job with priority A is input in the interrupt job input mode and there is a job currently being processed. The job arrangement before inputting a job is indicated by table 216. When an interrupt job 218 is input, that job is handled as a job to be processed as shown by table 217 and the job, which is being processed before the new job was input, is handled as a save job and assigned a job number of 1. The job numbers behind the new job are revised by one to #2, #3, - - - , and #8.

FIG. 11(*d*) shows how to input a job with normal priority. The job arrangement before inputting a job is indicated by a table 219. A normal job 221 which is input is inserted into a space between the #5 job and the time specification job #6 and assigned a job number of 6. The subsequent job numbers are revised by one as shown by table 220.

Figure 12:
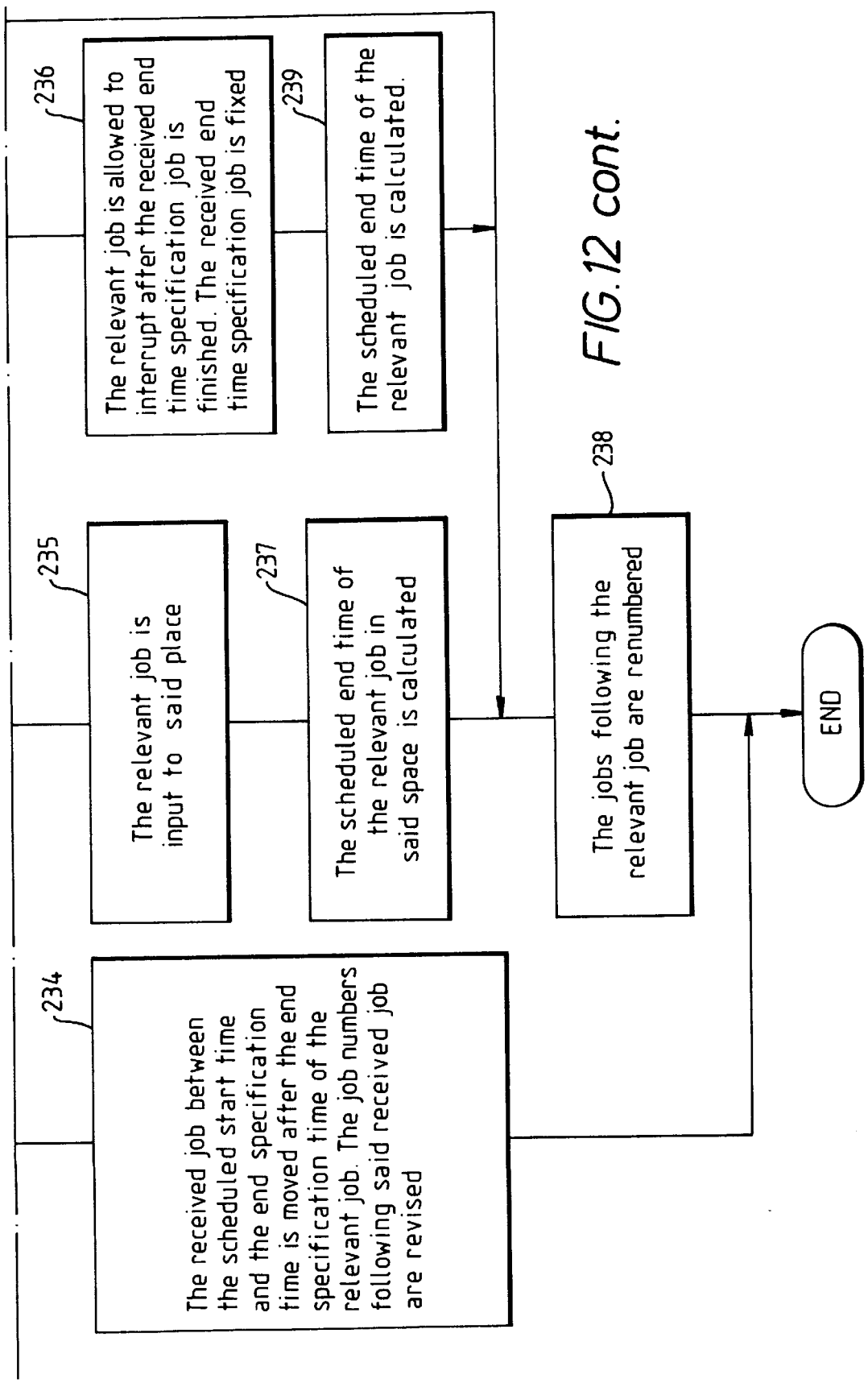
FIG. 12 is a flowchart showing in more detail processing steps of a further part of the processing shown in FIG. 9.

FIG. 12 shows end time specification processing. At a step 230, the scheduled start time is calculated by subtracting the required execution time from the end specification time. Then, a check is made at step 231 as to whether there is a job which is received between its scheduled start time and the end specification time. When such a job is found, a check is made at steps 232 as to whether that received job is a job which specifies the end time. When the received job is not a job which specifies the end time, the received jobs between the scheduled start time and the end specification time are moved to a position following the end specification time of the end time specification job at step 234. The job numbers behind said received job are revised by one.

When the received job at step 232 is the job which specifies the end time, a check is made at step 233 as to whether there is a space for the required execution time of the relevant job before the execution time of the received job. When there is such a space, the relevant job is input into that space at the step 235. Furthermore, the scheduled end time of the relevant job in that space is calculated at step 237. The job numbers behind the relevant job are revised by one.

When there is not a space where the relevant job is input before starting the received end time specification job at step 233, the relevant job acts as an interrupt at step 236 after the received end time specification job is completed. The received end time specification job is fixed. The relevant scheduled job end time is calculated at step 239 and the processing shifts to step 238.

When there is no received job found within the required execution time of the relevant job at step 231, the relevant job is assigned a specification time at step 240, and the processing shifts to step 238.

Figure 13B:
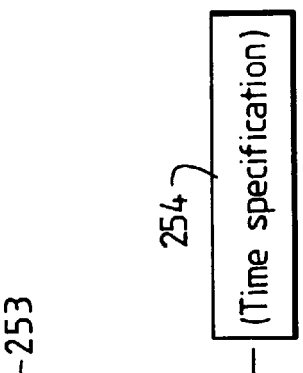
FIG. 13 shows further job sequence tables.

FIG. 13 shows an embodiment of the end time specification processing.

FIG. 13(*a*) shows how to input a time specification job 251 to the job arrangement shown by table 250. Since the job interferes with the #3 and #4 jobs which are not time specification jobs, the time specification job is inputted as a #3 job (line 251A of table 252), and the received #3 and #4 jobs are moved behind it as a job re-arrangement after the input of that time specification job. The job numbers are revised by one to 4 and 5.

FIG. 13(*b*) shows how to input a time specification job 254 to the job arrangement shown in table code 253. Since there is no received job which interferes with that job, the time specification job is inputted as a #3 job (line 254A of table 255) and the subsequent job numbers are revised by one as a job re-arrangement after input of the time specification job.

FIG. 13 (*c*) shows how to input a time specification job 257 to the job arrangement shown in table 256. Since the received time specification job #3 interferes with the job, the job is input into the space before the received time specification job and assigned a job number of 3 (line 257A of table 258) as a job arrangement after input. The received time specification job numbers are revised by one.

Figure 14:
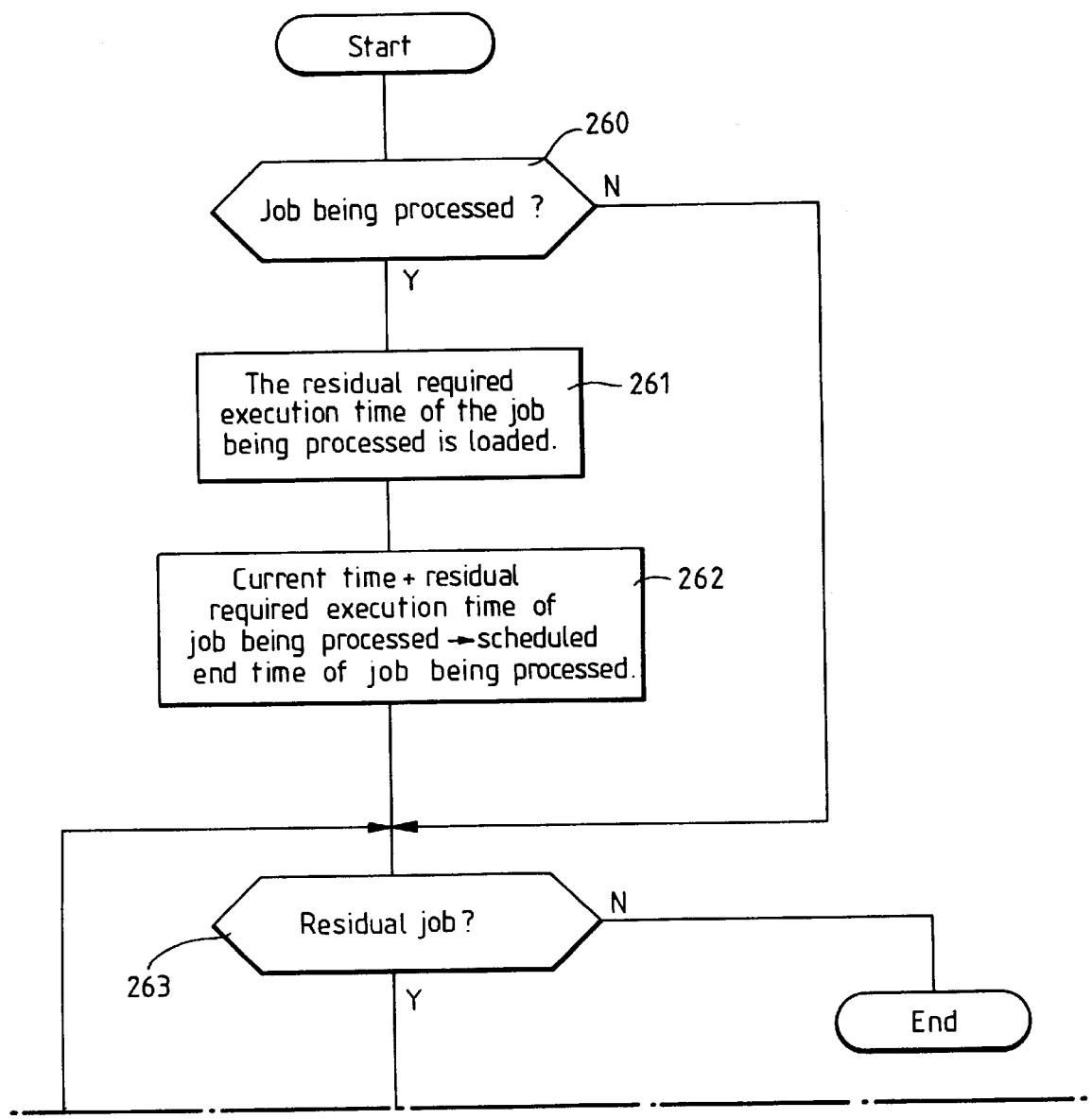
Figure 14:
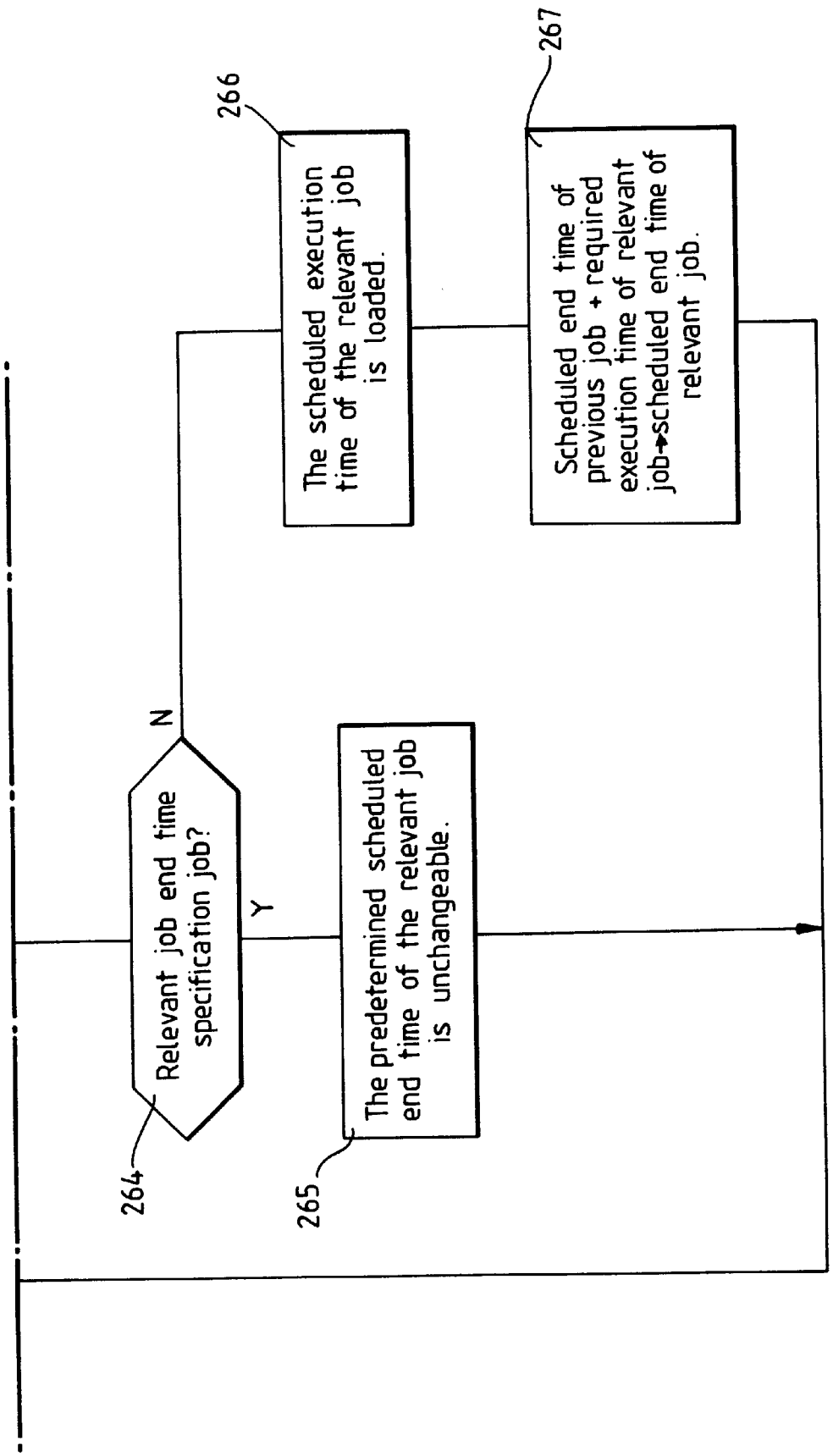

FIG. 14 shows calculation processing for each scheduled job end time. First, a check is made at step 260 as to whether there is a job being processed. When there is a job being processed, the residual required execution time of the job being processed is loaded at step 261, and the scheduled end time of the job being processed is calculated as the sum of the current time and the residual required execution time, at step 262. A check is made at step 2 as to whether there is(are) (a) residual job(s). When there is a residual job, a check is made at step 264 as to whether that job is a time specification job. When that job is a time specification job, said scheduled job end time, which is predetermined, is made constant at step 265. When the relevant job at step 264 is not a time specification job, the required execution time of the relevant job is loaded at step 266, and the scheduled end time of the relevant job is calculated by adding the scheduled end time of the previous job to the required execution time of the relevant job at step 267. When no job is being processed at step 260, processing jumps to step 263. When there is then no residual job, processing terminates.

Figure 15:
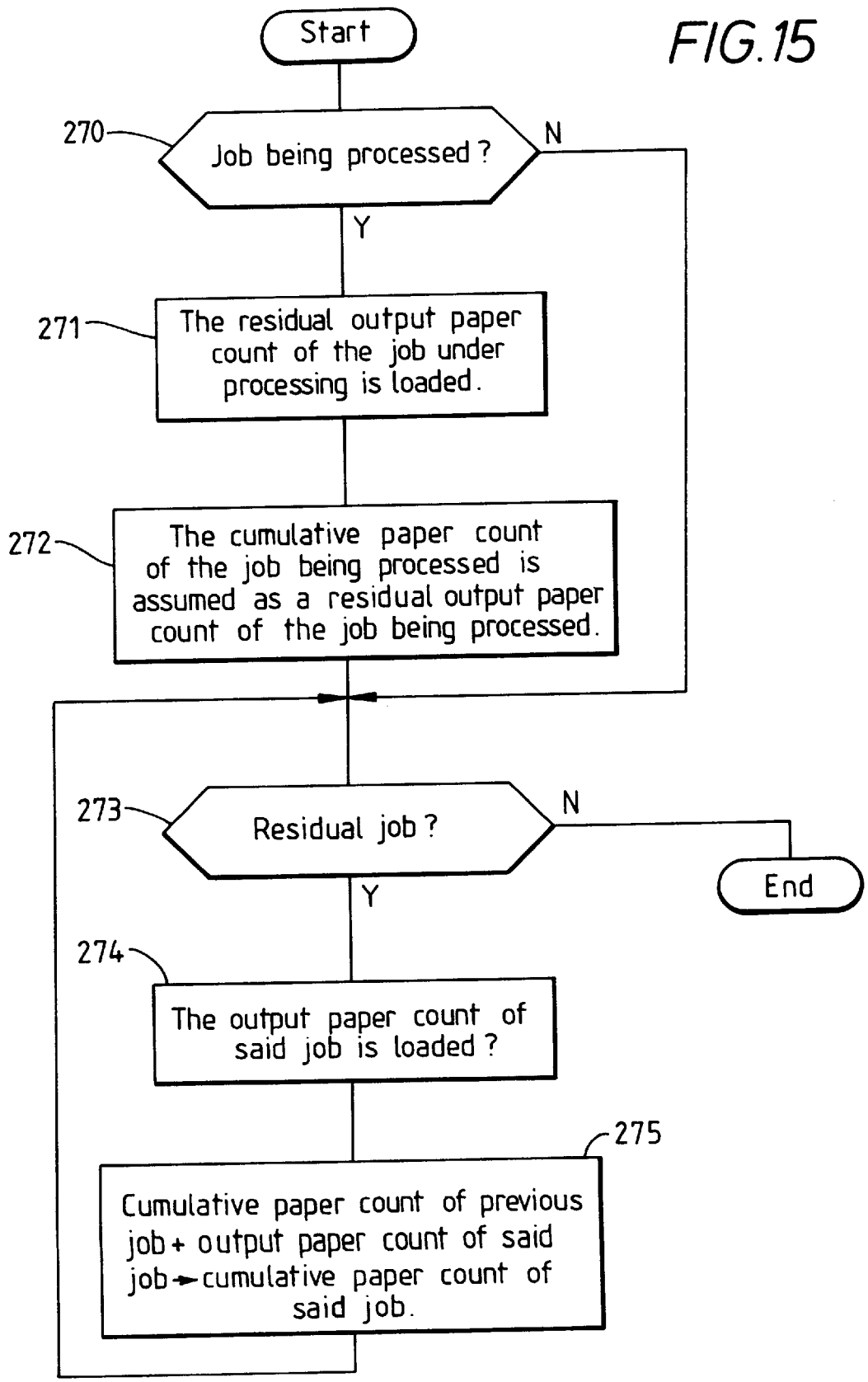

FIG. 15 shows cumulative output paper count calculation processing.

First, a check is made at step 270 as to whether there is a job being processed. When there is a job being processed, the residual output paper count of the job being processed is loaded at step 271. The cumulative paper count of the job being processed is handled as a residual output paper count of the job being processed at step 272. Furthermore, the presence or absence of a residual job is checked at step 273. When there is a residual job, the output paper count of that job is loaded at step 274, and the cumulative paper count of that job is calculated by adding the cumulative paper count of the previous job to the output paper count of that job, at step 275. Furthermore, the presence or absence of a residual job is checked at step 273. When there is no residual job, processing terminates.

Figure 16:
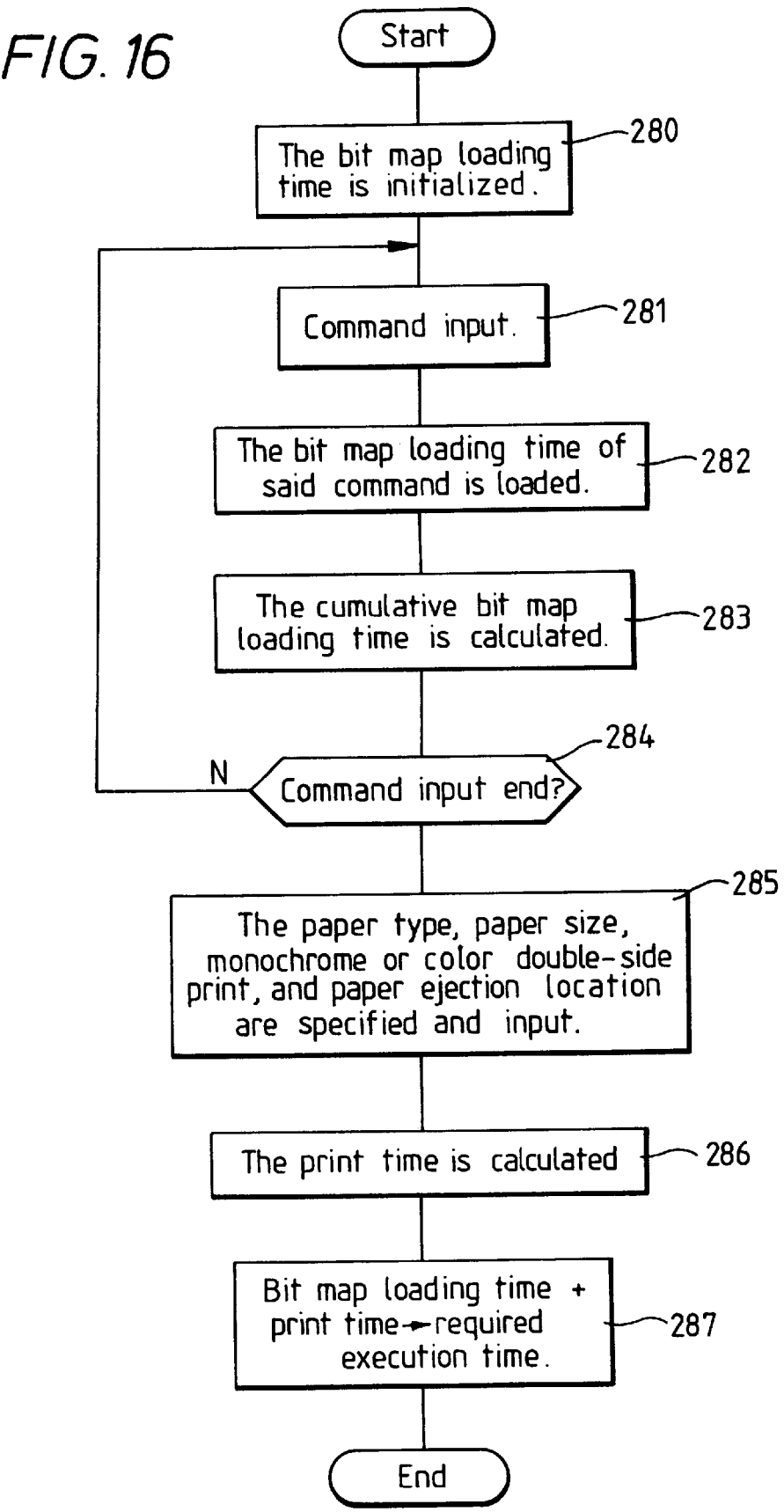

FIG. 16 shows required execution time calculation processing using an input unit. First, at step 280, the data loading time of the bit map memory is initialized. Furthermore, a command is input at step 281, and the data loading time of that command to the bit map memory is loaded at step 282. The cumulative data loading time for the bit map memory is calculated at step 283. Furthermore, a check is made at step 284 as to whether the command input has finished. When the command input has not finished, processing returns to step 281. When the command input has finished, the paper type, paper size, identification of monochrome or color, double-side print information, and paper ejection location specification are input at step 285. Furthermore, the print time is calculated at step 286. At step 287, the data loading time of the bit map memory is added to the print time and the required execution time is calculated, and then the processing terminates.

Figure 17:
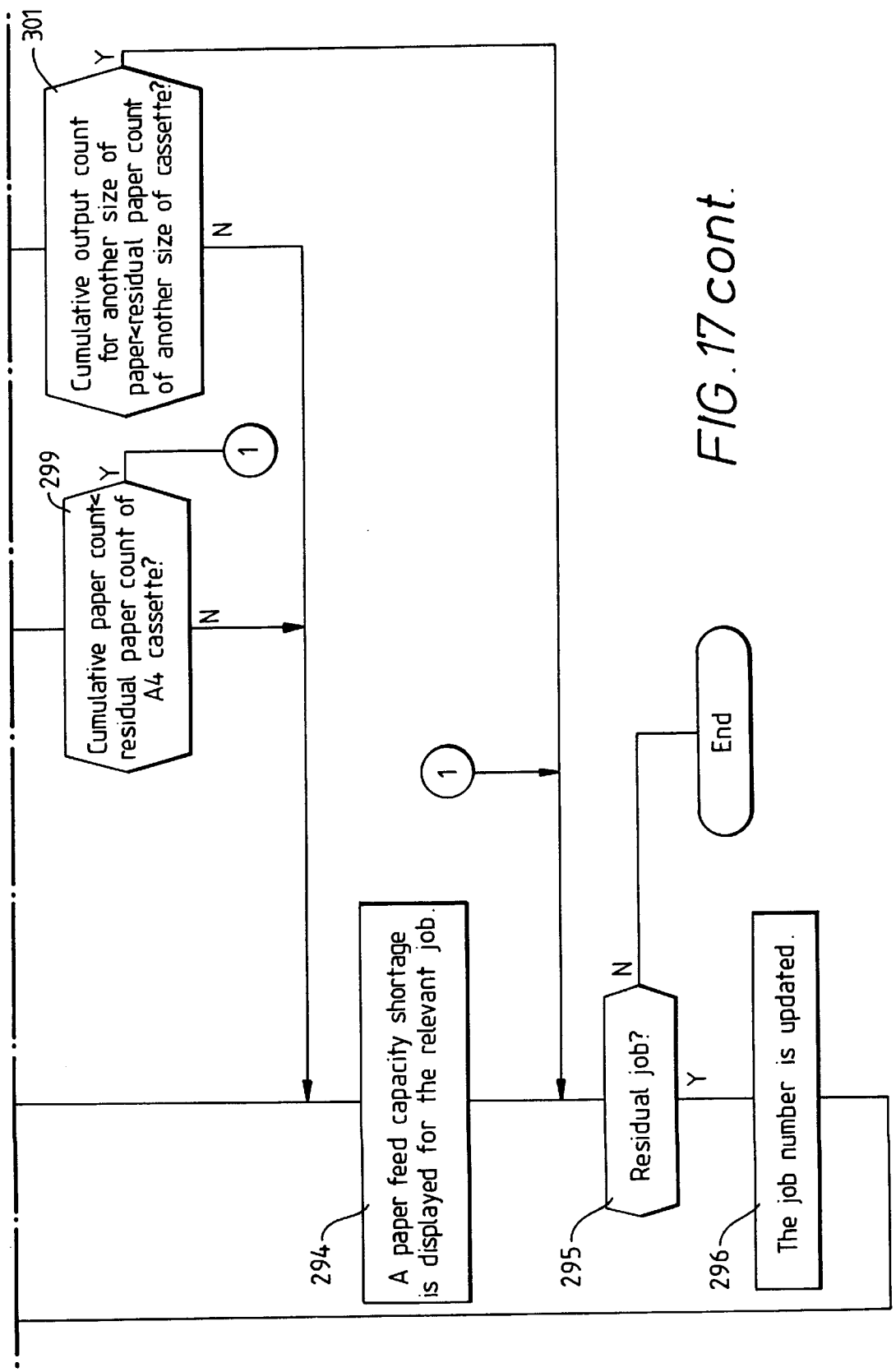

FIG. 17 shows the processing operations for deciding whether the paper feed capacity is insufficient for paper feed capacity shortage display.

The job number is initialized at step 290; i.e. when a job is being processed or there is no job being processed, a job number of 1 is assigned. A check is made at step 291 as to whether the output paper size of said job is A3. When the output paper size is A3, the cumulative A3 paper output count is calculated at step 292. Furthermore, a check is made at step 293 as to whether the cumulative paper output count calculated is smaller than the residual paper count of the A3 cassette. When the calculated value is not smaller than the residual paper count, a paper feed capacity shortage is displayed for the relevant job at step 294. Furthermore, the presence or absence of a residual job is checked at step 295. When no job remains, processing terminates. When there is a residual job, the job number is updated at step 296, and the processing returns to step 291. When the cumulative paper count calculated is smaller than the residual paper count of the A3 cassette at the step 293, the processing shifts to step 295. When the output paper size of the relevant job is not A3, at step 291, the processing shifts to step 297, and a check is made as to whether the output paper size of the relevant job is A4.

When the output paper size of the relevant job is A4, the cumulative A4 paper output count is calculated at step 298. Then a check is made at step 299 as to whether the cumulative paper output count calculated is smaller than the residual paper count of the A4 cassette. When the calculated value is not smaller than the residual paper count, the processing shifts to step 294. When the calculated value is smaller than the residual paper count, the processing shifts to step 295.

When the output paper size of the relevant job is not A4 at step 297, the cumulative paper output count for another size of paper is calculated at step 300, and a check is made at step 301 as to whether the cumulative paper output count calculated is smaller than the residual paper count for the paper size of the relevant job. When the calculated value is not smaller than the residual paper count, the processing shifts to the step 294. When the calculated value is smaller than the residual paper count, the processing shifts to the step 295.

FIG. 18 shows the processing operations for deciding whether the paper ejection capacity is insufficient for paper ejection capacity shortage display.

The job number is initialized at step 310. Furthermore, a check is made at step 311 as to whether the relevant job is a sorter output job. When the relevant job is a sorter output job, a check is made at step 312 as to whether the relevant job outputs data to printer bin No. 1. When the job is an output job to bin No. 1, a check is made at step 313 as to whether paper ejection is reserved for the bin No. 1. When paper ejection is already reserved, no paper can be ejected and a paper ejection capacity shortage is displayed for the relevant job at the step 314. Next, a check is made at step 315 as to whether there is(are) (a) residual job(s). When there is no residual job, processing terminates. When there is a residual job, the job number is updated at step 316 and the processing returns to step 311.

When the relevant job is not an output job to bin No. 1, at step 312, a check is made at step 317 as to whether the relevant job is an output job to the bin No. 2. When the job is an output job to the bin No. 2, a check is made at step 318 as to whether paper ejection is reserved for the bin No. 2. When paper ejection is reserved, the processing shifts to step 314. When no paper ejection is reserved, the processing shifts to step 315. When the relevant job is not an output job to the bin No. 2 at step 317, a check is made as to whether the relevant job is an output job to another bin number. When there are bins up to the "m"th bin, a check is made at step 319 of whether paper ejection is reserved for the bin No. m. When paper ejection is reserved, the processing shifts to step 314. When no paper ejection is reserved, the processing shifts to step 315.

When the relevant job is not a sorter output job at step 311, a check is made as to whether the relevant job is a top stacker paper ejection job, at step 320. When the relevant job is a top stacker paper ejection job, the cumulative top stacker paper output count is calculated at step 321, and the calculated value is compared with the difference between the top stacker paper ejection capacity and the accumulated paper count before the relevant job. When the cumulative paper output count calculated is smaller than that difference, the paper ejection capacity is not insufficient, and the processing shifts to step 315. When the cumulative paper output count calculated is larger than that difference, the paper ejection capacity is insufficient, and the processing shifts to the step 314.

When the relevant job is not a top stacker paper ejection job at step 320, the relevant job is a bulk bin output job. The cumulative bulk bin output paper count is calculated at step 324, and said cumulative output paper count calculated is compared with the difference between the bulk bin paper ejection capacity and the accumulated paper count before the relevant job at step 324. When the cumulative paper output count calculated is smaller than that difference, the paper ejection capacity is not insufficient, and the processing shifts to step 315. When the cumulative paper output count calculated is larger than the above difference, the paper ejection capacity is insufficient, and the processing shifts to step 314.

Figure 19:
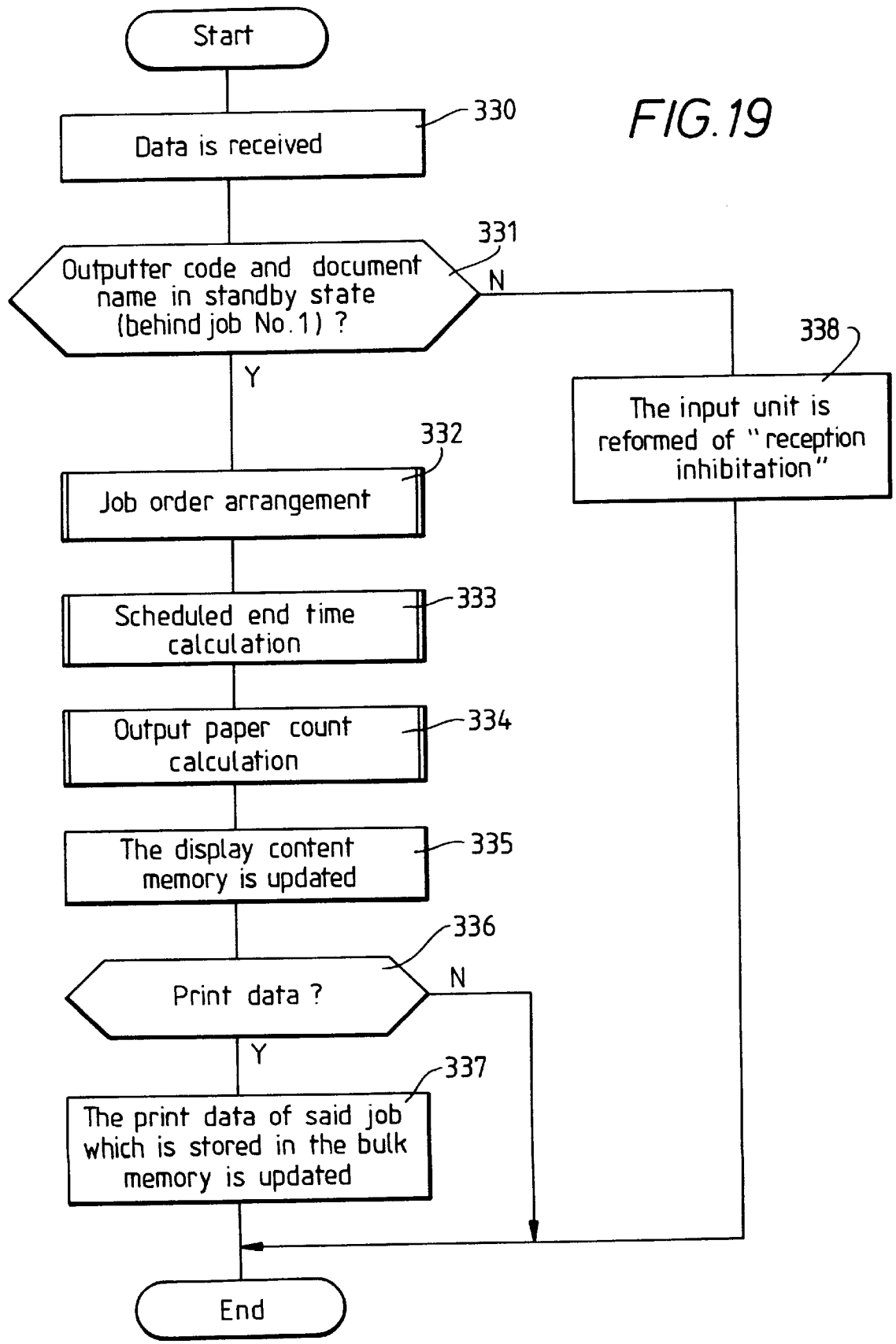

FIG. 19 shows changes in processing content. When a job, which is received by the main controller 1, is in the standby state, the content thereof can be changed.

Job data is received at step 330, and a check is made at step 331 as to whether the output code of the input data and the document name are behind the job in the standby state. When they are not found, the input units 2-1 to 2-N are informed of "Reception Inhibition", at step 338. When the relevant job is found at step 331, the job order is arranged at step 332, the scheduled end time is calculated at step 333, the cumulative output paper count is calculated at step 334, and the content of the memory, where the display content is stored, is updated at step 335. At step 336, a check is made as to whether print data is included in the input data. When print data is included in the input data, the print data of the relevant job, which is stored in the bulk memory, is updated at step 337.

Figure 20:
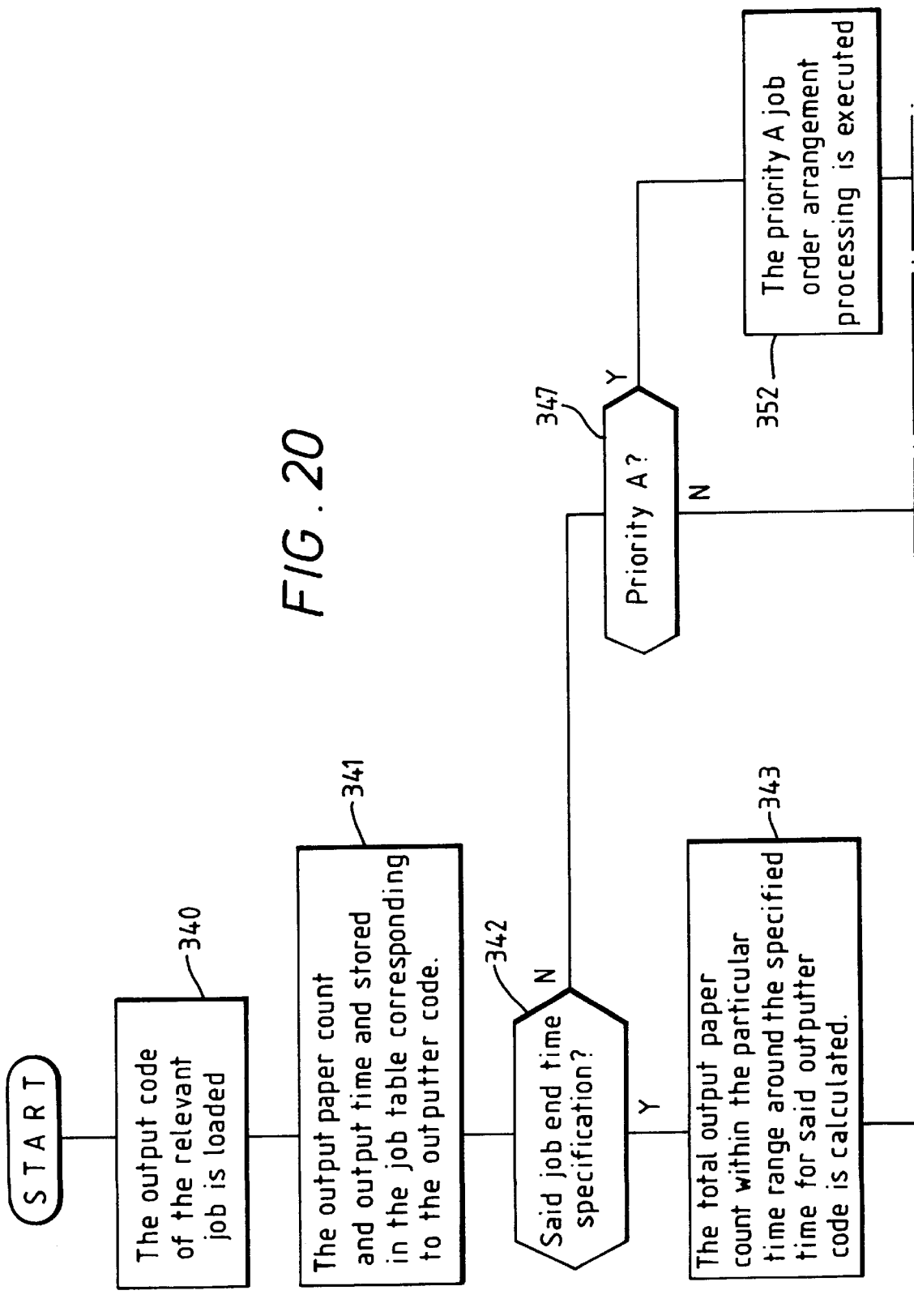

FIG. 20 shows processing for outputting, when the total output paper count within a particular time range is more than the specified value, moving it beyond the particular time range by lowering the priority of the output. This processing is performed to prevent a particular output from occupying the shared printer system excessively.

At step 340, the output code of the relevant job is loaded. Next, the output paper count and required output time are stored in a job table corresponding to the output code, at step 341. Next, a check is made at step 342 as to whether the relevant job is an end time specification job. When the relevant job is an end time specification job, the total output paper count within a particular time range around the specified time of said output code is calculated at step 343. Next, a check is made at step 344 as to whether that total value is more than the specified value. When the total value is more than the specified value, the execution of the relevant job within the particular time range is stopped, but is done around said particular time range. When there is free time before the particular time range, the job is input there. When there is no free time before the particular time range, the job is input in the first available free time behind the particular time range. When the total output paper count within the particular time range is not more than the specified value at the step 344, the normal end time specification job order arrangement processing is executed at step 346.

When the relevant job is not an end time specification job at step 342, a check is made at step 347 as to whether the relevant job is a job with the priority A. When the relevant job is a job with priority A, the priority A job order arrangement processing is executed at step 352.

When the relevant job is not a job with priority A at step 347, the total output paper count of only the job having the relevant job output code within the particular time range around the reception time of the relevant job is calculated at step 348. Next, a check is made at step 349 as to whether the total value is more than the specified value. When that calculated value is more than the specified value, the relevant job is inputted in a free time behind the particular time range around the reception time of the relevant job at the step 350. When the total value is less than the specified value at the step 349, an interrupt and normal job arrangement processing are executed, at step 351.

Figure 21:
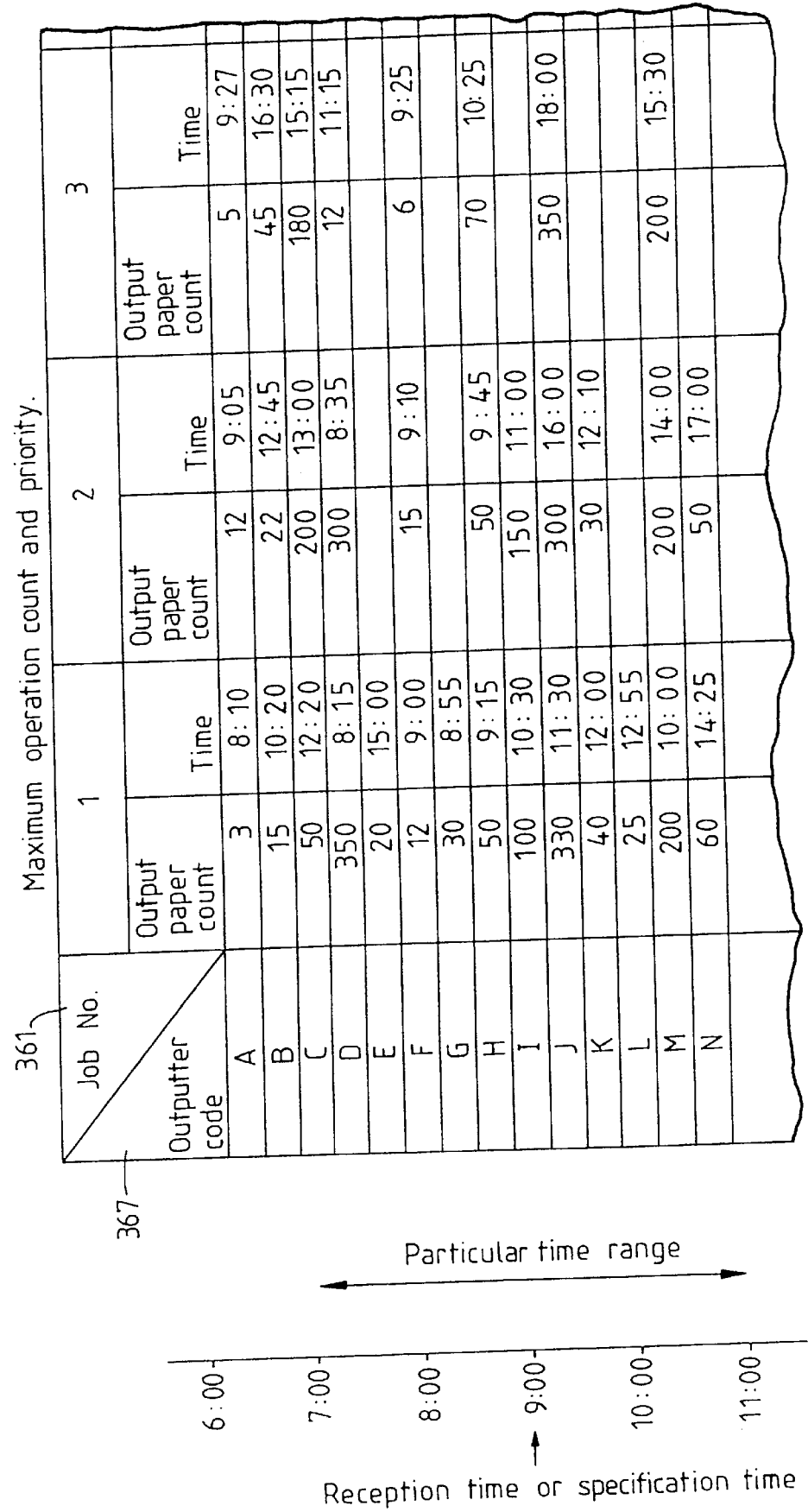
FIG. 21 shows a further job sequence table.

To execute the processing shown in FIG. 20, the table shown in FIG. 21 is provided in the buffer memory 9. A job No. column 361 indicates the job number received for each output code in an output code column 367. For example, the jobs for the output code D require 350 sheets at 8:15 and 300 sheets at 8:35. Assuming that the upper limit within a particular time range between 7:00 and 11:00 is 650 sheets for each output code, the job No. 3 of the output code D is specified as an output after 11:00 even if data output before 11:00 is requested.

Figure 22:
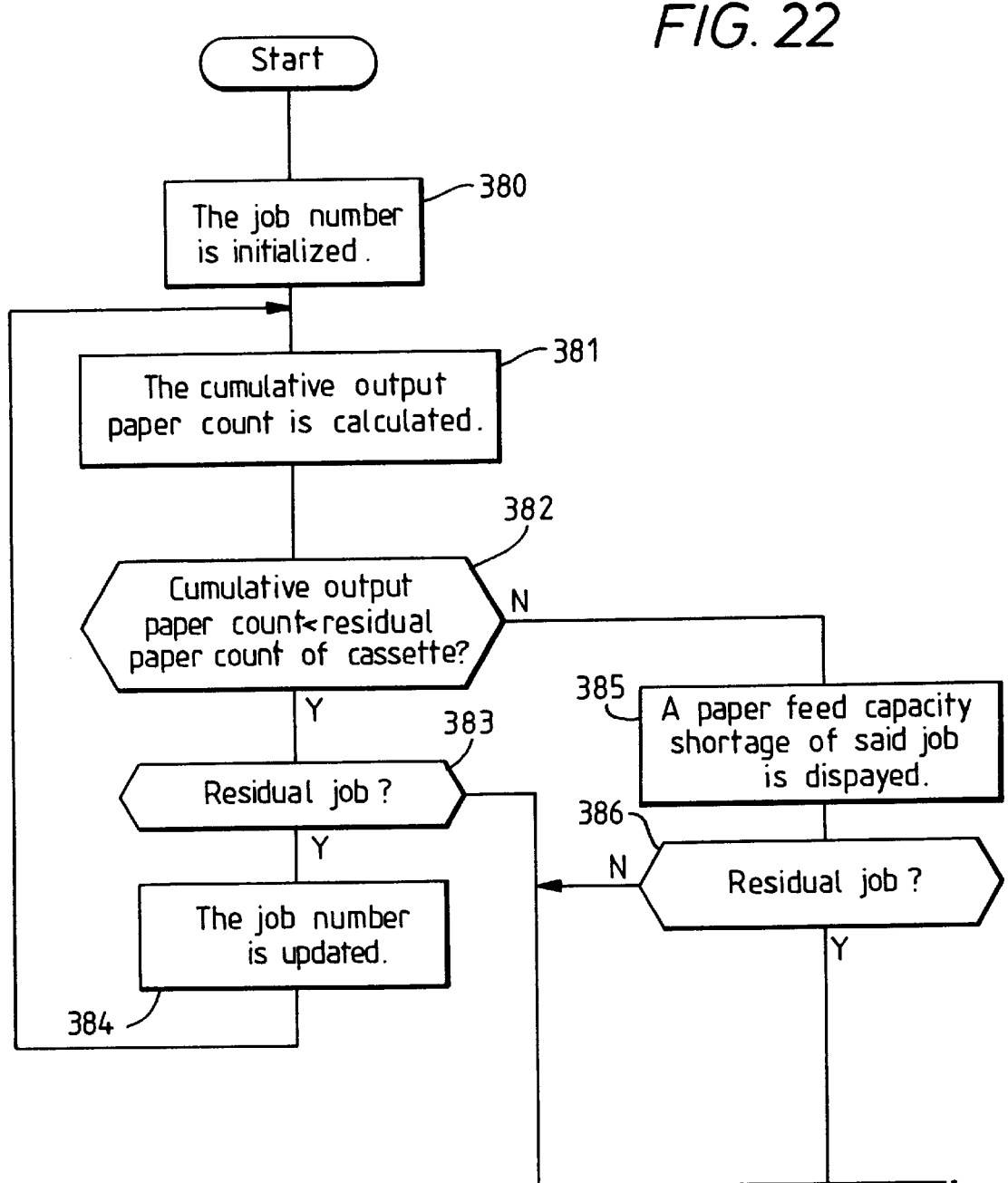
FIGS. 22 and 23 are further flowcharts showing processing steps of the flowchart of FIG. 9 in more detail.
Figure 22:
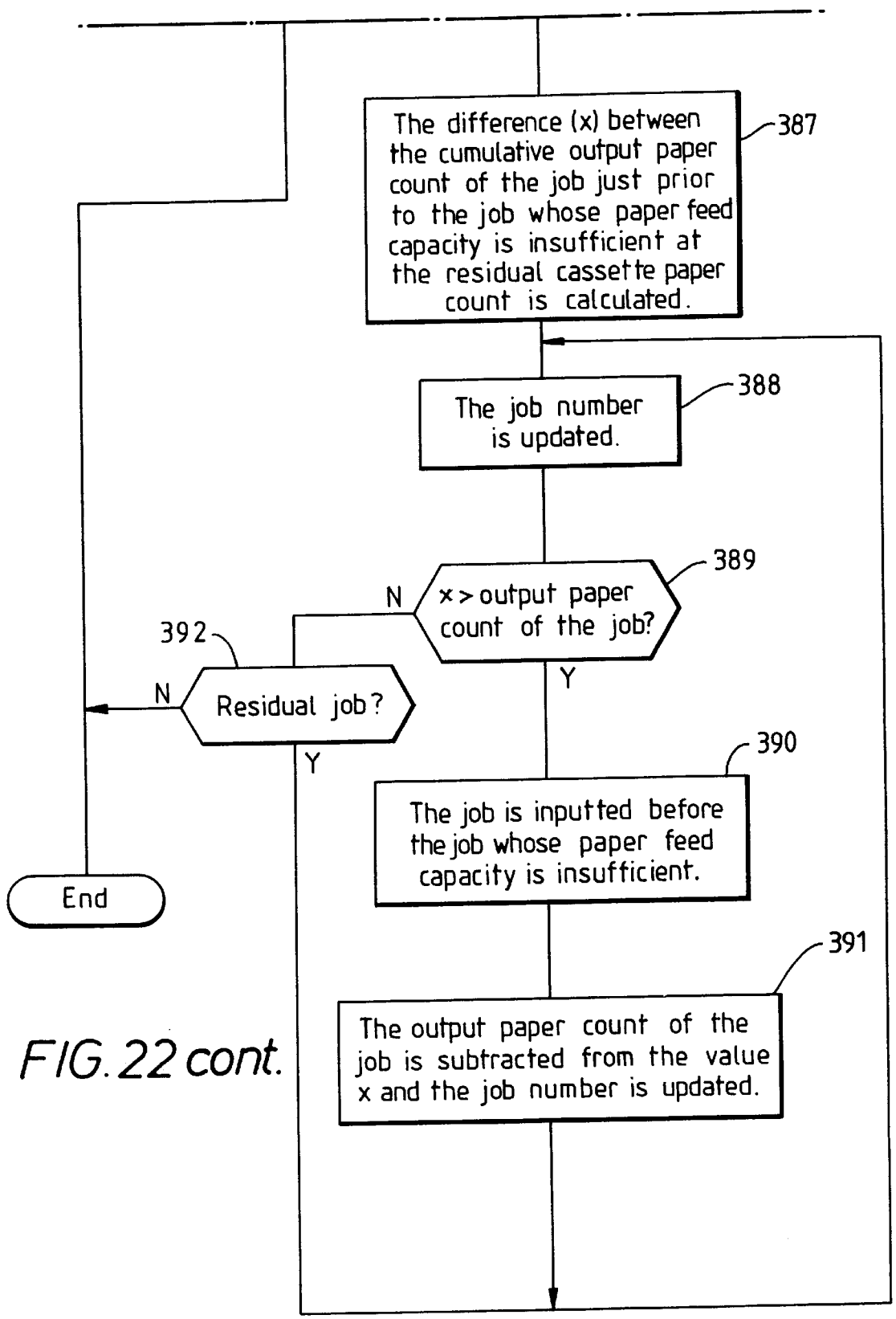

FIG. 22 shows processing for changing the job order near the location where a print disabled state is expected due to insufficient paper feed capacity, so that as many jobs as possible can be executed.

At step 380, the job number is initialized. Next, the cumulative output paper count including the relevant job is calculated at step 381. Next, a check is made at step 382 as to whether the cumulative output paper count calculated is smaller than the residual cassette paper count outputted by the relevant job. When the calculated value is smaller than the residual paper count, a check is made at step 383 as to whether there is(are) (a) residual job(s). When there is no residual job, processing terminates. When there is a residual job, the job number is updated at step 384 and the processing returns to step 381. When the cumulative output paper count calculated is larger than the residual cassette paper count, a paper feed capacity shortage for the relevant job is displayed at step 385. Next, a check is made at step 386 as to whether there is(are) (a) residual job(s). When there is no residual job, processing terminates. When there is a residual job, the difference x between the cumulative output paper count of the job just prior to the job whose paper feed capacity is insufficient and the residual cassette paper count is calculated at step 387. Next, the job number is updated by one at step 388. Next, the calculated value x is compared with the output paper count of the job whose number is updated at step 389. When the value x is larger than the output paper count, that job is input before any job whose paper feed capacity is insufficient at the step 390. Next, the difference between the value x and the output paper count of that job is assumed as a new value x at step 391. Next, the processing returns to step 388. When the value x is smaller than the output paper count of that job at step 389, a check is made at step 392 as to whether there is(are) (a) residual jobs. When there is a residual job, processing shifts to step 388. When there is no residual job, processing terminates.

Figure 24A:
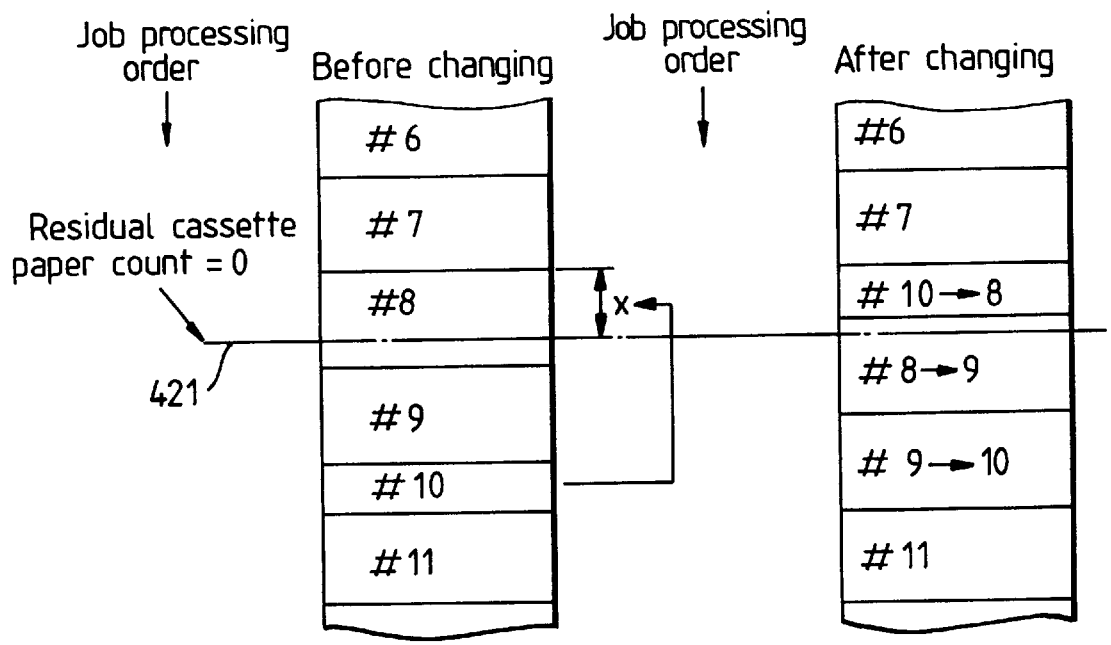
FIG. 24 illustrates further job sequence tables.

FIG. 24(*a*) shows an example of job order change processing in the print disabled state due to a paper feed capacity shortage.

Before changing the job order, the residual cassette paper count becomes 0 halfway through job number 8 (at the location indicated by line 421) and the job No. 8 cannot be processed. When the job No. 7 is completed, x sheets remain in the cassette. When the value x is compared with the output paper count of the jobs behind job No. 7, it is found that job No. 10 can be executed. Therefore, job No. 10 is moved next to job No. 7 and the job Nos. 8 and 9 are shifted. By doing this, as many jobs as possible can be executed before more paper needs to be supplied.

Figure 23:
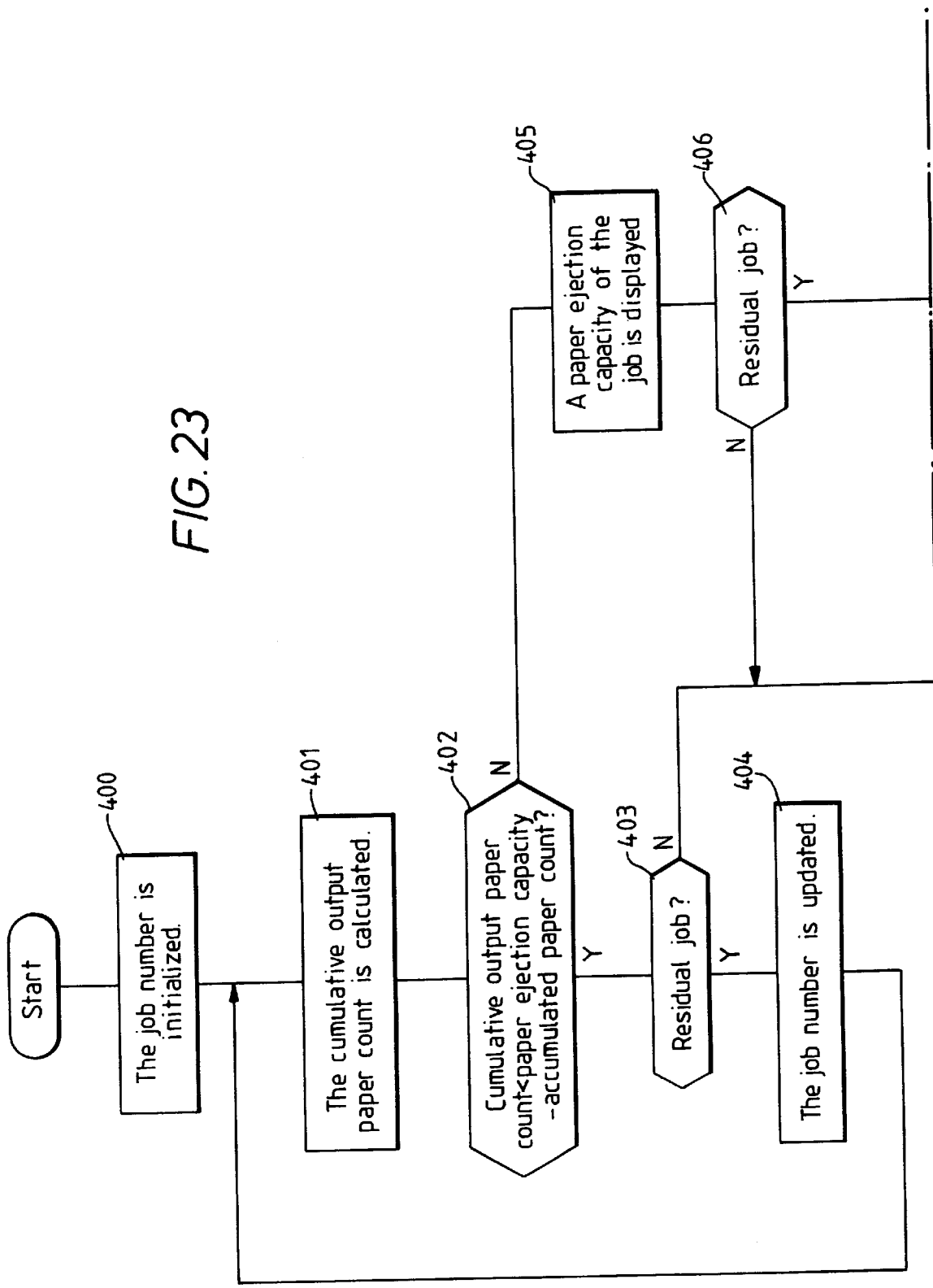
Figure 23:
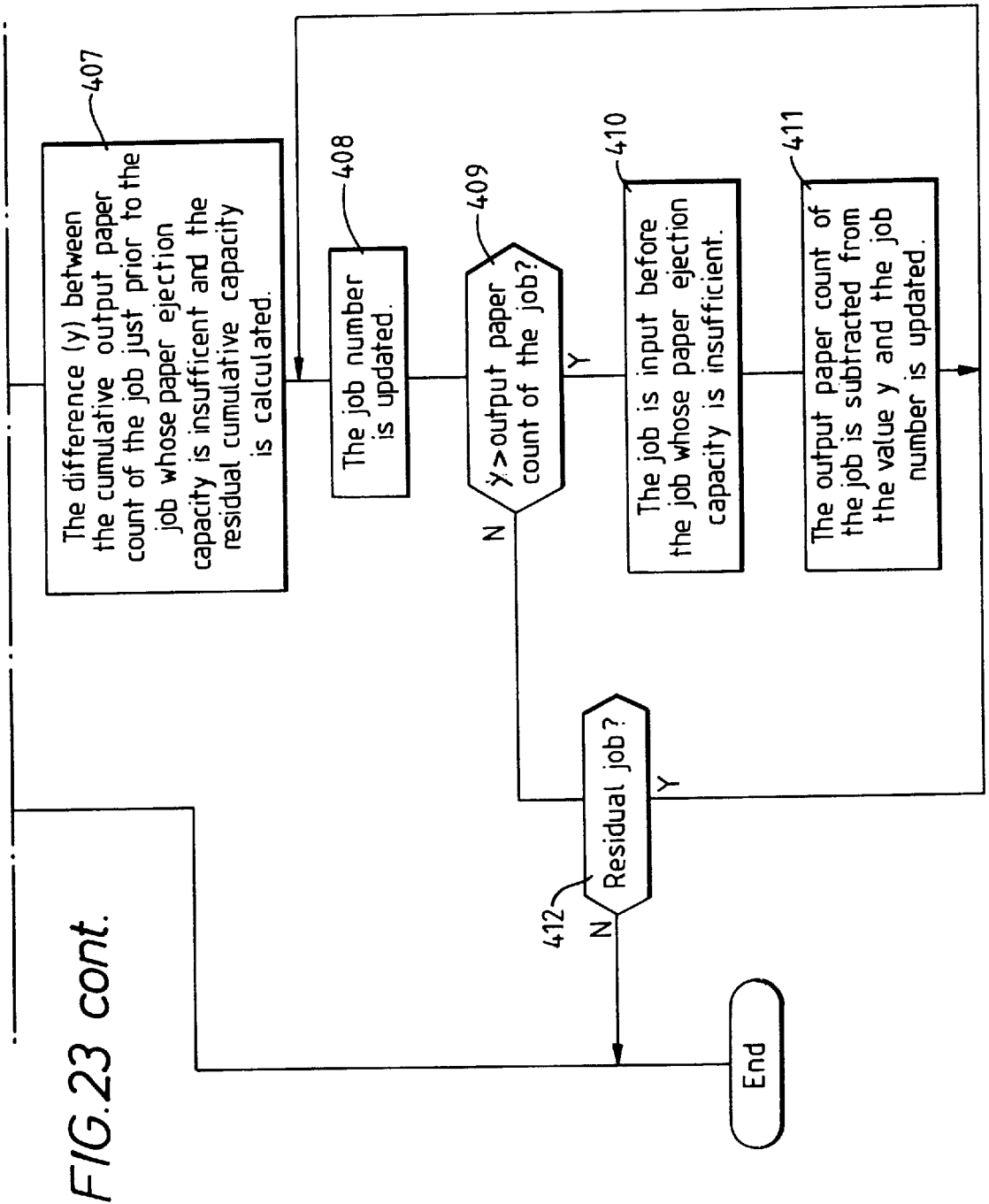

FIG. 23 shows processing for changing the job order near the location where a print disabled state is expected due to an insufficient paper feed capacity, so that as many jobs as possible can be executed.

At step 400, the job number is initialized. Next, the cumulative output paper count up to the relevant job is calculated at step 401. Next, the cumulative output paper count calculated is compared with the difference between the paper ejection capacity and the accumulated paper count, at step 402. When the cumulative output paper count calculated is smaller than that difference, a check is made at step 403 as to whether there is(are) a residual job(s). When there is no residual job, processing terminates. When there is a residual job, the job number is updated at step 404 and the processing returns to step 401. When the cumulative output paper count calculated is larger than the difference at step 402, a paper feed capacity shortage for the relevant job is displayed at step 405, and a check is made at step 406 as to whether there is(are) (a) residual job(s). When there is no residual job, processing terminates. When there is a residual job, the difference y between the cumulative output paper count of the job just prior to the job whose paper feed capacity is insufficient and the residual cumulative capacity is calculated at step 407. Next, the job number is updated at step 408. The value y is compared with the output paper count of the job whose number is updated at step 409. When the value y is larger than the output paper count, that job is input before the job whose paper feed capacity is insufficient at step 401. Next, the difference between the value y and the output paper count of said job is assumed as a new value y at step 411. Next, the processing returns to the step 408. When the value y is smaller than the output paper count of said job at the step 409, a check is made as to whether there is(are) (a) residual job(s). When there is no residual job, processing terminates. When there is a residual job, processing returns to step 408.

Figure 24B:
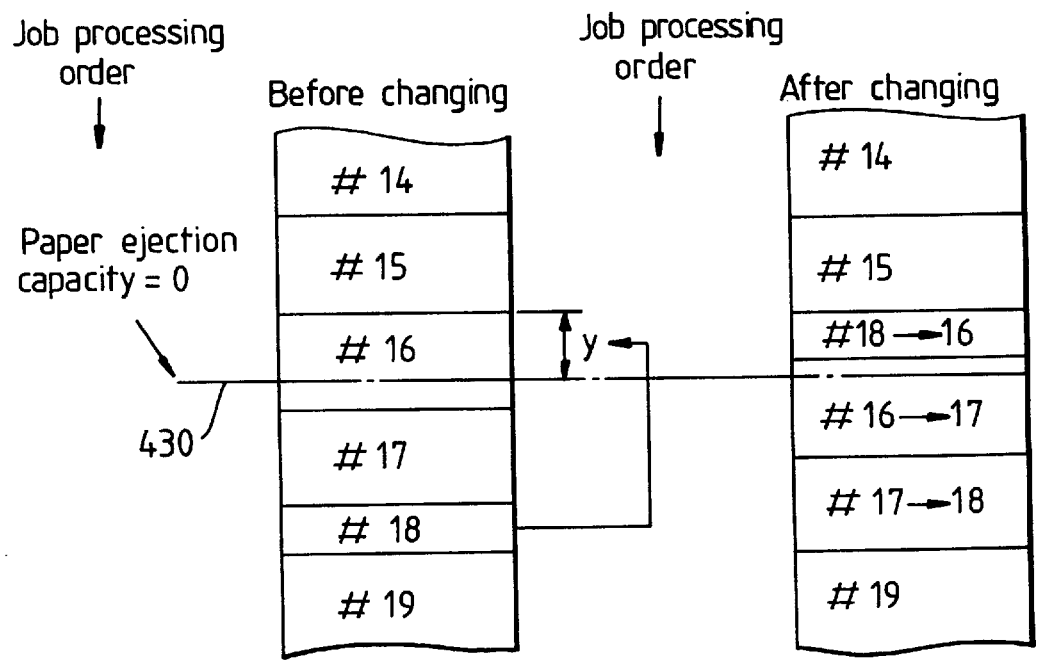

FIG. 24(b) shows an example of job order change processing in the print disabled state due to a paper feed capacity shortage.

Before changing the job order, the paper ejection capacity becomes 0 halfway through job number 16 (at the location indicated by line 430) and the job No. 16 cannot be processed. Since job No. 18 can be processed using the y sheets remaining after job No. 15 has been processed, the job No. 18 is moved behind the job No. 15 and the job No. 16 and subsequent jobs are shifted. When the above processing is not provided and furthermore a particular job cannot be output because the paper ejection capacity is short due to the number of output pages of a particular job, a job with a small output paper count for said paper ejection capacity which may exist in the jobs following said job may not be output. Since said processing allows the following jobs, which may not be output under the above conditions, to be executed on a priority basis, many advantages are given to the user of the shared printer system.

For a plurality of users of a shared printer system, it is important to prevent an output document of one user from being delivered to another. In a shared printer system of the present invention, a sorter bin locking arrangement may be provided, using data which is transferred to the main controller 1 from the input units 2-1 to 2-N and a sorter bin lock mechanism installed in the output unit 4 can be operated remotely from the input units 2-1 to 2-N. The sorter bin for operating the lock mechanism can be specified by specifying the sorter bin No. output.

Figure 25A:
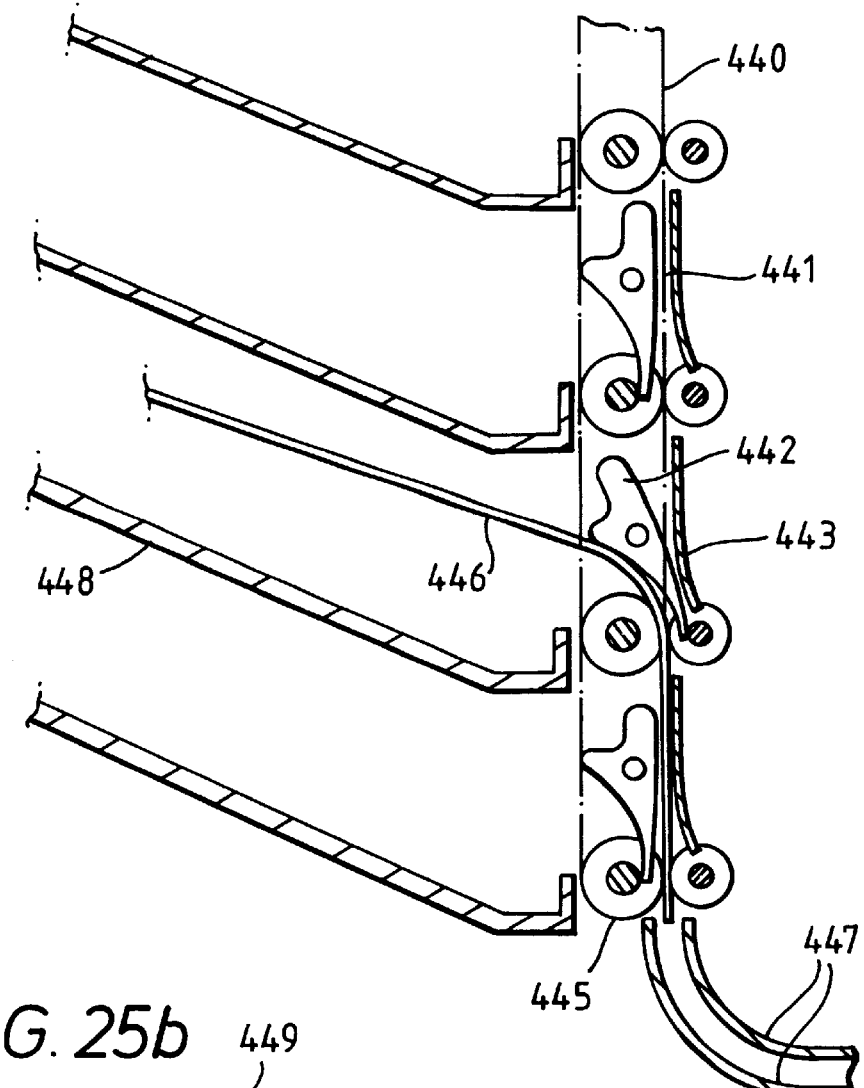
FIG. 25 shows a sectional view of a printer sorter and a pawl drive mechanism therefor.
Figure 25B:
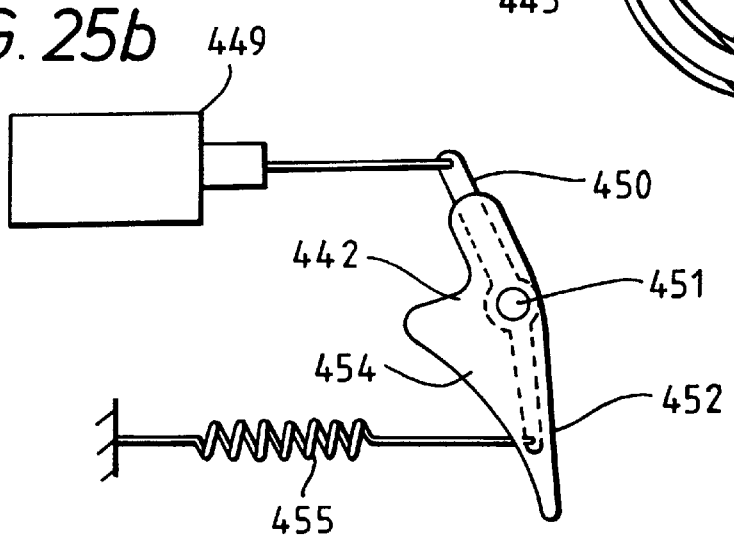

FIG. 25 shows the configuration of a sorter which may be installed in the output unit 4. FIG. 25(a) is a sectional side view of part of the sorter and FIG. 25(b) is a side view of the direction switching pawl drive mechanism. Paper 446 is fed into the sorter via a first paper guide 447 connected to the paper ejection unit of the output unit 4. In the sorter, the paper 446 passes through a transport path 441 which is formed by a flat part 452 of a direction switching pawl 442 and a second paper guide 443. A feed roller is rotated in the paper feed direction by a seamless belt 440 and a drive motor. When a solenoid valve 449 is turned on, an arm 450, which is linked to the direction switching pawl 442, is pulled so as to rotate the pawl 442 about a shaft 451, the direction switching pawl 442 is pulled against the tension of a spring 455, and the paper 446 sent from the feed roller 445 is guided into a bin 448 along a curved part 454. When the solenoid valve is turned off, the direction switching pawl 442 is returned to its original position by the force of the spring 455.

Figure 26A:
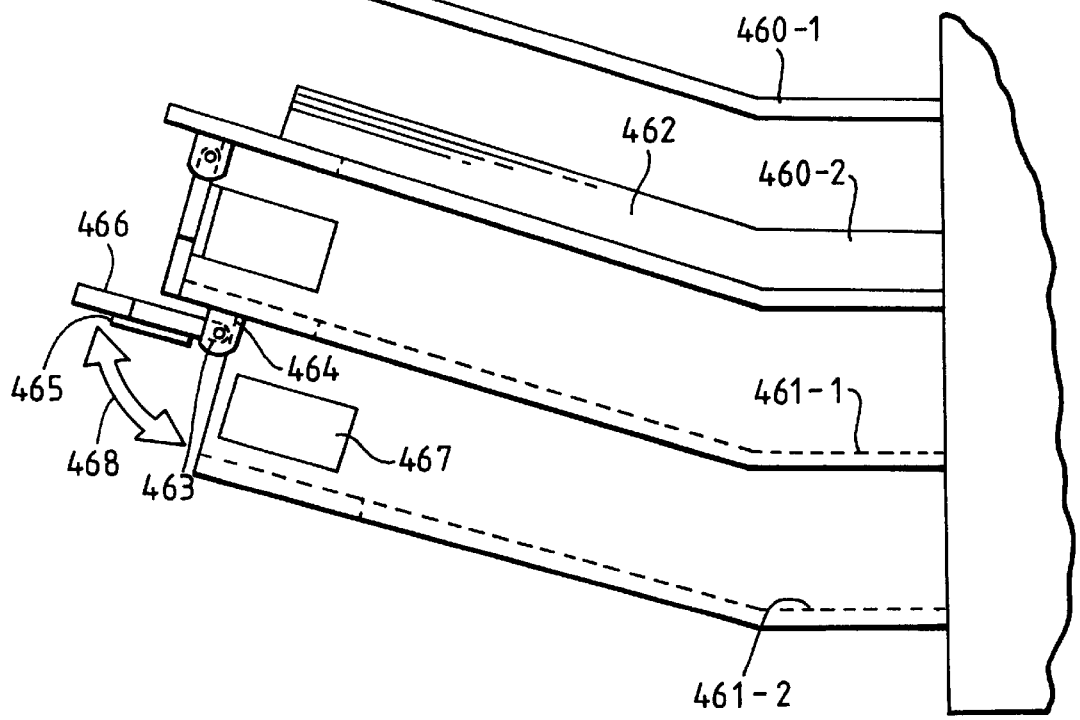
FIG. 26 shows a side view and a perspective view of a sorter.
Figure 26B:
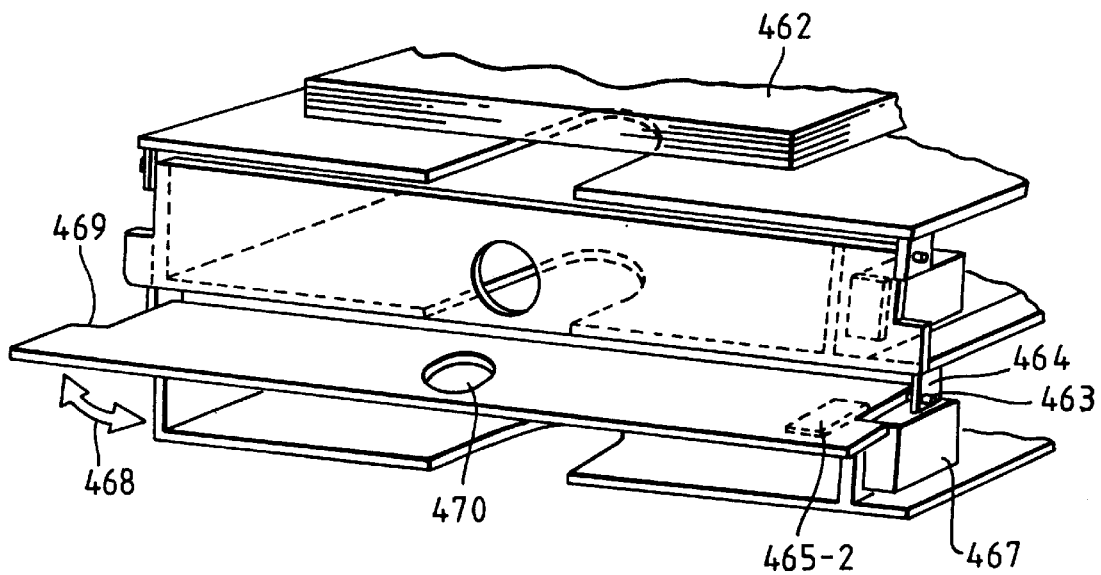

FIG. 26(a) is a side view of the sorter unit and FIG. 26(b) is a perspective view. The sorter comprises bins 461-1 and 461-2, which each have a lock mechanism, and open bins 460-1 and 460-2. The bins with a lock mechanism have a cover 466, which can be opened or closed, at the outlet for paper. That cover 466 is mounted on a shaft 463 and the shaft 463 engages a bearing 464 mounted on the bin. The cover 466 has a lock plate 465 which is made of a magnetic material and is located opposite to an electromagnetic lock unit 467 with an electromagnet comprising a magnetic core and a coil which are fixed to the bin side plate. The cover 466 normally keeps the bin closed. When the electromagnetic lock unit 467 is off, the cover 466 can be rotated and opened in the direction of the arrow round the shaft 463 by pulling open-close protrusions 469 at both ends of the cover 466. When the electromagnetic lock unit 467 is on, the cover 466 cannot be opened because the lock plate 465 is held by suction. However, the presence or absence of paper in the closed bin can be checked through a window 470 in the cover 466.

The lock mechanism of the sorter can be operated via an operation panel mounted on the output unit 4. The lock mechanism can be controlled by coding instructions for operating said lock mechanism and by identifying a code inputted from the keyboard of the input unit 4 and a code inputted from the operation panel of the output unit. By doing this, the user, who operates the input unit, can release the lock mechanism of the sorter at the output unit 4 and fetch a document so as to keep the document confidential.

Figure 27:
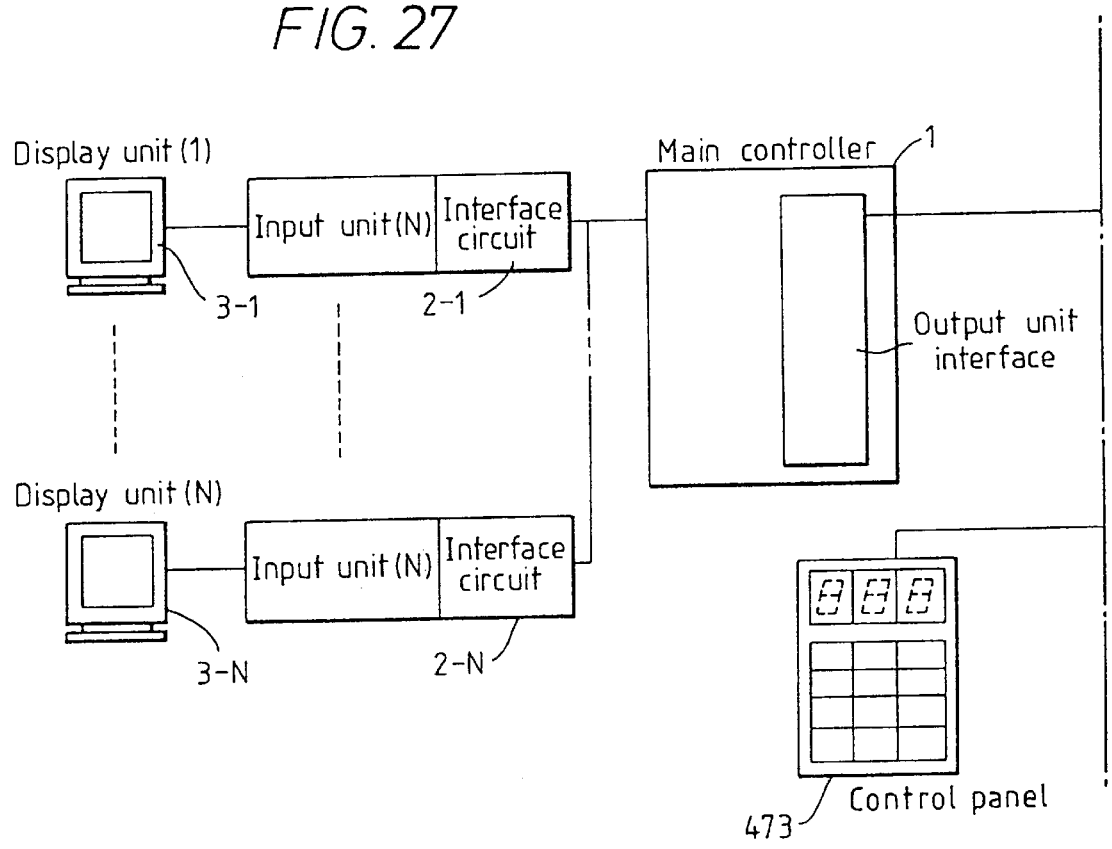
FIG. 27 is a schematic block diagram of a sorter control unit.
Figure 27:
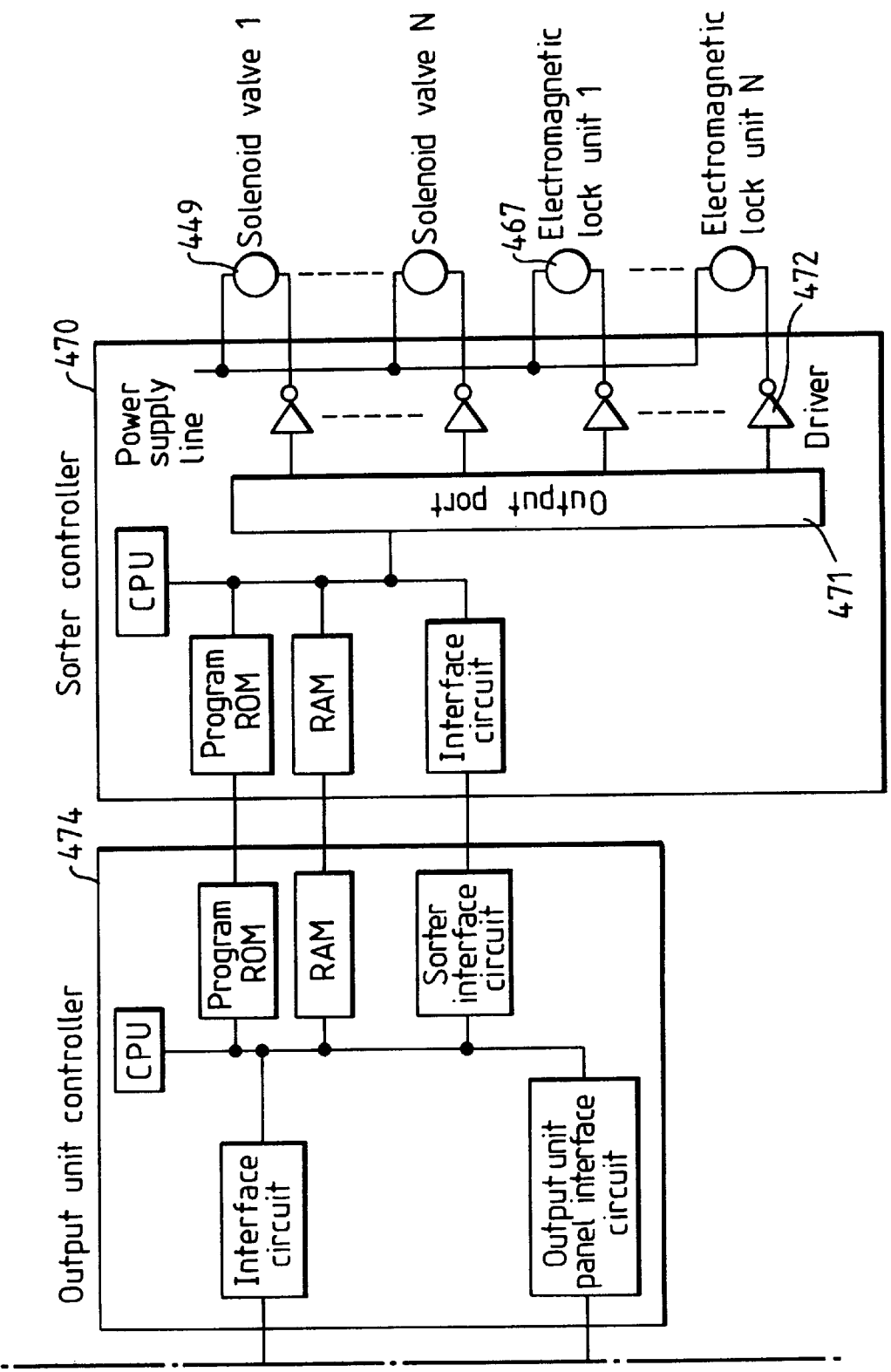

FIG. 27 is a block diagram of a sorter control unit of this system. A sorter controller 470 obtains information from the main controller 1 for controlling the system via a controller 474 of the output unit 4. The sorter controller 470 comprises a CPU, program ROM, RAM, interface circuit, output port 471, and driver 472. A solenoid valve 449 and an electromagnetic lock unit 467 for controlling the sorter are energized by the driver 472 on the basis of a signal supplied to the output port 471.

The output unit controller 474 is connected to a control panel 473, and the sorter may be operated by information supplied from the control panel 473.

Figure 28:
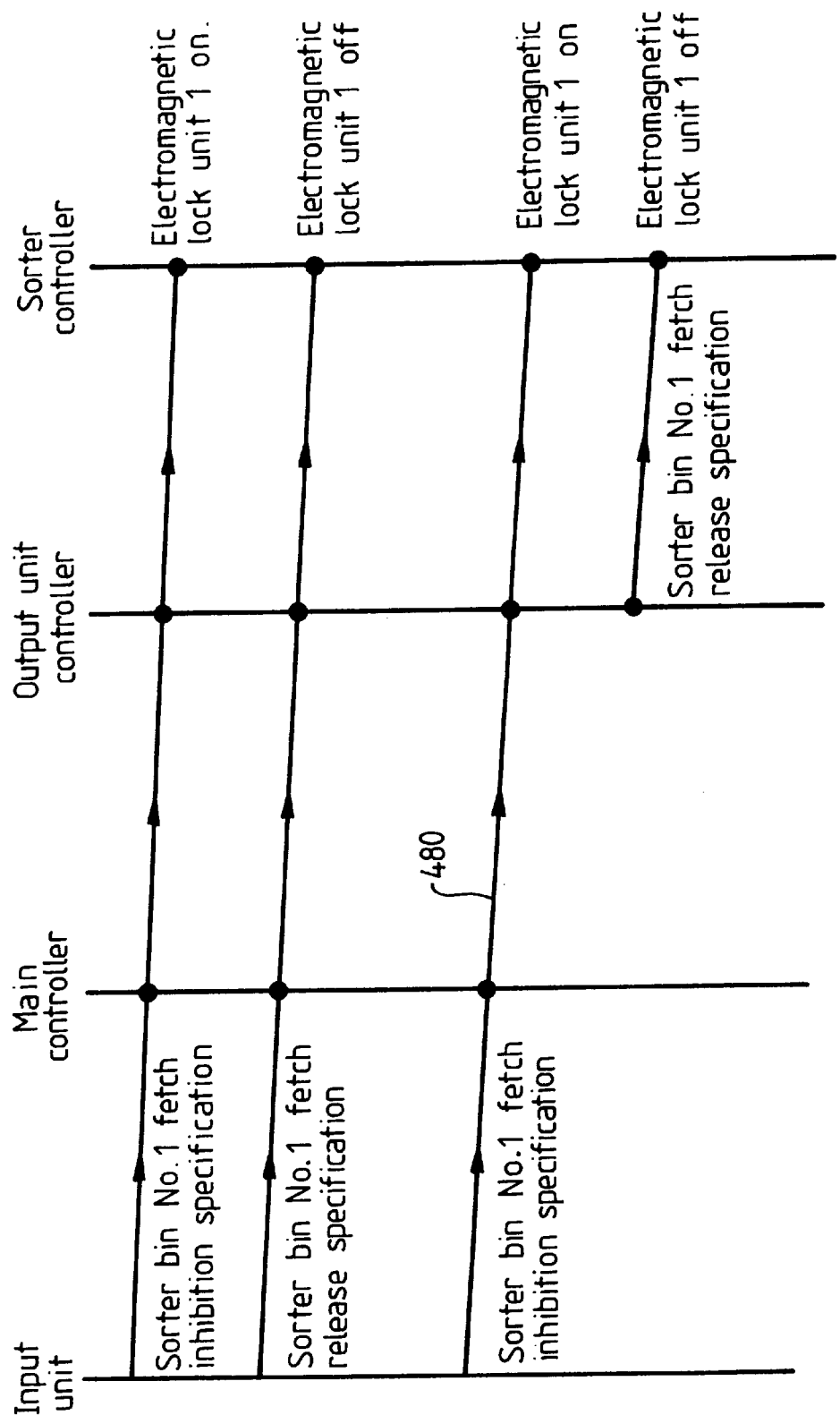
FIG. 28 shows data control signals for the unit of FIG. 27.

FIG. 28 is a data flow chart showing the flow of data between the input units 2-1 to 2-N, the main controller 1, the output unit controller 474, and the sorter controller 470.

When sorter bin No. 1 locking data 480 is supplied to the sorter controller 470 from the input unit 2-1 via the main controller 1 and the output unit controller 474, the electromagnetic lock unit of the relevant bin is turned ON. When sorter bin No. 1 locking release data 481 is supplied to the sorter controller 470 through the same path, said electromagnetic lock unit is turned OFF.

The electromagnetic lock unit may be turned ON or OFF by data from a control panel 483 connected to the output unit controller 474. In FIG. 28, the signal flow when the electromagnetic lock unit is turned OFF by sending sorter bin No. 1 locking release data 473 to the sorter controller 470 from the output unit controller 474 is also indicated.

Figure 29:
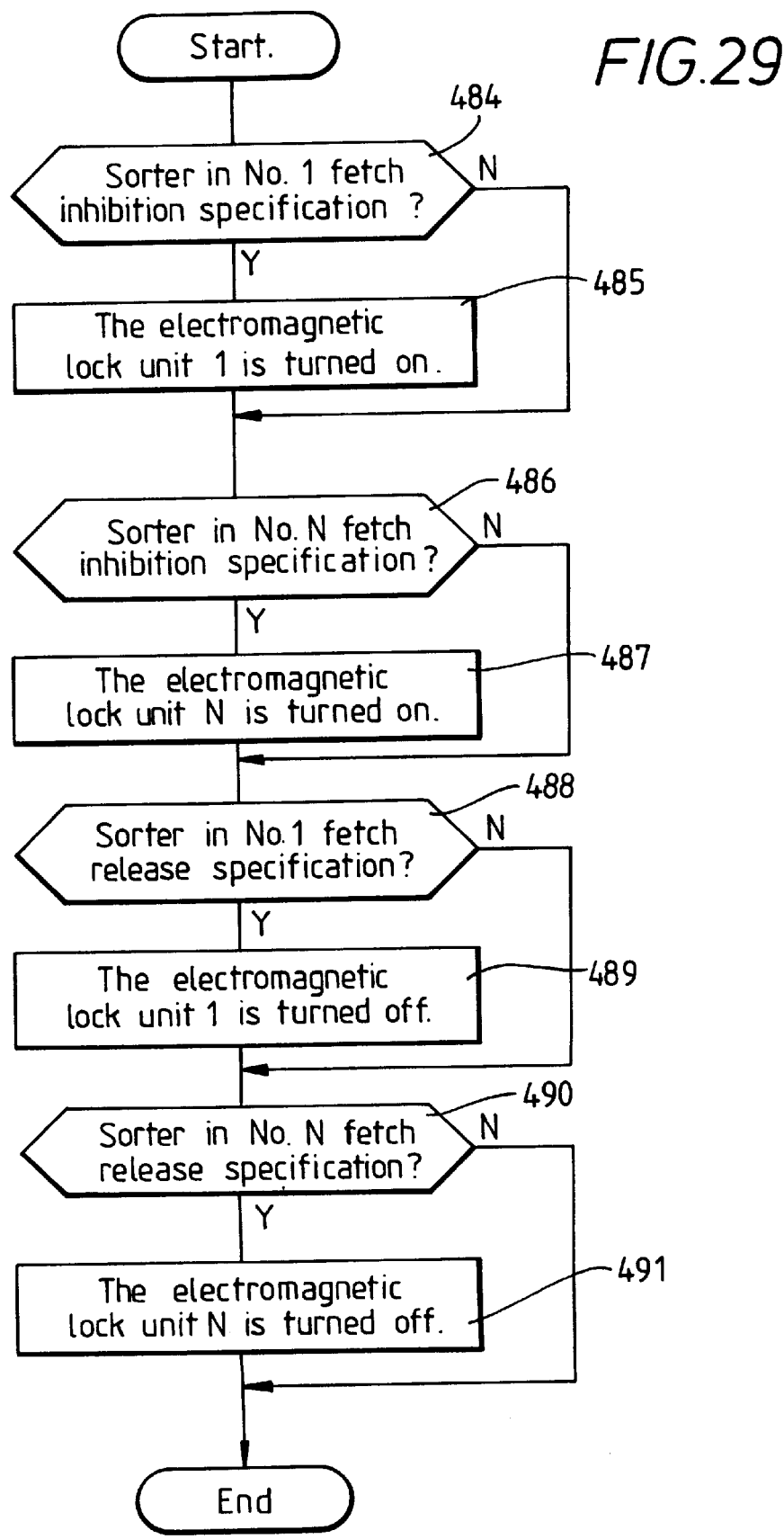
FIG. 29 is a flowchart showing the operation of the unit of FIG. 27.

FIG. 29 is a flow chart of a control program processed by the sorter controller 470. The electromagnetic lock unit 467 is turned ON or OFF by this processing.

At the step 484, a check is made for the presence or absence of a sorter bin No. 1 locking instruction. When there is such an instruction, the electromagnetic lock unit 467 is turned ON at the step 485. When there is no such instruction at step 484, step 485 is skipped and the next step is executed. Next, a check is made for the presence or absence of a locking instruction for another sorter bin. At step 486, a check is made for the presence or absence of a locking instruction for sorter bin No. N. When there is such an instruction, the electromagnetic lock unit 467 is turned ON at step 487. When there is no such instruction at step 486, processing jumps to step 488. At step 488, a check is made for the presence or absence of a sorter bin No. 1 locking release instruction. When there is such a locking release instruction, the electromagnetic lock unit 1 is turned OFF at step 489. When there is no locking release instruction at step 488, the step 489 is skipped and the next step is executed. Next, a check is made for the presence or absence of a locking release instruction for another sorter bin. At step 490, a check is made for the presence or absence of a locking release instruction for sorter bin No. N. When there is such a locking release instruction, the electromagnetic lock unit N is turned ON at step 491, and processing terminates. When there is no locking release instruction at step 490, processing terminates.

It is important for the user of the shared printer system to understand details about the status of the output unit 4.

For that purpose, the data shown in FIG. 3(b) is transferred from the output unit 4 to the main controller 1. When there are possibilities of a fire, life loss, or damage to machines, the data of the serious fault occurrence item 58 is transferred to the main controller 1 from the output unit 4 and is displayed on the display units 3-1 to 3-N. For a serious fault which occurs during power OFF of the output unit 4, the main controller 1 directly checks a sensor for detecting an extremely high temperature or leakage of the output unit 4 and monitors such errors. When the main controller 1 detects an error, said controller displays it immediately on the display units 3-1 to 3-N so that the users of the system can take appropriate action.

In normal operation, the main controller 1 receives data such as the paper loading status and the paper type and size indicated in the items 59 to 64 shown in FIG. 3(b) from the output unit 4. The data indicating the status of the output paper cumulative location shown in the items 65 to 68 shown in FIG. 3 (6) is received from the output unit 4.

When the life of each of the expendables and parts needing periodic exchange in the output unit 4 has expired, the main controller 1 receives the data shown in the items 70 to 76 shown in FIG. 3(b) from the output unit 4.

When a service man call occurs in the output unit 4, the main controller 1 receives the data shown in the items 77 to 79 shown in FIG. 3(b) from the output unit 4.

Information supplied to the main controller 1 from the output unit 4 is displayed on the display units 3-1 to 3-N in an understandable format for the user of the shared printer system and used for maintenance of the output unit 4.

What is claimed is:

1. A controller for a data printing system, comprising:
   an input for receiving jobs for printing via a data transmission line from at least one remotely located input unit, each said job comprising corresponding data of one or more pages to be printed;
   a memory for storing said data;
   output means for transmitting said data to a printer, with said jobs being transmitted sequentially; and
   analysis means for storing the duration of printing of each of said jobs, for calculating respective printing completion times for each of said jobs, and for generating display data representing said printing completion times.

2. A controller according to claim 1, further including display means for simultaneously displaying said printing completion times for said jobs on the basis of said display data.

3. A controller for a data printing system, comprising:
   an input for receiving jobs for printing from at least one input unit, each said job comprising corresponding data to be printed;
   a memory for storing said data;
   output means for transmitting said data to a printer, with said jobs being transmitted sequentially; and
   analysis means for storing the duration of printing of each of said jobs, for calculating printing times for each of said jobs, and for generating display data representing said printing times, wherein each of said jobs is accompanied by information indicating an associated priority for the job, said analysis means includes means for establishing a priority order among said jobs for determining the sequential transmission of said jobs by said output means, and said analysis means is arranged to calculate said printing completion times on the basis of said priority order.

4. A controller according to claim 3, wherein said means for establishing a priority order includes means for revising said priority order when said input receives a job having a priority order higher than previously received pending jobs, and said analysis means includes means for revising said display data on the basis of the revised priority order.

5. A controller according to claim 1, wherein said analysis means is arranged to calculate said duration of printing of each of said jobs.

6. The combination of a controller for a data printing system and a plurality of input units coupled to said controller via a data transmission line; the controller comprising:
   an input for receiving jobs for printing by data transmission from said plurality of input units, each said job comprising corresponding data of one or more pages to be printed;
   a memory for storing said data;
   output means for transmitting said data to a printer, with said jobs being transmitted sequentially; and analysis means for storing the duration of printing of each of said jobs, for calculating respective printing completion times for each of said jobs, and for generating display data representing said printing completion times;

wherein at least one input unit includes:
means for receiving said display data; and
a display for simultaneously displaying said printing completion times for said jobs on the basis of said display data.

7. A combination according to claim 6, wherein each of said jobs is accompanied by information indicating an associated priority for the job, said analysis means includes means for establishing a priority order among said jobs for determining the sequential transmission of said jobs by said output means, and said analysis means is arranged to calculate said printing completion times on the basis of said priority order.

8. A combination according to claim 7, wherein said means for establishing a priority order includes means for revising said priority order when said input receives a job having a priority order higher than previously received pending jobs, and said analysis means includes means for revising said display data on the basis of the revised priority order.

9. The combination of a controller for a data printing system and at least one input unit coupled for a said controller via a data transmission line; the controller comprising:

an input for receiving jobs for printing via data transmission from said at least one printing unit, each said job comprising corresponding data of one or more pages to be printed;
a memory for storing said data;
output means for transmitting said data to a printer, with said jobs being transmitted sequentially; and
analysis means for storing the duration of printing of each of said jobs, for calculating respective printing completion times for each of said jobs, and for generating display data representing said printing completion times;
and said input unit includes:
means for calculating a duration of printing of each of said jobs and for transmitting data representing said durations of printing of said jobs to said controller via said transmission line,
wherein each of said jobs is accompanied by information indicating an associated priority for the job, said analysis means includes means for establishing a priority order among said jobs for determining the sequential transmission of said jobs by said output means, and said analysis means is arranged to calculate said printing completion times on the basis of said priority order.

10. A combination according to claim 9, wherein said means for establishing a priority order includes means for revising said priority order when said input receives a job having a priority order higher than previously received pending jobs, and said analysis means includes means for revising said display data on the basis of the revised priority order.

11. The combination of a printer for printing data and a controller for controlling the printer;

wherein the printer comprises a store for storing material for printing thereon, means for determining the amount of material in said store at any time and for generating a count signal and means for removing said material from said store and printing thereon;
and wherein the controller comprises:
an input for receiving jobs for printing via a data transmission line from at least one remotely located input unit, each said job comprising corresponding data of one or more pages to be printed;
a memory for storing said data;
output means for transmitting said data to said printer, with said jobs being transmitted sequentially;
means for receiving said count signal from said printer; and
analysis means for storing information representing the amount of material of said printer needed to print each of said jobs, and for generating display data identifying the jobs printable on the amount of said material in said store of said printer at any time.

12. A combination according to claim 11, wherein the printer further includes at least one bin for receiving the printed material, and means for determining the difference between the maximum amount of material receivable by said bin and the amount of material in said bin at any time and generating a capacity signal, and said analysis means of said controller is arranged to generate further display data identifying those jobs printable on said material in said store of said printer which will use in combination the largest amount of material in said bin without exceeding said maximum, at any time.

13. The combination of a printer for printing data and a controller for controlling the printer;

wherein the printer comprises a store for storing material for printing thereon, means for determining the amount of material in said store at any time and generating a count signal and means for removing said material from said store and printing thereon;
and wherein the controller comprises:
an input for receiving jobs for printing from at least one input unit, each said job comprising corresponding data to be printed;
a memory for storing said data;
output means for transmitting said data to said printer, with said jobs being transmitted sequentially;
means for receiving said count signal from said printer; and
analysis means for storing information representing the amount of material of said printer needed to print each of said jobs, and for determining the order of said sequential transmission of jobs to said printer by said output means on the basis of the amount of material needed for each job and on the count signal from the printer.

14. A combination according to claim 13, wherein the printer further includes at least one bin for receiving the printed material, and means for determining the difference between the maximum amount of material receivable by said bin and the amount of material in said bin at any time and generating a capacity signal, and said analysis means of said controller is arranged to determine the order of said sequential transmission on the basis of the amount of material needed for each job, and on the count signal and the capacity signal from the printer.

15. The combination of a printer for printing data and a controller for controlling the printer;

wherein the printer comprises a store for storing material for printing thereon, means for removing said material from said store and printing thereon, at least one bin for receiving the printed material, and means for determining the difference between the maximum amount of material receivable by said bin and the amount of material in said bin at any time and for generating a capacity signal;

and wherein the controller comprises:
an input for receiving jobs for printing from at least one input unit, each said job comprising corresponding data to be printed;
a memory for storing said data;
output means for transmitting said data to said printer, with said jobs being transmitted sequentially;
means for receiving said count signal from said printer; and
analysis means for storing information representing the amount of material of said printer needed to print each of said jobs, and for generating display data identifying those jobs printable con said material in said store of said printer which will provide in combination the largest amount of material in said bin without exceeding said maximum, at any time.

16. The combination of a printer for printing data and a controller for controlling the printer;
wherein the printer comprises a store for storing material for printing thereon, means for removing said material from said store and printing thereon, at least one bin for receiving the printed material, and means for determining the difference between the maximum amount of material receivable by said bin and the amount of material in said bin at any time and generating a capacity signal;
and wherein the controller comprises:
an input for receiving jobs for printing from at least one input unit, each said job comprising corresponding data to be printed;
a memory for storing said data;
output means for transmitting said data to said printer, with said jobs being transmitted sequentially;
means for receiving said count signal from said printer; and
analysis means for storing information representing the amount of material of said printer needed to print each of said jobs, and for determining the order of said sequential transmission of jobs to said printer by said output means on the basis of the amount of material needed for each job and on the capacity signal.

17. A data printing system comprising at least one input unit, a controller coupled to said at least one input unit via a data transmission line and a printer coupled to said controller;
said controller comprising:
an input for receiving jobs for printing via data transmission from said at least one input unit, each said job comprising corresponding data of one or more pages to be printed;
a memory for storing said data;
output means for transmitting said data to said printer, with said jobs being transmitted sequentially; and
analysis means for storing data representing the duration of printing of each of said jobs, for calculating respective printing completion times for each of said jobs, and for generating display data representing said printing completion times,
wherein said controller further includes display means for simultaneously displaying said printing completion times for said jobs on the basis of said display data.

18. A system according to claim 17, wherein said at least one input unit includes:
means for receiving said display data from said controller via said data transmission line; and
a display for displaying said printing completion times for said jobs on the basis of said display data.

19. A system according to claim 17, wherein said input unit includes means for calculating said duration of printing of said jobs and for transmitting data representing said duration of printing of said jobs to said controller via said transmission line.

20. A data printing system comprising at least one input unit, a controller coupled to said at least one input unit via a data transmission line and a printer coupled to said controller;
said controller comprising:
an input for receiving jobs for printing via data transmission from said at least one input unit, each said job comprising corresponding data of one or more pages to be printed;
a memory for storing said data;
output means for transmitting said data to said printer, with said jobs being transmitted sequentially; and
analysis means for storing data representing the duration of printing of each of said jobs, for calculating respective printing completion times for each of said jobs, and for generating display data representing said printing completion times;
wherein the printer includes a store for storing material for printing thereon, means for determining the amount of material in said store at any time and for generating a count signal and means for removing said material from said store and printing thereon; and
wherein the controller includes means for receiving said count signal from said printer, and said analysis means includes means for generating a display signal identifying the jobs printable on said material in said store of said printer at any time, on the basis of the amount of material needed for each job and on the count signal from the printer.

21. A data printing system comprising at least one input unit, a controller coupled to said at least one input unit via a data transmission line and a printer coupled to said controller;
said controller comprising:
an input for receiving jobs for printing via data transmission from said at least one input unit, each said job comprising corresponding data of one or more pages to be printed;
a memory for storing said data;
output means for transmitting said data to said printer, with said jobs being transmitted sequentially; and
analysis means for storing data representing the duration of printing of each of said jobs, for calculating respective printing completion times for each of said jobs, and for generating display data representing said printing completion times;
wherein the printer includes a store for storing a material for printing thereon, means for removing said material from said store and printing thereon, at least one bin for receiving the printed material, and means for determining the difference between the maximum amount of material receivable by said bin and the amount of material in said bin at any time and generating a capacity signal; and wherein the controller includes means for receiving said capacity signal, and said analysis means includes means for generating further display data identifying those jobs printable on said material in said store of said printer which will provide in combination the largest amount of material in said bin without exceeding said maximum, at any time, on the basis of the amount of material needed for each job and on the capacity signal from the printer.

22. A data printing system comprising at least one input unit, a controller coupled to said at least one input unit via a data transmission line and a printer coupled to said controller;

said controller comprising:
an input for receiving jobs for printing via data transmission from said at least one input unit, each said job comprising corresponding data of one or more pages to be printed;
a memory for storing said data;
output means for transmitting said data to said printer, with said jobs being transmitted sequentially; and
analysis means for storing data representing the duration of printing of each of said jobs, for calculating respective printing completion times for each of said jobs, and for generating display data representing said printing completion times;
wherein the printer includes a store for storing material for printing thereon, means for determining the amount of material in said store at any time and for generating a count signal and means for removing said material from said store and printing thereon; and
wherein the controller includes means for receiving said count signal from said printer, and said analysis means includes means for determining the order of said sequential transmission of jobs to said printer from said output means on the basis of the amount of material needed for each job and on the count signal from the printer.

23. A data printing system comprising at least one input unit, a controller coupled to said at least one input unit via a data transmission line and a printer coupled to said controller;

said controller comprising:
an input for receiving jobs for printing via data transmission from said at least one input unit, each said job comprising corresponding data of one or more pages to be printed;
a memory for storing said data;
output means for transmitting said data to said printer, with said jobs being transmitted sequentially; and
analysis means for storing data representing the duration of printing of each of said jobs, for calculating respective printing completion times for each of said jobs, and for generating display data representing said printing completion times;
wherein the printer includes a store for storing a material for printing thereon, means for removing said material from said store and printing thereon, at least one bin for receiving the printed material, and means for determining the difference between the maximum amount of material receivable by said bin and the amount of material in said bin at any time and generating a capacity signal; and wherein the controller includes means for receiving said capacity signal, and said analysis means includes means for determining the order of said sequential transmission of jobs to said printer from said output means on the basis of the amount of material needed for each job and on the capacity signal from the printer.

24. A data printing system comprising at least one input unit, a controller coupled to said at least one input unit via a data transmission line, and a printer coupled to said controller;

wherein the printer comprises a store for storing material for printing thereon, means for determining the amount of material in said store at any time and for generating a count signal and means for removing said material from said store and printing thereon;

and wherein the controller comprises:
an input for receiving jobs for printing via data transmission from said at least one input unit, each said job comprising corresponding data to be printed;
a memory for storing said data;
output means for transmitting said data to said printer, with said jobs being transmitted sequentially;
means for receiving said count signal from said printer; and
analysis means for storing information representing the amount of material of said printer needed to print each of said jobs, and for generating a display signal identifying the jobs printable on the amount of said material in said store of said printer at any time.

25. A data printing system comprising at least one input unit, a controller, and a printer;

wherein the printer comprises a store for storing material for printing thereon, means for determining the amount of material in said store at any time and generating a count signal and means for removing said material from said store and printing thereon;

and wherein the controller comprises:
an input for receiving jobs for printing from said at least one input unit, each said job comprising corresponding data to be printed;
a memory for storing said data;
output means for transmitting said data to said printer, with said jobs being transmitted sequentially;
means for receiving said count signal from said printer; and
analysis means for storing information representing the amount of material of said printer needed to print each of said jobs, and for determining the order of said sequential transmission of jobs to said printer by said output means on the basis of the amount of material needed for each job and on the count signal from the printer.

26. A data printing system comprising at least one input unit, a controller, and a printer;

wherein the printer comprises a store for storing material for printing thereon, means for determining the amount of material in said store at any time and generating a count signal and means for removing said material from said store and printing thereon;

and wherein the controller comprises:
an input for receiving jobs for printing from said at least one input unit, each said job comprising corresponding data to be printed;
a memory for storing said data;
output means for transmitting said data to said printer, with said jobs being transmitted sequentially;
means for receiving said count signal from said printer; and
analysis means for storing information representing the amount of material of said printer needed to print each of said jobs, and said analysis means of said controller includes means for generating a display signal identifying those jobs printable on said material in said store of said printer which will use in combination the largest amount of material in said store without exceeding the amount of material in said store at any time.

27. A data printing system comprising at least one input unit, a controller and a printer;

wherein the printer comprises a store for storing a material for printing thereon, means for removing said material from said store and printing thereon, at least one bin for receiving the printed material, and means for determining the difference between the maximum amount of material receivable by said bin and the amount of material in said bin at any time and generating a capacity signal; and wherein the controller comprises:

an input for receiving jobs for printing from said at least one input unit, each said job comprising corresponding data to be printed;

a memory for storing said data;

output means for transmitting said data to said printer, with said jobs being transmitted sequentially;

means for receiving said sheet count signal from said printer; and analysis means for storing the amount of material of said printer needed to print each of said jobs, and for determining the order of said sequential transmission of jobs to said printer by said output means on the basis of the amount of material needed for each job and on the capacity signal from the printer.

28. A method of printing comprising:

generating a plurality of jobs for printing, each job comprising corresponding data;

determining the duration of printing of each of said jobs;

transmitting data corresponding to said plurality of jobs over a data transmission line to a printer location;

defining a sequence of printing for said jobs at said printer location;

calculating printing completion times for each of said jobs on the basis of said durations and said sequence at said printer location; and simultaneously displaying said printing completion times.

29. A method according to claim 28, wherein each of said jobs has an associated priority, and said defining of said sequence is on the basis of the respective priority associated with said jobs.

30. A method according to claim 29 further including generating a further job having a priority higher than the priority associated with at least one of said plurality of jobs, and revising said sequence of printing on the basis of the priorities associated with said jobs and said further job.

31. A method of printing on material comprising:

generating a plurality of jobs for printing on said material, each job comprising corresponding data;

determining the amount of said material required for the printing of each job;

sequentially printing said jobs on said material;

determining the amount of material available at any time for printing thereon; and displaying the number of said job sequentially printable on the amount of material available at any time.

32. A method according to claim 31, also including determining the amount of printed material at any time, determining the difference between the amount of printed material and a predetermined maximum amount of printed material, and displaying the number of jobs sequentially printable on said material which will provide in combination the largest amount of printed material at any time without exceeding said predetermined maximum amount.

33. A method of printing on material comprising:

generating a plurality of jobs for printing on said material, each job comprising corresponding data;

determining the amount of said material required for the printing of each job;

sequentially printing said jobs on said material;

determining the amount of printed material at any time and the difference between the amount of printed material and a predetermined maximum amount of printed material; and displaying the number of jobs sequentially printable on said material such that the amount of printed material at any time is less than said predetermined maximum amount.

34. A method of printing on material comprising:

generating a plurality of jobs for printing on said material, each job comprising corresponding data;

determining the amount of said material required for the printing of each job;

sequentially printing said jobs on said material;

determining the amount of material available at any time for printing thereon; and determining the order of said sequential printing of said jobs on the basis of the amount of material needed for each job and the amount of material available for printing thereon.

35. A method according to claim 34, also including determining the amount of printed material at any time, determining the difference between the amount of printed material and a predetermined maximum amount of printed material, and determining the order of said sequential printing of said jobs on the basis of the amount of said material needed for each job, the amount of said material available for printing thereon, and said difference.

36. A method of printing on material comprising:

generating a plurality of jobs for printing on said material, each job comprising corresponding data;

determining the amount of said material required for the printing of each job;

sequentially printing said jobs on said material;

determining the amount of printed material at any time and the difference between the amount of printed material and a predetermined maximum amount of printed material; and determining the order of said sequential printing of said jobs on the basis of the amount of said material needed for each job and said difference.

* * * * *